(12) United States Patent
Patolsky et al.

(10) Patent No.: US 12,517,126 B2
(45) Date of Patent: Jan. 6, 2026

(54) SYSTEMS AND METHODS FOR DETECTING A PATHOGENIC ORGANISM

(71) Applicant: Ramot at Tel-Aviv University Ltd., Tel-Aviv (IL)

(72) Inventors: Fernando Patolsky, Tel-Aviv (IL); Boris Filanovsky, Tel-Aviv (IL); Vadim Krivitsky, Tel-Aviv (IL); Yoav Avidor, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 893 days.

(21) Appl. No.: 17/614,531

(22) PCT Filed: May 28, 2020

(86) PCT No.: PCT/IL2020/050603
§ 371 (c)(1),
(2) Date: Nov. 28, 2021

(87) PCT Pub. No.: WO2020/240570
PCT Pub. Date: Dec. 3, 2020

(65) Prior Publication Data
US 2022/0229057 A1    Jul. 21, 2022

Related U.S. Application Data

(60) Provisional application No. 62/853,178, filed on May 28, 2019.

(51) Int. Cl.
*C12N 15/115* (2010.01)
*C12Q 1/00* (2006.01)
(Continued)

(52) U.S. Cl.
CPC ..... *G01N 33/56961* (2013.01); *C12N 15/115* (2013.01); *C12Q 1/002* (2013.01);
(Continued)

(58) Field of Classification Search
CPC ........... G01N 33/56961; G01N 27/308; G01N 27/3271; G01N 33/5438; G01N 27/26;
(Continued)

(56) References Cited

U.S. PATENT DOCUMENTS 7,097,975 B1    8/2006 Frederick
2007/0231794 A1    10/2007 Dill et al.
(Continued)

FOREIGN PATENT DOCUMENTS

CA    2988297    6/2016
CA    2898714    1/2017
(Continued)

OTHER PUBLICATIONS

Whetton, et al., Hyperspectral measurements of yellow rust and fusarium head blight in cereal crops: Part 2: On-line field measurement, Biosystems Engineering, vol. 167, 2018 (Year: 2018).*
(Continued)

*Primary Examiner* — Bao-Thuy L Nguyen
*Assistant Examiner* — Michael Cameron Sveiven

(57) ABSTRACT

A method of detecting a presence, amount and/or type of a pathogenic organism in a substrate is provided. The method is effected by contacting a sample suspected as containing the pathogenic organism or a portion thereof with an electrode, thereafter contacting the electrode with an aptamer that selectively binds to said pathogenic organism; thereafter contacting the electrode with an agent that participates in an electrochemically detectable reaction and thereafter perform the electrochemical reaction while using the electrode. The electric signal produced by the reaction is indicative of a presence and/or amount of the pathogenic organism. Also provided are a sensing system and kits usable for practicing
(Continued)

Figure 1:
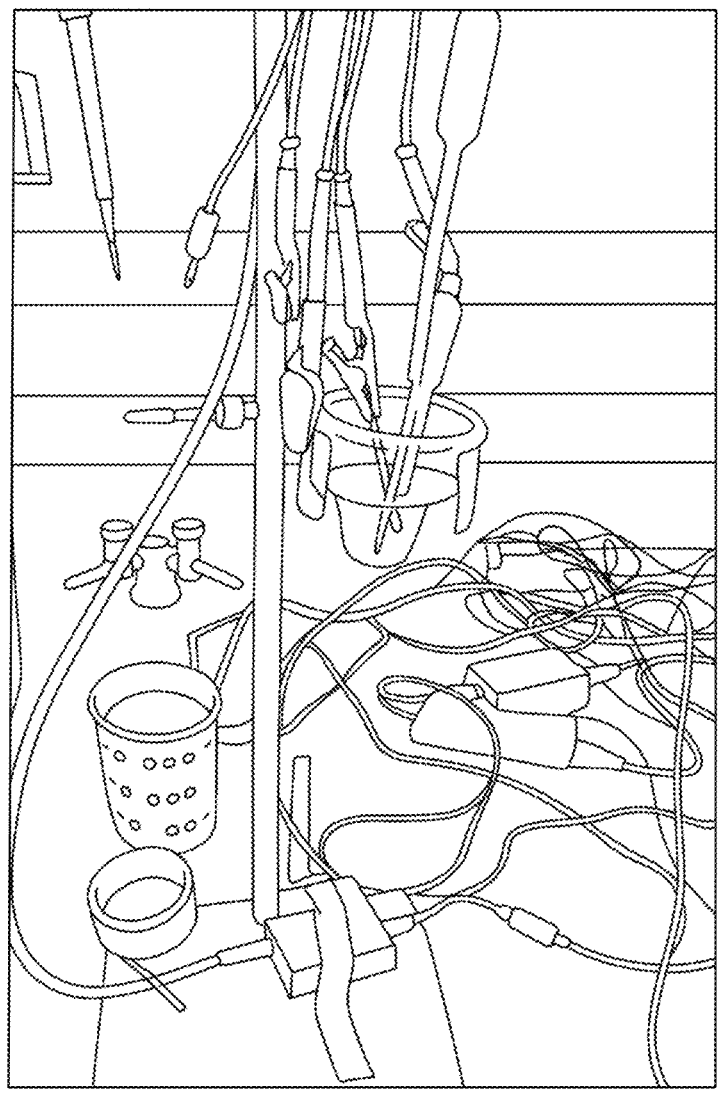

the method, and use of the method for determining a suitable agent for reducing a load of a pathogenic organism in a substrate.

5 Claims, 21 Drawing Sheets

Specification includes a Sequence Listing.

(51) Int. Cl.

| | | |
|---|---|---|
| *C12Q 1/42* | (2006.01) | |
| *C12Q 1/6895* | (2018.01) | |
| *G01N 27/30* | (2006.01) | |
| *G01N 27/327* | (2006.01) | |
| *G01N 33/569* | (2006.01) | |

(52) U.S. Cl.
CPC ............... *C12Q 1/005* (2013.01); *C12Q 1/42* (2013.01); *G01N 27/308* (2013.01); *G01N 27/3271* (2013.01); *C12N 2310/16* (2013.01); *C12N 2320/13* (2013.01)

(58) Field of Classification Search
CPC .. G01N 27/30; C12N 15/115; C12N 2310/16; C12N 2320/13; C12Q 1/002; C12Q 1/005; C12Q 1/42; C12Q 1/001; C12Q 1/6895; C12Q 1/6816
See application file for complete search history.

(56) References Cited

U.S. PATENT DOCUMENTS

| | | | | |
|---|---|---|---|---|
| 2007/0269852 A1* | 11/2007 | Muys | ................... | G01N 33/588 977/902 |
| 2009/0217777 A1 | 9/2009 | Hanson | | |
| 2013/0062221 A1* | 3/2013 | Cai | .................... | G01N 27/3277 205/780.5 |
| 2018/0332861 A1* | 11/2018 | Kim | ........................ | A01N 65/00 |
| 2018/0364209 A1 | 12/2018 | Patolsky et al. | | |
| 2018/0372673 A1 | 12/2018 | Patolsky et al. | | |
| 2020/0025736 A1 | 1/2020 | Patolsky et al. | | |

FOREIGN PATENT DOCUMENTS

| | | | | |
|---|---|---|---|---|
| CN | | 1504746 | 6/2004 | |
| CN | | 102782496 | 11/2012 | |
| CN | | 103097896 | 5/2013 | |
| WO | WO 2013/105981 | | 7/2013 | |
| WO | WO-2016168585 A1 * | | 10/2016 | ............ B82Y 30/00 |
| WO | WO 2018/229780 | | 12/2018 | |
| WO | WO 2018/229781 | | 12/2018 | |
| WO | WO 2019/028162 | | 2/2019 | |
| WO | WO 2020/240570 | | 12/2020 | |

OTHER PUBLICATIONS

Amiri, et al., Electrochemical Methodologies for the Detection of Pathogens, ACS Sensors, 2018 (Year: 2018).*
Feng, et al., Electrochemical immunosensor with aptamer-based enzymatic amplification, Analytical Biochemistry, vol. 378, Issue 1, 2008 (Year: 2008).*
Kennedy, et al., 2000. A New Method To Monitor Airborne Inoculum of the Fungal Plant Pathogens Mycosphaerella brassicicola andBotrytis cinerea. Appl Environ Microbiol (Year: 2000).*
Orlofsky, et al. Rapid MPN-Qpcr Screening for Pathogens in Air, Soil, Water, and Agricultural Produce. Water Air Soil Pollut 226, 303 (2015) (Year: 2015).*
Mizutani et al., Improvement of electrochemical NO2 sensor by use of carbonluorocarbon gas permeable electrode, Sensors and Actuators B: Chemical, vol. 108, Issues 12, 2005 (Year: 2005).*
Communication Pursuant to Article 94(3) EPC Dated Oct. 18, 2023 From the European Patent Office Re. Application No. 20744140.3 (3 Pages).
Requisition Dated Apr. 11, 2023 From the Innovation, Science and Economic Development Canada, Canadian Intellectual Property Office Re. Application No. 3, 141,294. (6 Pages).
International Search Report and the Written Opinion Dated Sep. 17, 2020 From the International Searching Authority Re. Application No. PCT/IL2020/050603. (13 Pages).
Official Action Dated Mar. 4, 2021 From the Servicio Nacional De Propriedad Intelectual Ministerio De Dessarollo Productivo E Economia Plural Re. Application No. SP-000069-2020. (2 Pages).
Feng et al. "Electrochemical Immunosensor With Aptamer-Based Enzymatic Amplification", Analytical Biochemistry, XP022679699, 378(1): 38-42, Published Online Apr. 8, 2008.
Krivitsky et al. "Direct and Selective Electrochemical Vapor Trace Detection of Organic Peroxide Explosives via Surface Decoration", Analytical Chemistry, 91(8): 5323-5330, Published Online Mar. 20, 2019.
Krivitsky et al. "Vapor Trace Collection and Direct Ultrasensitive Detection of Nitro-Explosives by 3D Microstructured Electrodes", Analytical Chemistry, 91(22): 14375-14382, Published Online Oct. 17, 2019.
Rodriguez et al. "Label-Free Electrochemical Aptasensor for the Detection of Lysozyme", Talanta, XP025896532, 78(1): 212-216, Published Online Nov. 11, 2008.
English Summary Dated Nov. 28, 2023 of Notification of Office Action Dated Nov. 21, 2023 From the National Intellectual Property Administration of the People's Republic of China Re. Application No. 202080050623.3. (4 Pages).
Notification of Office Action and Search Report Dated Nov. 21, 2023 From the National Intellectual Property Administration of the People's Republic of China Re. Application No. 202080050623.3. (11 Pages).
Amiri et al. "Electrochemical Methodologies for the Detection of Pathogens", ACS Sensors, 3: 1069-1086, May 14, 2018.

* cited by examiner

| Magnification | Bright-field | Dark-field |
|---|---|---|
| X100 | 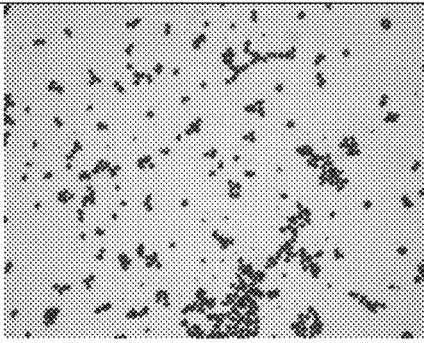 | 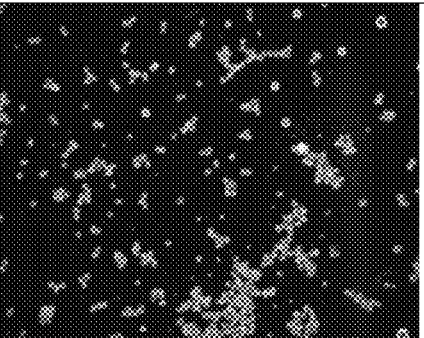 |
| X400 | 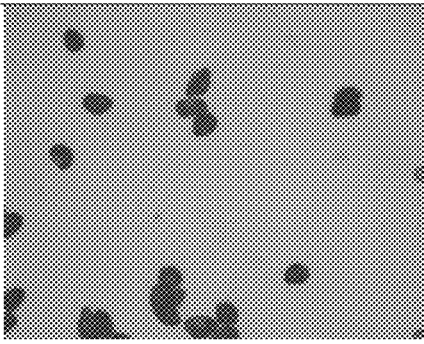 | 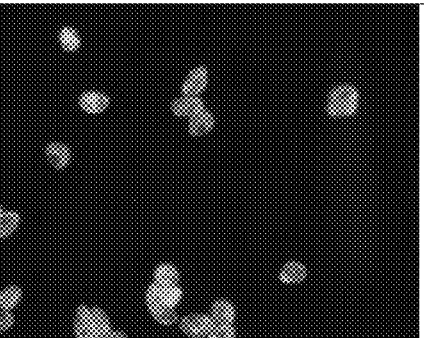 |
| X1000 | 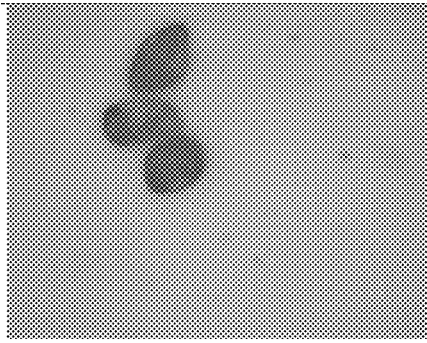 | 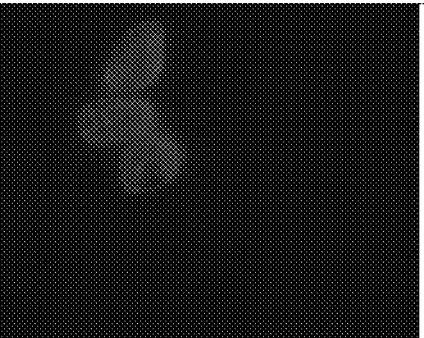 |
FIG. 3

| Magnification | Bright-field | Dark-field |
|---|---|---|
| X400 | 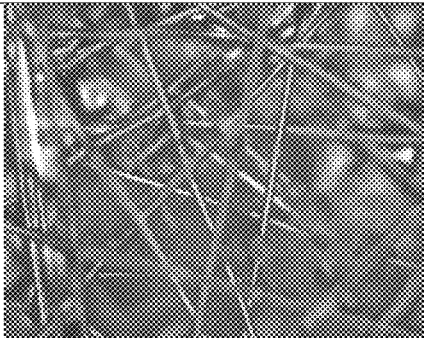 | 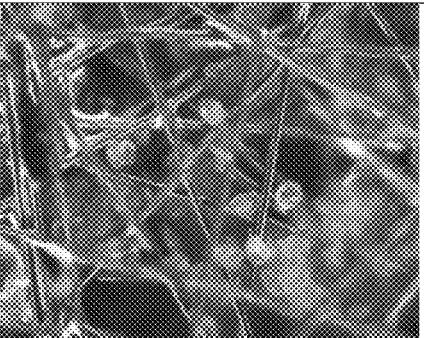 |
| X1000 | 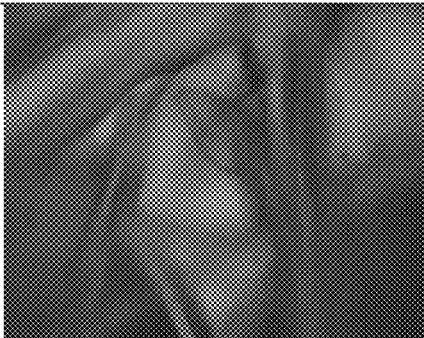 | 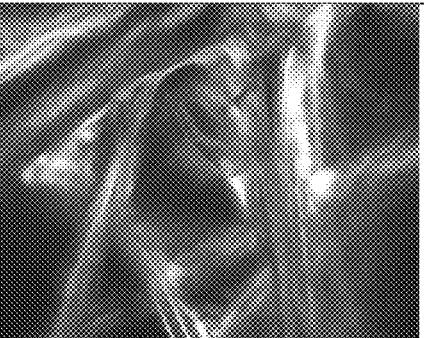 |
| X1000 | 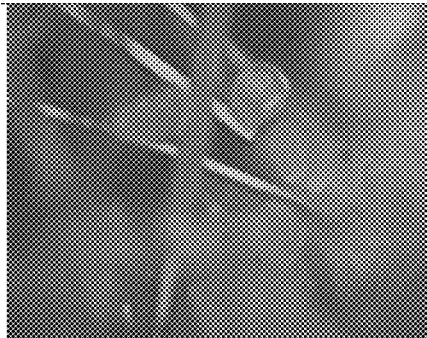 | 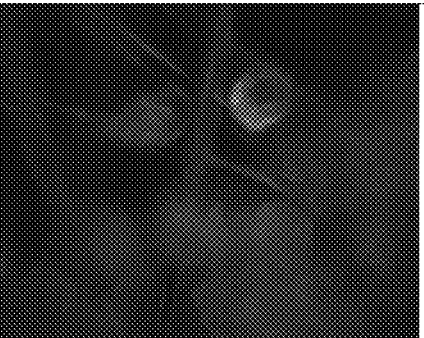 |
FIG. 8

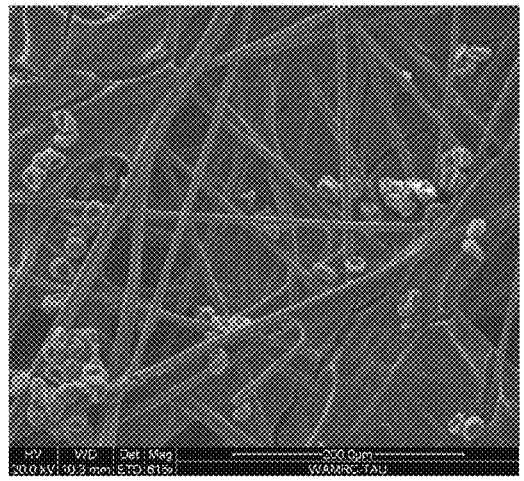
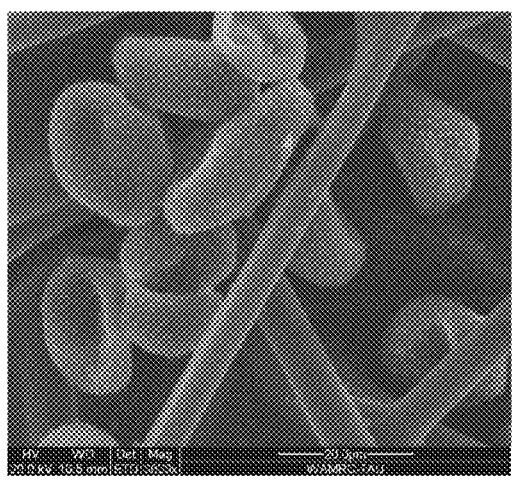
FIG. 9A FIG. 9B
| Secondary Electrons Imaging | Back-scattered Electron Imaging |
|---|---|
| | |
| | |
FIG. 9C

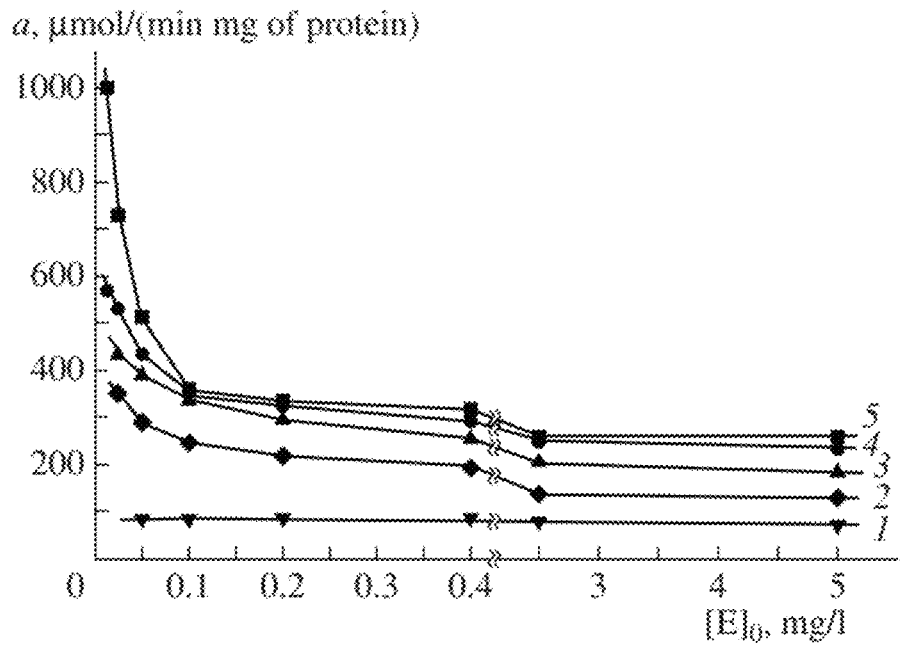
FIG. 10 (Background Art; L. F. Atyaksheva et al., 2008)
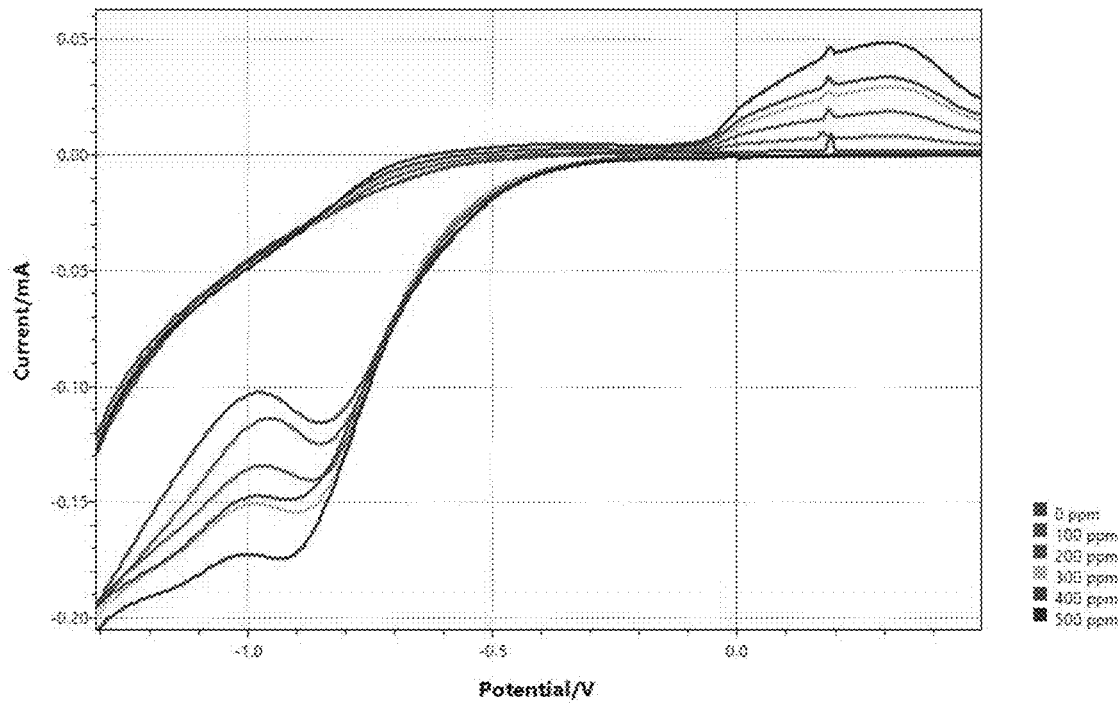
FIG. 11

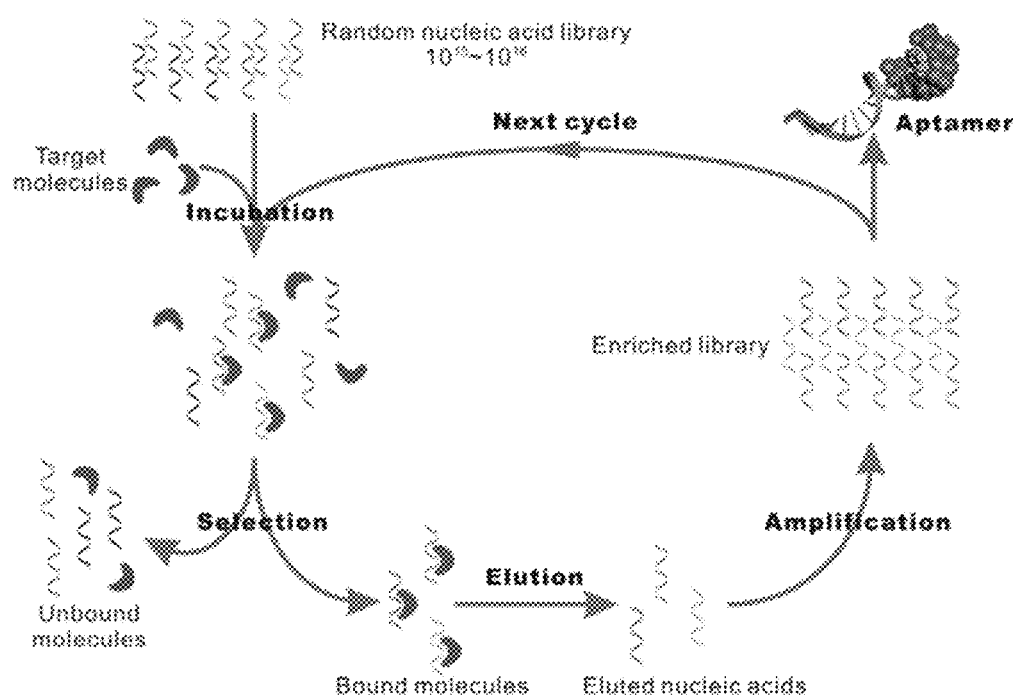
FIG. 17 (Background Art; Song. et al Anal. Chem. 2008)

dG = -7.81 SP02 dG = -5.95 SP13

SEQUENCE LISTING

```
<160> NUMBER OF SEQ ID NOS: 37

<210> SEQ ID NO 1
<211> LENGTH: 40
<212> TYPE: DNA
<213> ORGANISM: Artificial sequence
<220> FEATURE:
<223> OTHER INFORMATION: synthetic Single strand DNA oligonucleotide

<400> SEQUENCE: 1
caaggcgggt aattgagagc tcattggggc gggtgggtgg                               40

<210> SEQ ID NO 2
<211> LENGTH: 40
<212> TYPE: DNA
<213> ORGANISM: Artificial sequence
<220> FEATURE:
<223> OTHER INFORMATION: synthetic Single strand DNA oligonucleotide

<400> SEQUENCE: 2
tgggtgggat gggcggtgtt tatgcgacgg atggcggttg                               40

<210> SEQ ID NO 3
<211> LENGTH: 40
<212> TYPE: DNA
<213> ORGANISM: Artificial sequence
<220> FEATURE:
<223> OTHER INFORMATION: synthetic Single strand DNA oligonucleotide

<400> SEQUENCE: 3
```

```
gggtgggtg ggtggacgat agtattggct ctgtcaggcg                              40
```

<210> SEQ ID NO 4
<211> LENGTH: 40
<212> TYPE: DNA
<213> ORGANISM: Artificial sequence
<220> FEATURE:
<223> OTHER INFORMATION: synthetic Single strand DNA oligonucleotide

<400> SEQUENCE: 4

```
gggtgagggg ggcggggacg gaggcgaacg gtggcgactg                             40
```

<210> SEQ ID NO 5
<211> LENGTH: 40
<212> TYPE: DNA
<213> ORGANISM: Artificial sequence
<220> FEATURE:
<223> OTHER INFORMATION: synthetic Single strand DNA oligonucleotide

<400> SEQUENCE: 5

```
gtggagtggt gggtggggat tggaggctaa cgttgagtgg                             40
```

<210> SEQ ID NO 6
<211> LENGTH: 37
<212> TYPE: DNA
<213> ORGANISM: Artificial sequence
<220> FEATURE:
<223> OTHER INFORMATION: synthetic Single strand DNA oligonucleotide

<400> SEQUENCE: 6

```
gcgatgcggc ctgggtgggc gttggtgggt tgtgccg                                37
```

<210> SEQ ID NO 7
<211> LENGTH: 39
<212> TYPE: DNA
<213> ORGANISM: Artificial sequence
<220> FEATURE:
<223> OTHER INFORMATION: synthetic Single strand DNA oligonucleotide

<400> SEQUENCE: 7

```
caatctaaac gatcacttgc gggggcgggt gggtggtgc                              39
```

<210> SEQ ID NO 8
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 8

```
agcctgttgt gagcctcctg tcgaacaagg cgggtaattg agagctcatt ggggcgggtg       60
ggtggttgag cgtttattct tgtctccc                                          88
```

<210> SEQ ID NO 9
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 9

```
agcctgttgt gagcctcctg tcgaatgggt gggatgggcg gtgtttatgc gacggatggc       60
ggttgttgag cgtttattct tgtctccc                                          88
```

<210> SEQ ID NO 10
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 10
agcctgttgt gagcctcctg tcgaagggt gggtgggtgg acgatagtat tggctctgtc    60
aggcgttgag cgtttattct tgtctccc                                      88

<210> SEQ ID NO 11
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 11
agcctgttgt gagcctcctg tcgaagggtg aggggggcgg ggacggaggc gaacggtggc    60
gactgttgag cgtttattct tgtctccc                                      88

<210> SEQ ID NO 12
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 12
agcctgttgt gagcctcctg tcgaagtgga gtggtgggtg gggattggag gctaacgttg    60
agtggttgag cgtttattct tgtctccc                                      88

<210> SEQ ID NO 13
<211> LENGTH: 85
<212> TYPE: DNA
<213> ORGANISM: Artificial sequence
<220> FEATURE:
<223> OTHER INFORMATION: synthetic Single strand DNA oligonucleotide

<400> SEQUENCE: 13
agcctgttgt gagcctcctg tcgaagcgat gcggcctggg tgggcgttgg tgggttgtgc    60
cgttgagcgt ttattcttgt ctccc                                         85

<210> SEQ ID NO 14
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 14
agcctgttgt gagcctcctg tcgaacaatc taaacgatca cttgcggggg cgggtgggtg    60
gtgcattgag cgtttattct tgtctccc                                      88

<210> SEQ ID NO 15
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 15
agcctgttgt gagcctcctg tcgaatgggg gtgggcgggc ggttgagtca ggcggttcac    60
tctgcttgag cgtttattct tgtctccc                                        88

<210> SEQ ID NO 16
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 16
agcctgttgt gagcctcctg tcgaagtggg ggtgggtggg tggtacttgc atagaggccg    60
tacctttgag cgtttattct tgtctccc                                        88

<210> SEQ ID NO 17
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 17
agcctgttgt gagcctcctg tcgaatatgg ggtgggtggg tggcatttga aggggctcgc    60
acactttgag cgtttattct tgtctccc                                        88

<210> SEQ ID NO 18
<211> LENGTH: 88
<212> TYPE: DNA
<213> ORGANISM: Artificial sequence
<220> FEATURE:
<223> OTHER INFORMATION: synthetic Single strand DNA oligonucleotide

<400> SEQUENCE: 18
agcctgttgt gagcctcctg tcgaatcagc aggcccagag cgcgcatttg gggtgggtgg    60
gtggattgag cgtttattct tgtctccc                                        88

<210> SEQ ID NO 19
<211> LENGTH: 25
<212> TYPE: DNA
<213> ORGANISM: Artificial sequence
<220> FEATURE:
<223> OTHER INFORMATION: 5' fixed region of the synthetic Single strand
      DNA

<400> SEQUENCE: 19
agcctgttgt gagcctcctg tcgaa                                           25

<210> SEQ ID NO 20
<211> LENGTH: 23
<212> TYPE: DNA
<213> ORGANISM: Artificial sequence
<220> FEATURE:
<223> OTHER INFORMATION: 3' fixed region of the synthetic Single strand
      DNA

<400> SEQUENCE: 20
ttgagcgttt attcttgtct ccc                                             23

<210> SEQ ID NO 21
<211> LENGTH: 15
<212> TYPE: DNA
<213> ORGANISM: Artificial sequence
<220> FEATURE:
<223> OTHER INFORMATION: G4 putative motif (5'->3') nucleic acid -continued

<400> SEQUENCE: 21
ggggcgggtg ggtgg                                            15

<210> SEQ ID NO 22
<211> LENGTH: 15
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 22
gggtgggatg ggcgg                                            15

<210> SEQ ID NO 23
<211> LENGTH: 15
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 23
ggggtgggtg ggtgg                                            15

<210> SEQ ID NO 24
<211> LENGTH: 16
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 24
gggtgagggg ggcggg                                           16

<210> SEQ ID NO 25
<211> LENGTH: 14
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 25
ggagtggggg tggg                                             14

<210> SEQ ID NO 26
<211> LENGTH: 18
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 26
ggcctgggtg ggcgttgg                                         18

<210> SEQ ID NO 27
<211> LENGTH: 16
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 27
gggggcgggt gggtgg                                                    16

<210> SEQ ID NO 28
<211> LENGTH: 16
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 28
gggggtgggc gggcgg                                                    16

<210> SEQ ID NO 29
<211> LENGTH: 16
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 29
gggggtgggt gggtgg                                                    16

<210> SEQ ID NO 30
<211> LENGTH: 15
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 30
ggggtgggtg ggtgg                                                     15

<210> SEQ ID NO 31
<211> LENGTH: 15
<212> TYPE: DNA
<213> ORGANISM: Artificial sequence
<220> FEATURE:
<223> OTHER INFORMATION: G4 putative motif (5'->3') nucleic acid
      sequence

<400> SEQUENCE: 31
ggggtgggtg ggtgg                                                     15

<210> SEQ ID NO 32
<211> LENGTH: 59
<212> TYPE: DNA
<213> ORGANISM: Artificial sequence
<220> FEATURE:
<223> OTHER INFORMATION: Single strand DNA oligonucleotide

<400> SEQUENCE: 32
gtgttgtgag cctcctgtcg aagggggtggg tgggtggacg atagtattgg ctctgtcac    59

<210> SEQ ID NO 33
<211> LENGTH: 46
<212> TYPE: DNA
<213> ORGANISM: Artificial sequence
<220> FEATURE:
<223> OTHER INFORMATION: Single strand DNA oligonucleotide

<400> SEQUENCE: 33

```
gagcctcctg tcgaaggggt gggtgggtgg acgatagtat tggctc                    46

<210> SEQ ID NO 34
<211> LENGTH: 28
<212> TYPE: DNA
<213> ORGANISM: Artificial sequence
<220> FEATURE:
<223> OTHER INFORMATION: Single strand DNA oligonucleotide

<400> SEQUENCE: 34
tgtcgaaggg gtgggtgggt ggacgata                                        28

<210> SEQ ID NO 35
<211> LENGTH: 20
<212> TYPE: DNA
<213> ORGANISM: Artificial sequence
<220> FEATURE:
<223> OTHER INFORMATION: Single strand DNA oligonucleotide

<400> SEQUENCE: 35 gaagggtgg gtgggtggac                                                  20

<210> SEQ ID NO 36
<211> LENGTH: 52
<212> TYPE: DNA
<213> ORGANISM: Artificial sequence
<220> FEATURE:
<223> OTHER INFORMATION: Single strand DNA oligonucleotide

<400> SEQUENCE: 36
gtgagcctcc tgtcgaatgg gggtgggcgg gcggttgagt caggcggttc ac             52

<210> SEQ ID NO 37
<211> LENGTH: 18
<212> TYPE: DNA
<213> ORGANISM: Artificial sequence
<220> FEATURE:
<223> OTHER INFORMATION: Single strand DNA oligonucleotide
<220> FEATURE:
<221> NAME/KEY: misc_feature
<222> LOCATION: (18)..(18)
<223> OTHER INFORMATION: 3' FAM conjugated

<400> SEQUENCE: 37
ggaggctcac aacaggct                                                   18
```

SYSTEMS AND METHODS FOR DETECTING A PATHOGENIC ORGANISM

RELATED APPLICATIONS

This application is a National Phase of PCT Patent Application No. PCT/IL2020/050603 having International filing date of May 28, 2020, which claims the benefit of priority under 35 USC § 119 (e) of U.S. Provisional Patent Application No. 62/853,178 filed on May 28, 2019. The contents of the above applications are all incorporated by reference as if fully set forth herein in their entirety.

SEQUENCE LISTING STATEMENT

The ASCII file, entitled 89881SequenceListing.txt, created on Nov. 28, 2021, comprising 9,321 bytes, submitted concurrently with the filing of this application is incorporated herein by reference. The sequence listing submitted herewith is identical to the sequence listing forming part of the international application.

FIELD AND BACKGROUND OF THE INVENTION

The present invention, in some embodiments thereof, relates to electrochemical sensing and, more particularly, but not exclusively, to a method and system for electrochemically detecting a presence, amount and/or type of a pathogenic organism (e.g., a pathogenic microorganism) in substrates such as agricultural substrates, which are usable for determining a presence and/type of a disease associated with the pathogenic organism in the substrate. In some embodiments, the present invention relates to agriculture, and, more particularly, but not exclusively, to a method and system for electrochemically detecting a presence, amount and/or type of a fungus (e.g., a rust fungus) in an agricultural substrate such as a plant, which are usable for determining a presence and/type of a disease associated with the fungus in the substrate.

Rust fungi are biotrophic pathogens that affect many plant species, including a wide range of commercially important crops, such as, for example, soybeans and wheat. Fungal development is greatly influenced by environmental conditions and by the genetics of plant-fungal pathogen interaction.

Soybean rust diseases are mainly caused by two types of fungi, *Phakopsora pachyrhizi* and *Phakopsora meibomiae*.

At the early stage of Soybean Rust, it causes yellowish discoloration on the upper surfaces of foliage. This stage is hard to identify since the symptoms are relatively small and poorly defined. Later, as the disease continues to progress, the leaves turn yellow and there are lesions mostly on the undersides of the leaves and sometimes on petioles, stems or pods, and premature defoliation can also be observed.

Soybean Rust produces two types of lesions: those that turn, at the later stage from grey to tan and those that turn to reddish brown. Mature tan lesion consists of small pustules which are surrounded by discoloured necrotic areas. Tan spores can be found at the necrotic areas on the underside of the leaf. The reddish-brown lesion has larger reddish brown necrotic areas with few pustules and visible spores on the underside of the leaf.

Soybean plants are susceptible to a rust disease at any stage in the life cycle. However, symptoms are most commonly found during or after flowering. Soybean plants infected by Soybean Rust will result in declining of pod production and fill.

Rust-related diseases of wheat (*Triticum aestivum*) occur throughout the world and frequently cause great economic losses. Wheat leaf rust, stripe rust and stem rust are caused by three different fungal species: *Puccinia triticina* (previously called *Puccinia recondite* f sp. *tritici*), *Puccinia striiformis* f sp. *tritici* and *Puccinia graminis* f. sp. *tritici*, respectively.

Correct diagnosis and monitoring at the early stage of the epidemic are essential for effective control of wheat rust and rust diseases of other plants, that is, for the selection and use of correct fungicides and resistant cultivars. However, the diagnosis, monitoring, and forecasting of rust outbreaks have traditionally relied on regular field observations of disease symptoms and signs, and the value of such qualitative findings depends on the experience and skill of the observer.

Due to the severe economic damages caused by rust diseases, many studies have focused on the development of techniques for rapid and accurate identification of the disease, as a supplemental or replacement methodology to the time-consuming field monitoring of leaves for signs of the pathogens and symptoms of disease development.

These techniques include, for example, digital imaging and various spectroscopic techniques, DNA-based methods and immunological methods (e.g., using monoclonal antibodies).

However, imaging and spectroscopic methods typically require skilled technicians and/or special equipment, and existing methods based on DNA-related or immunological-related approaches are strongly limited by their complexity, time-consuming attributes and the use of sensitive biomaterials, such as antibodies and enzymes, which make all these approaches inferior in their capability to perform under real-time on-field conditions.

SUMMARY OF THE INVENTION

The development of simple, straightforward, rapid and cost-effective reusable sensing devices is of imperative importance in the field of agriculture, and there is a widely recognized need in improved methodologies for on-site fast real-time ultra-sensitive detection of plant pathogens such as rust fungi pathogens.

The present inventors have devised and successfully practiced a novel methodology that enables performing a simple electrochemical sensing of pathogenic microorganisms such as rust fungi with ultrahigh-sensitivity, high selectivity, fast detection turnover, and cost-effective characteristics.

According to an aspect of some embodiments of the present invention there is provided a method of detecting a presence, amount and/or type of a pathogenic organism in and/or on a substrate, the method comprising: contacting a sample suspected as containing the pathogenic organism or a portion thereof with an electrode, to thereby absorb the pathogenic organism or a portion thereof, if present in the sample, to at least a portion of a surface of the electrode, to thereby obtain an electrode having at least a portion of the pathogenic organism absorbed to a surface thereof; subsequent to contacting the sample, contacting the electrode with an aptamer that selectively binds to the pathogenic organism or the portion thereof; subsequent to contacting the aptamer, contacting the electrode with an agent that participates in an electrochemically detectable reaction; and subsequent to contacting the agent, performing the electrochemical reaction in the presence of the electrode, wherein an electric signal produced by the reaction is indicative of a presence and/or amount of the agent, and is thereby indicative of a presence and/or amount of the pathogenic organism in the sample.

According to some of any of the embodiments described herein, the electrode is a gas-permeable (air-permeable) electrode and contacting the electrode with the sample is by air-pumping an environment surrounding the substrate.

According to some of any of the embodiments described herein, the electrode features functional groups that are capable of interacting with the pathogenic organism.

According to some of any of the embodiments described herein, the functional groups are positively charged groups, such as amine groups.

According to some of any of the embodiments described herein, the functional groups are covalently attached to at least a portion of the surface of the electrode.

According to some of any of the embodiments described herein, the electrode is a carbon fiber electrode.

According to some of any of the embodiments described herein, the electrode is a carbon paper electrode.

According to some of any of the embodiments described herein, the carbon paper electrode is an air-permeable carbon paper electrode.

According to some of any of the embodiments described herein, the carbon paper electrode has positively charged groups covalently linked to at least a portion of its surface.

According to some of any of the embodiments described herein, the method further comprises, subsequent to contacting the electrode with the sample, employing an imaging technique to thereby determine a presence or absence of a pathogenic organism on a surface of the electrode.

According to some of any of the embodiments described herein, the imaging technique comprises light microscopy and/or scanning electrode microscopy.

According to some of any of the embodiments described herein, contacting the electrode with the aptamer comprises contacting the electrode with a solution containing the aptamer.

According to some of any of the embodiments described herein, the solution comprises a carbonate buffer featuring an alkaline pH.

According to some of any of the embodiments described herein, the aptamer comprises a nucleotide sequence represented by SEQ ID NO:35.

According to some of any of the embodiments described herein, the aptamer has a nucleotide sequence selected from SEQ ID NOS:8-18 and 32-36.

According to some of any of the embodiments described herein, the aptamer has a nucleotide sequence represented by SEQ ID NO:17.

According to some of any of the embodiments described herein, contacting the electrode with an agent that participates in the electrochemically detectable reaction comprises contacting the electrode with a solution containing the agent.

According to some of any of the embodiments described herein, the aptamer features a first functional groups and the agent features a second functional group, and the first and second functional groups are chemically compatible with one another.

According to some of any of the embodiments described herein, the first and second functional groups form an affinity pair.

According to some of any of the embodiments described herein, the affinity pair comprises biotin and avidin or strepavidin.

According to some of any of the embodiments described herein, the electrochemically detectable reaction generates an electrochemically detectable substance.

According to some of any of the embodiments described herein, a reactant is the electrochemically detectable reaction is an electrochemically detectable substance.

According to some of any of the embodiments described herein, agent that participates in the electrochemically detectable reaction is an agent that promotes the reaction, and wherein subjecting the electrode to the reaction comprises contacting the electrode with an electrolyte solution containing a reactant in the electrochemically detectable reaction.

According to some of any of the embodiments described herein, the agent that participates in the electrochemically detectable reaction is an enzyme that catalyzes the reaction.

According to some of any of the embodiments described herein, the reaction produces a redox reactive substance.

According to some of any of the embodiments described herein, the enzyme is selected from a phosphatase, a glucosidase, a chitinase and a cellobiohydrolase.

According to some of any of the embodiments described herein, the enzyme is an alkaline phosphatase.

According to some of any of the embodiments described herein, the enzyme is a galactosidase.

According to some of any of the embodiments described herein, the electrolyte solution comprises a carbonate buffer featuring an alkaline pH.

According to some of any of the embodiments described herein, the method is for detecting a presence and/or amount of a soybean rust fungus, the method comprising: contacting the sample suspected as containing the soybean rust fungus or a portion thereof with a gas-permeable carbon electrode, to thereby absorb the pathogenic organism or a portion thereof, if present in the sample, to at least a portion of a surface of the electrode, to thereby obtain the gas-permeable carbon electrode having at least a portion of the pathogenic organism absorbed to a surface thereof; subsequent to contacting the sample, contacting the electrode with an aptamer that selectively binds to the pathogenic organism or the portion thereof, the aptamer has a nucleobase sequence selected from the group consisting of SEQ ID NO:8-18 and 32-36 and having biotin conjugated thereto; subsequent to contacting the aptamer, contacting the electrode with an alkaline phosphatase having avidin or streptavidin conjugated thereto; and subsequent to contacting the electrode with the alkaline phosphatase, contacting the electrode with an electrolyte solution containing a substrate of the alkaline phosphatase and performing the electrochemical reaction in the presence of the electrode, wherein an electric signal produced by the reaction is indicative of a presence and/or amount of the alkaline phosphatase, and is thereby indicative of a presence and/or amount of the soybean fungus in the sample.

According to some of any of the embodiments described herein, the soybean rust fungus is *Phakopsora pachyrhizi.*

According to some of any of the embodiments described herein, the sample is of a portion of a substrate suspected as being infected by the pathogenic organism or of an environment surrounding the substrate.

According to some of any of the embodiments described herein, the substrate is an agricultural substrate.

According to some of any of the embodiments described herein, the pathogenic microorganism is selected from the group consisting of a rust fungus, a powdery mildew, a coffee leaf rust, a fusarium head blight, a potato late blight, an apple scab, a greening (bacteria or insect vector), a brown planthopper, a rice stem borer, and a caterpillar/lepidopteran pest.

According to some of any of the embodiments described herein, the pathogenic organism is a pathogenic microorganism.

According to some of any of the embodiments described herein, the pathogenic microorganism is a fungus.

According to some of any of the embodiments described herein, the pathogenic microorganism is a rust fungus.

According to some of any of the embodiments described herein, the pathogenic organism is a rust fungus and the sample is an air sample of an environment surrounding a plant suspected as being infected by the rust fungus.

According to an aspect of some embodiments of the present invention there is provided a sensing electrode having absorbed thereto a pathogenic organism or a portion thereof and an aptamer that selectively binds to the pathogenic organism or the portion thereof being attached to the pathogenic organism or the portion thereof.

According to an aspect of some embodiments of the present invention there is provided an electrode having absorbed thereto a soybean rust fungus and an aptamer has a nucleobase sequence selected from the group consisting of SEQ ID NO:8-18 and 32-36 attached to the rust fungus.

According to an aspect of some embodiments of the present invention there is provided a sensing electrode having absorbed thereto a pathogenic organism or a portion thereof, an aptamer that selectively binds to the pathogenic organism or the portion thereof being attached to the pathogenic organism or the portion thereof, and an agent the participates in an electrochemically detectable reaction attached to the aptamer.

According to an aspect of some embodiments of the present invention there is provided an electrode having absorbed thereto a soybean rust fungus, an aptamer having a nucleobase sequence selected from the group consisting of SEQ ID NO:8-18 and 32-36 attached to the rust fungus, and an alkaline phosphatase attached to the aptamer.

According to some of any of the embodiments described herein, one of the aptamer and the alkaline phosphatase has biotin conjugated thereto and the other one of the aptamer and the alkaline phosphatase has avidin or streptavidin conjugated thereto and wherein the alkaline phosphatase is attached to the aptamer via formation of a biotin-avidin/strepavidin affinity pair.

According to an aspect of some embodiments of the present invention there is provided an electrochemical system comprising the electrode having absorbed thereto a soybean rust fungus, an aptamer having a nucleobase sequence selected from the group consisting of SEQ ID NO:8-18 and 32-36 attached to the rust fungus, and an alkaline phosphatase attached to the aptamer, wherein the electrode forms a part of an electrochemical cell and the electrochemical cell is operable by electrically connecting the electrode to a power source.

According to an aspect of some embodiments of the present invention there is provided an electrochemical system comprising an electrode as described herein any of the respective embodiments and any combination thereof, having absorbed thereto a pathogenic organism or a portion thereof, an aptamer that selectively binds to the pathogenic organism or the portion thereof being attached to the pathogenic organism or the portion thereof, and an agent the participates in an electrochemically detectable reaction attached to the aptamer, wherein the electrode forms a part of an electrochemical cell and the electrochemical cell is operable by electrically connecting the electrode to a power source.

According to some of any of the embodiments described herein, the electrochemical cell further comprises a reference electrode and optionally an auxiliary electrode.

According to some of any of the embodiments described herein, the electrochemical system comprises a hardware processor configured for receiving the signal generated by the electrode and processing the signal.

According to some of any of the embodiments described herein, the hardware processor is configured for transmitting the processed signal to a server computer at a remote location.

According to some of any of the embodiments described herein, the hardware processor is configured for processing the signal to determine presence, amount and/or type of a pathogenic organism or the portion thereof on the electrode and to transmit information pertaining to the determination to a server computer at a remote location.

According to some of any of the embodiments described herein, the electrochemical system comprises a hardware processor configured for receiving the signal generated by the electrode and transmitting the signal to a server computer at a remote location.

According to some of any of the embodiments described herein, the hardware processor is configured to receive software and/or firmware updates over a communication network.

According to some of any of the embodiments described herein, the hardware processor is configured to receive control commands over a communication network.

According to some of any of the embodiments described herein, the control commands comprise sensitivity calibration commands.

According to some of any of the embodiments described herein, the electrochemical system comprises a user interface for receiving control commands.

According to some of any of the embodiments described herein, the control commands comprise sensitivity calibration commands.

According to an aspect of some embodiments of the present invention there is provided a method of monitoring, comprising: receiving, over a time period, data pertaining to presence, amount and/or type of a pathogenic organism from a plurality of electrochemical systems at a respective plurality of locations; and monitoring changes in the presence, amount and/or type of the pathogenic organism at each of the locations over the time period; wherein each of the electrochemical systems comprises the system as described herein in any of the respective embodiments.

According to some of any of the embodiments described herein, the monitoring comprises mapping the locations according to the presence, amount and/or type of the pathogenic organism.

According to some of any of the embodiments described herein, the method comprises monitoring diffusion of the pathogenic organism among the locations.

According to an aspect of some embodiments of the present invention there is provided a kit comprising an electrode and a solution comprising an aptamer that selectively binds to a pathogenic organism or a portion thereof individually packaged within the kit.

According to some of any of the embodiments described herein, the kit further comprises instructions to contact the electrode with a sample suspected as containing the pathogenic organism or the portion thereof, and subsequently contact the electrode with the solution.

According to some of any of the embodiments described herein, the kit further comprises a solution containing an agent that is capable of binding to the aptamer and of participating in an electrochemically detectable reaction, the solution being individually packaged within the kit.

According to some of any of the embodiments described herein, the kit further comprises instructions to contact the electrode with a sample suspected as containing the pathogenic organism or the portion thereof, subsequently contact the electrode with the solution that comprises the aptamer and subsequently contact the electrode with the solution that comprises the agent.

According to some of any of the embodiments described herein, the kit further comprises a reactant of the electrochemically detectable reaction individually packaged within the kit.

According to an aspect of some embodiments of the present invention there is provided a method of reducing a load of a pathogenic organism in and/or on a substrate, the method comprising determining a presence, amount and/or type of the pathogenic organism in and/or on the substrate using the method of any one of claims of the present invention, and based on the determining, contacting the substrate with an antimicrobial agent that is capable of reducing a population of the pathogenic organism.

According to some of any of the embodiments described herein, the pathogenic organism is a rust fungus, and said antimicrobial agent is a fungicide usable in reducing a load of said rust fungus.

According to some of any of the embodiments described herein, rust fungus is soybean rust fungus.

According to some of any of the embodiments described herein, determining a presence and/or amount of said soybean rust fungus is as described herein in any of the respective embodiments and any combination thereof.

According to an aspect of some embodiments of the present invention there is provided a method of controlling a presence and/or progression of a disease caused by a pathogenic organism in an agricultural substrate, the method comprising determining a presence, amount and/or type of the pathogenic organism in and/or on the substrate using the method as described herein in any of the respective embodiments, and based on the determining, treating a substrate identified as infected by said pathogenic organism with a pesticide that is capable of controlling a population of said pathogenic organism.

According to some of any of the embodiments described herein, the pathogenic organism is a rust fungus, and the pesticide is a fungicide usable in controlling a population of the rust fungus.

According to some of any of the embodiments described herein, the rust fungus is soybean rust fungus.

According to some of any of the embodiments described herein, determining a presence and/or amount and/or type of the soybean rust fungus is as described herein in any of the respective embodiments and any combination thereof.

According to an aspect of some embodiments of the present invention there is provided an oligonucleotide having a nucleotide sequence selected from the sequences presented herewith as SEQ ID NOS: 1-18 and 32-36.

According to an aspect of some embodiments of the present invention there is provided an aptamer selective to a soybean rust fungus as described herein, the aptamer being as described herein in any of the respective embodiments and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 1 presents a photograph of an exemplary electrochemical sensing system assembly for practicing a method as described herein.

Figure 2A:
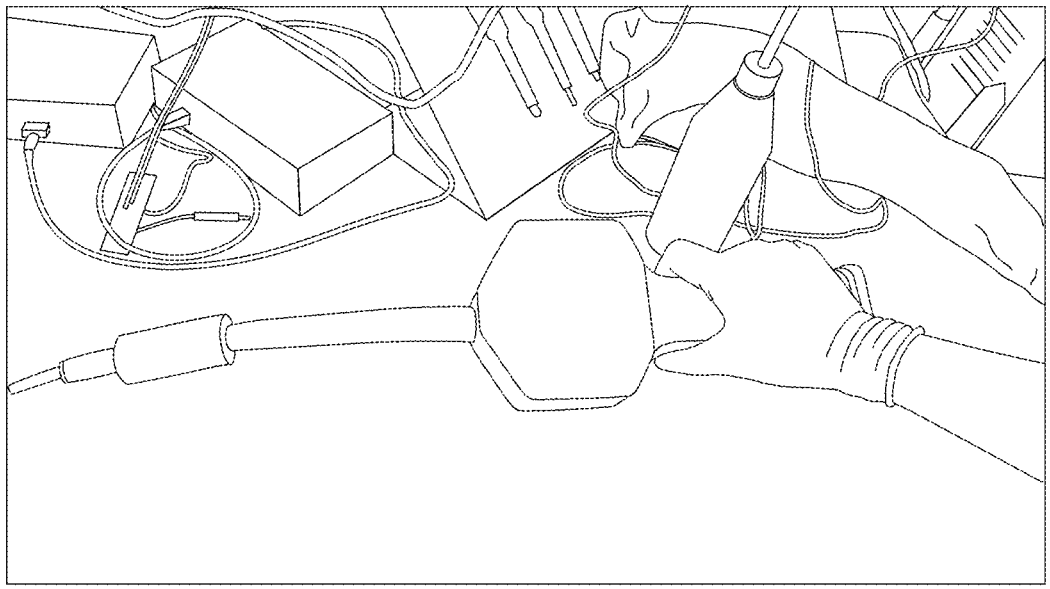
Figure 2B:
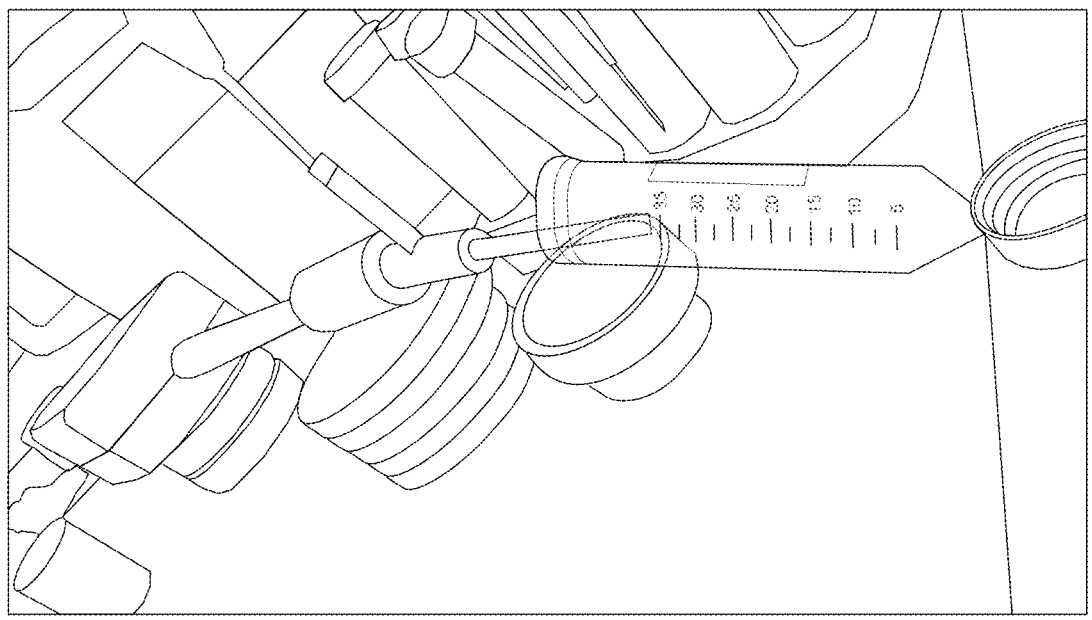

FIGS. 2A-B present an exemplary, homemade, portable air sampler bearing silicon tubing (FIG. 2A) for air collection and for fixation of the electrodes during the air pumping (FIG. 2B).

FIG. 3 presents light microscope images of soybean rust samples suspended on a silicon wafer with a native oxide layer (<100>, n-type arsenic, 355-395 μm, 15-7 mΩ/cm). Soybean rust samples were suspended in a mixture of 1:1 deionized water and isopropanol.

Figure 4:
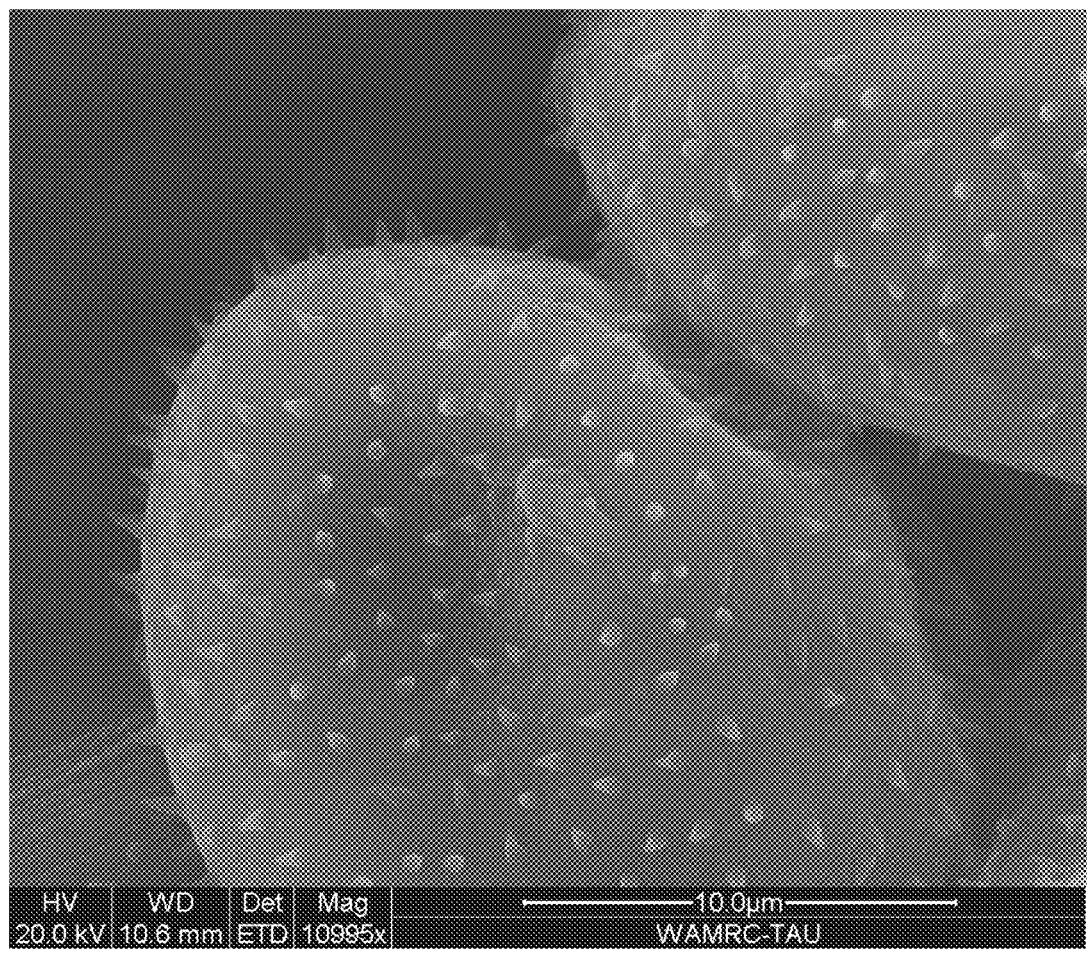

FIG. 4 presents SEM secondary electrons image of a soybean rust sample after deposition of 4 nm of gold/palladium, taken at 20 kV, 10 mm distance, and high vacuum mode.

FIGS. 5A-B present secondary electrons (FIG. 5A) and back-scattered electrons (FIG. 5B) images of soybean rust spikes, after deposition of 4 nm gold/palladium, taken at 20 kV, 10 mm distance, and high vacuum mode.

Figures 6A, 6B:
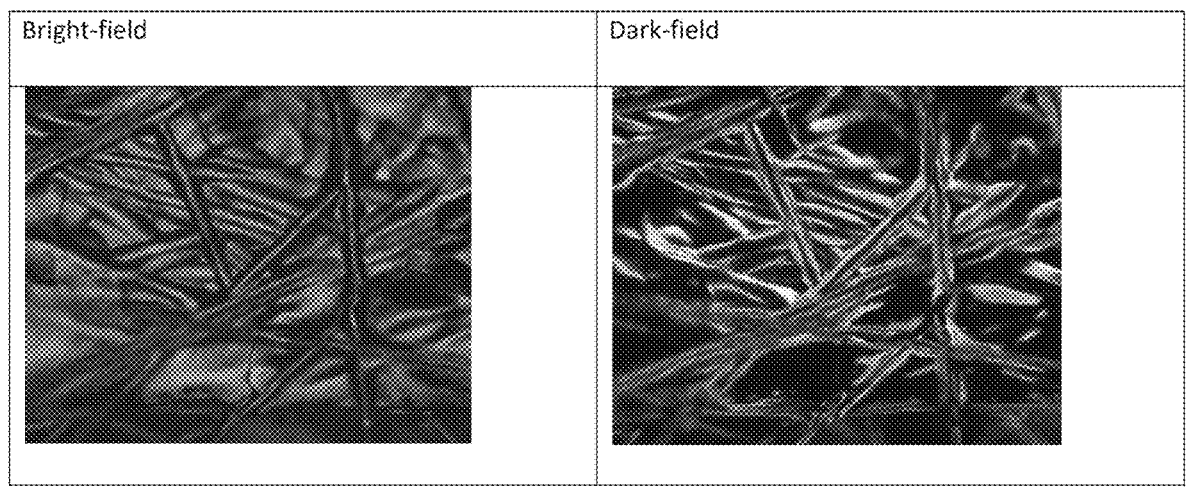

FIGS. 6A-B present light microscope images: Bright-field (FIG. 6A) and dark-field (FIG. 6B) analyses, of a micro-carbon-fibers electrode (0.18 mm thick, type SPECTRAC-ARB 2050A-1050) taken at ×400 magnification.

Figure 7:
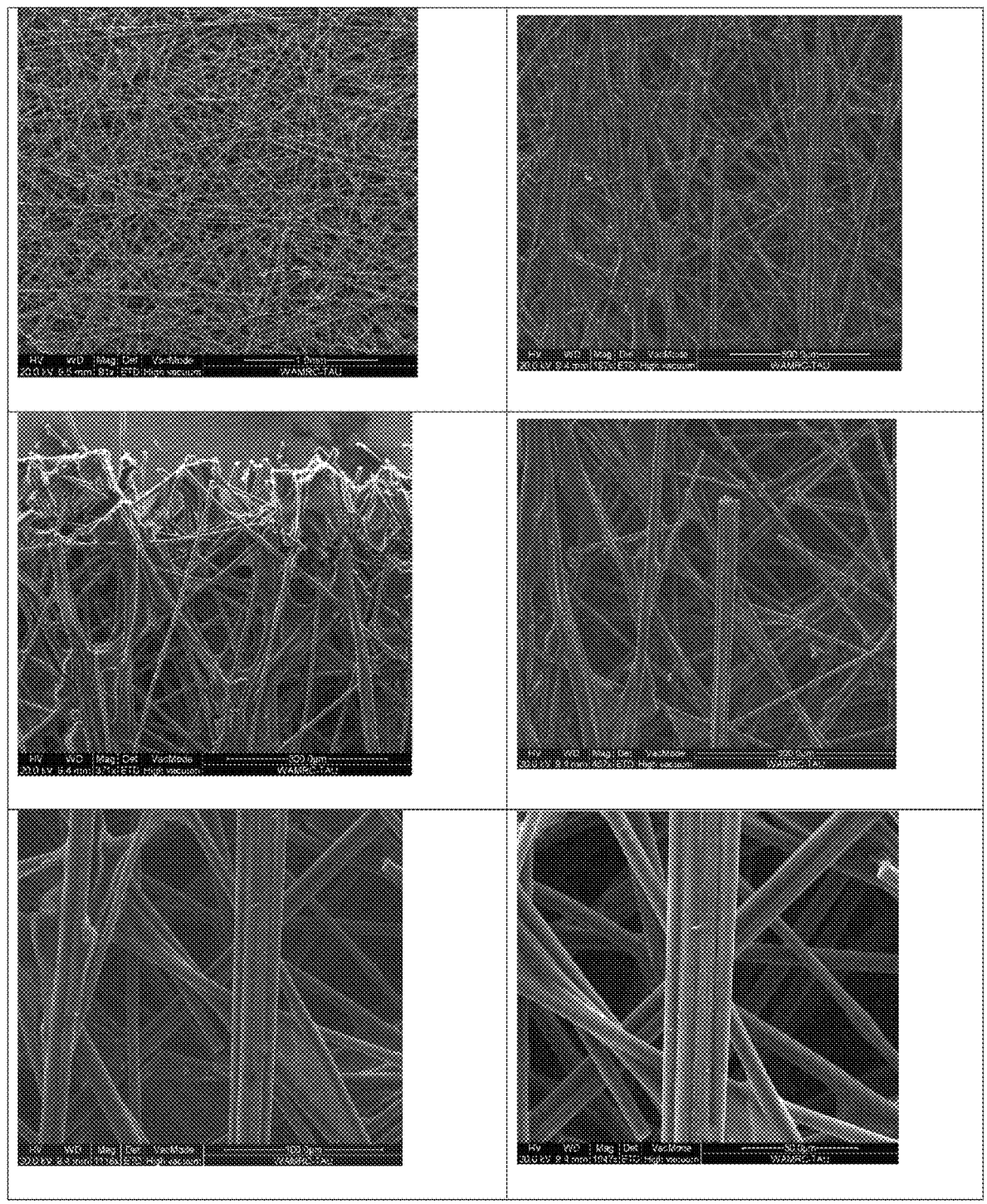

FIG. 7 presents scanning electron microscope images (secondary electrons images) of micro-carbon-fibers electrode (0.18 mm thick, type SPECTRACARB 2050A-1050). The images were taken at 20 kV, 10 mm distance, and high vacuum mode, in various magnifications.

Figure 24:
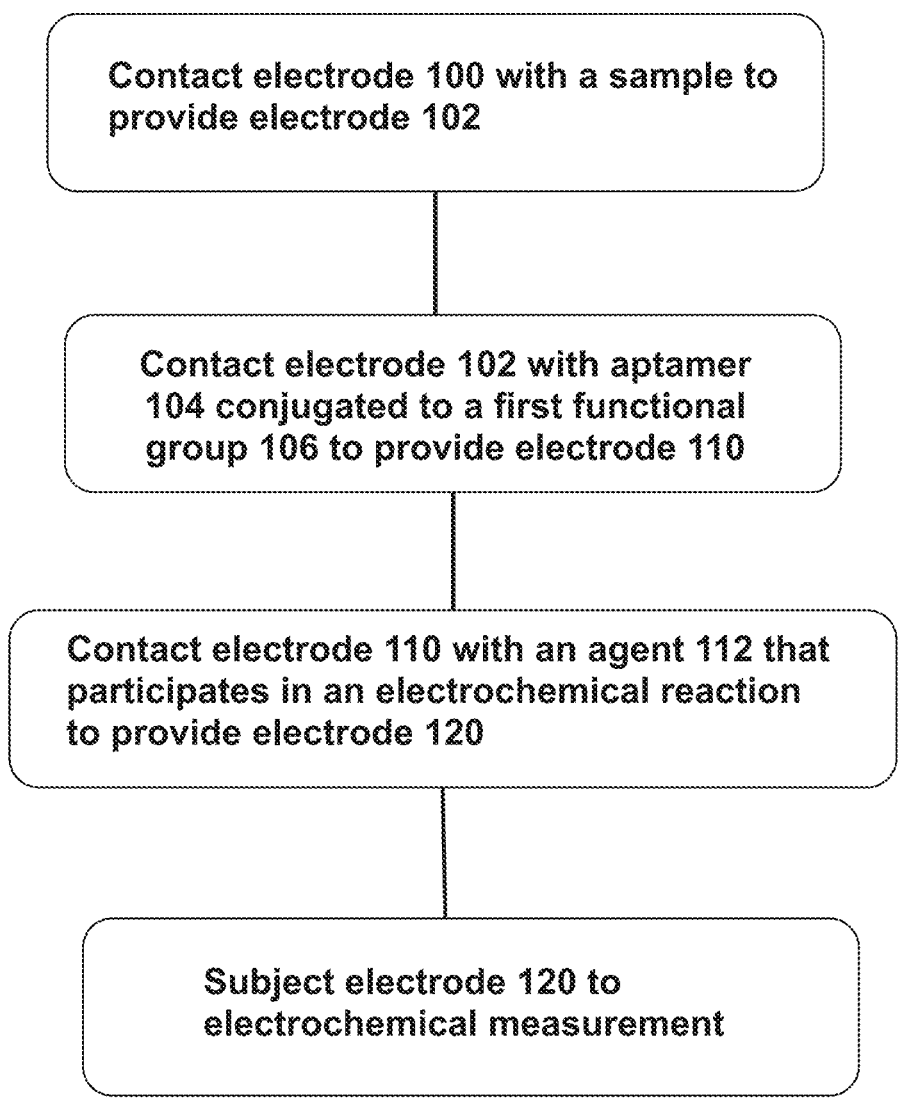

FIG. 8 presents light microscope images: Bright-field and dark-field images, of the micro-carbon-fiber electrode, performed at various magnifications, after 3 minutes of sampling the surrounding of soybean rust sample, using the above homemade air sampling system, at a pace of 10 liters/minute.

FIGS. 9A-C present Scanning electron microscope images (secondary electrons images) of soybean rust on the micro-carbon-fibers electrode, after 3 minutes of sampling the surrounding of soybean rust sample, using the homemade air sampling system shown in FIGS. 2A-B, at a pace of 10 liters/minute, at two magnifications (FIGS. 9A and 9B), and the secondary electron images vis-à-vis corresponding images of back-scattered electrons (FIG. 9C). Before the images were taken, a deposition of 4 nm gold/palladium had been performed on the samples. The images were taken at 20 kV, 10 mm distance, and high vacuum mode.

FIG. 10 (Background Art) presents the dependence of the specific activity (α) of alkaline phosphatase from bovine intestine on the enzyme concentration in (1) borate buffer, (2) HEPES, (3) glycine buffer, (4) carbonate buffer, and (5) Tris; pH 8.5., as taken from L. F. Atyaksheva et al., *Russian Journal of Physical Chemistry A,* 2008, Vol. 82, No. 11, pp. 1947-1951.

FIG. 11 presents the cyclic voltammograms obtained for the alkaline phosphatase substrate (p-nitrophenyl phosphate) in a carbonate buffer as presented above, on the modified micro-carbon-fibers electrode (having the alkaline phosphatase attached to the aptamer that binds the spores absorbed to the electrode's surface. A concentration-dependent signal was obtained for substrate's concentrations ranging between 0-500 ppm, and the current peak was received at 0.350 V and −0.950 V.

FIG. 12 presents cyclic voltammetry measurement of 10 cycles (scan 1-scan 10). The background solution was based on a carbonate buffer as described hereinabove (pH=9.5), with the addition of 500 ppm p-nitrophenyl phosphate (the substrate). The micro-carbon-fiber electrode adsorbed 10 units of alkaline phosphatase before the measurements started. The enzymatic activity of alkaline phosphatase on the micro-carbon-fibers electrode presented in FIG. 12 show that the signal increases with time, due to the enzymatic conversion of p-nitrophenyl phosphate to p-nitrophenol. The peaks are reversible, as expected (0.065 V and −0.165 V).

FIG. 13 presents cyclic voltammograms of the alkaline phosphatase substrate in the presence of carbon electrode that absorbed 10 units of alkaline phosphatase enzyme, showing the electrochemical background of the carbonate buffer (blue), the 500 ppm of alkaline phosphatase substrate (p-nitrophenyl phosphate; green), and the 500 ppm of alkaline phosphatase substrate in the presence of carbon electrode that absorbed 10 units of alkaline phosphatase enzyme (red).

FIGS. 14A-B present an exemplary electrochemical setup before (FIG. 14A) and after (FIG. 14B) the enzymatic reaction of alkaline phosphatase modified micro-carbon-fibers electrode with 500 ppm p-nitrophenyl phosphate (the substrate) in buffer carbonate, pH=9.5.

FIG. 15A presents the detection limit of p-nitrophenol using cyclic voltammetry analysis in the tested carbonate buffer. Only the second scan of each cyclic voltammetry measurement is shown. The detection limit in the electrochemical setup shown in FIG. 14 is 0.5 ppm (the red line).

FIG. 15B presents the calibration curve of p-nitrophenol using cyclic voltammetry analysis in a carbonate buffer as described herein.

FIGS. 15C-D present the cathodic peaks at −0.070V Vs p-nitrophenol concentration (FIG. 15C) and the anodic peaks at 0.070V Vs p-nitrophenol concentration (FIG. 15D).

FIG. 16 presents the second scan of the cyclic voltammetry performed with biotinylated silica beads. The orange plot represents the background measurement and the red plot represents the detection of silica beads.

FIG. 17 (Background Art) is a schematic illustration describing the selection of aptamers according to the SELEX methodology, taken from Song. et al Anal. Chem. 2008.

FIGS. 18A-B are bar graphs showing the fluorescence intensities following the incubation of FAM-anchor-candidates (a) and the elution of the bound fractions (b) with *Phakopsora pachyrhizi* (Pp) spores (FIG. 18A) and with the negative control spores (FIG. 18B). cdt=candidate [cdt00=SP000=SP00=SEQ. ID NO: 8; cdt01=SP001=SP01=SEQ ID NO:9; cdt02=SP002=SP02=SEQ ID NO:10; cdt03=SP003=SP03=SEQ ID NO:11; cdt04=SP004=SP04=SEQ ID NO:12; cdt05=SP005=SP05=SEQ ID NO:13; cdt06=SP006=SP06=SEQ ID NO:14; cdt13=SP013=SP13=SEQ ID NO:15; cdt14=SP014=SP14=SEQ ID NO:16; cdt15=SP015=SP15=SEQ ID NO:17; cdt18=SP018=SP18=SEQ ID NO:18].

FIG. 19 is a schematic illustration of a suggested secondary structure arrangement of T(50)-T(66) region of the candidate SP000 (SP00; SEQ ID NO:8) as a quadruplex.

FIGS. 20A-B present the predicted secondary structures of aptamers SP02 (SEQ ID NO:10; FIG. 20A) and SP13 (SEQ ID NO:15; FIG. 20B), obtained in mFold secondary structure studies. The G blocks are highlighted in yellow and the primer regions in pink. The sites of truncation are indicated in green.

FIG. 21 is a bar graph showing the fraction of aptamer variants associated to *Phakopsora pachyrhizi* (Pp) urediniospores, evaluated by fluorescence measurement (λExc: 585 nm; λEm: 635 nm).

FIG. 22 presents the second scan of the cyclic voltammetry of an exemplary carbon electrode according to the present embodiments, having a biotinylated aptamer having SEQ ID NO:17 and an alkaline phosphatase having strepavidin conjugated thereto attached thereto, upon pumping lab air for 1 minute (Background; blue line), air pumping a sample containing rust spores for 1 minute (rust, red line), and air pumping a sample containing powdery mildew spores for 1 minute (control; green line). Air pumping was performed prior to the attachment of the aptamer and the alkaline phosphatase. Reference electrode—Ag/AgCl.

FIG. 23 is a simplified schematic presentation of an exemplary system for detecting the presence, amount and/or type of the pathogenic organism in and/or on a substrate according to some of the present embodiments.

FIG. 24 is a simplified flow chart presenting an exemplary method according to some of the present embodiments.

Figure 25:
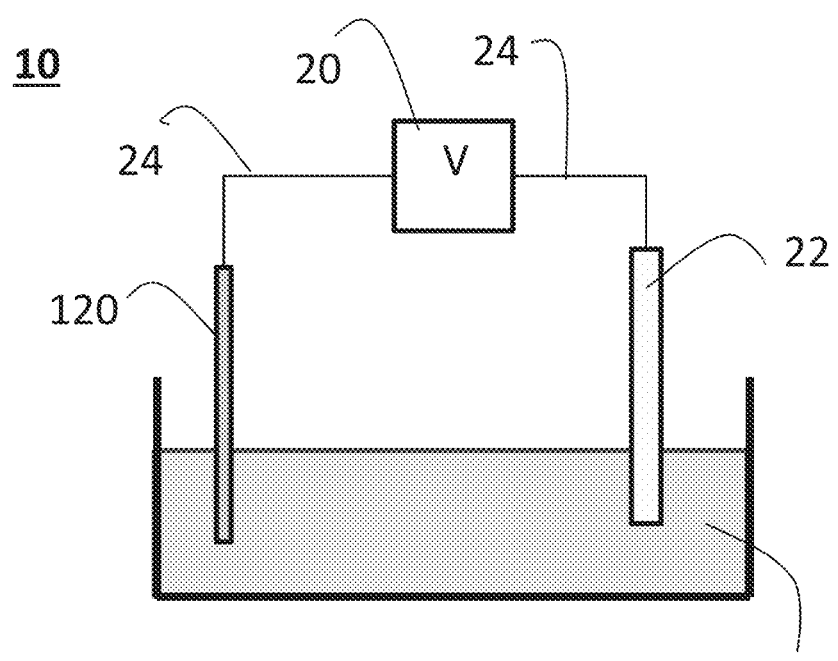

FIG. 25 is a simplified schematic presentation of an exemplary electrochemical cell according to some of the present embodiments.

DESCRIPTION OF SPECIFIC EMBODIMENTS OF THE INVENTION

The present invention, in some embodiments thereof, relates to electrochemical sensing and, more particularly, but not exclusively, to a method and system for electrochemically detecting a presence, amount and/or type of a pathogenic organism (e.g., pathogenic microorganism) in substrates such as agricultural substrates, which are usable for determining a presence and/type of a disease associated with the pathogenic organism in the substrate. In some embodiments, the present invention relates to agriculture, and, more particularly, but not exclusively, to a method and system for electrochemically detecting a presence, amount and/or type of pathogenic microorganisms such as rust fungus in plants, which are usable for determining a presence and/type of a disease associated with the pathogenic microorganism in the substrate.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The development of simple, straightforward, rapid and cost-effective reusable sensing devices is of imperative importance in the field of agriculture, and there is a widely recognized need in improved methodologies for on-site fast real-time ultra-sensitive detection of plant pathogens such as rust fungi pathogens.

The present inventors have devised and successfully practiced a novel methodology that enables performing a simple electrochemical sensing of pathogenic organisms or portions thereof, for example, pathogenic microorganisms such as rust fungi, with ultrahigh-sensitivity, high selectivity, fast detection turnover, and cost-effective characteristics.

This methodology preferably utilizes electrodes featuring high surface area, for collecting, e.g., by adsorption and pre-concentration of, the pathogenic species from samples such as air samples, to which an aptamer that selectively binds the pathogenic species are attached. The presence of the aptamer, which is indicative of the presence and, optionally and preferably, the type of the pathogenic species, is then determined electrochemically, by a sequence of interactions that generate electrochemically detectable agents.

The present inventors have assembled homemade air sampler and electrochemical assembly as shown FIGS. 1, 2A-B and 14A-B and demonstrated that these simple, homemade devices successfully perform in practicing a method as described herein.

The present inventors have further investigated the absorption of soybean rust fungus to various electrodes and have shown a successful absorption and characterization by microscopic measurements, as shown in FIGS. 3-9B.

FIGS. 10-13 and 15A-D present cyclic voltammetry measurements showing electrochemical detection of alkaline phosphatase is the presence of a substrate thereof.

FIG. 16 present cyclic voltammetry measurements showing a successful electrochemical detection of biotinylated materials.

FIGS. 17-21 show the utilization of SELEX methodology for identifying oligonucleotide aptamers selective for soybean rust fungus (e.g., *Phakopsora pachyrhizi*).

FIG. 22 present cyclic voltammetry measurements showing a successful selective electrochemical detection of soybean rust fungus using the methodology described herein.

Schematic illustrations of a system and method usable in implementing the methodology described herein are presented in FIGS. 23-25.

Embodiments of the present invention relate to a method of detecting a presence, amount and/or type of a pathogenic organism in a substrate.

The method, according to the present embodiments, comprises:

contacting a sample suspected as containing the pathogenic organism or a portion thereof with an electrode, thereafter contacting the electrode with an aptamer that selectively binds to said pathogenic organism or said portion thereof, thereafter contacting the electrode with an agent that participates in an electrochemically detectable reaction, and thereafter perform the electrochemical reaction while using the electrode. The electric signal produced by the reaction is indicative of a presence and/or amount of the pathogenic organism or the portion thereof, as defined herein.

Embodiments of the present invention further relate to a sensing system and kits usable for practicing the method, and use of the method for determining on a suitable agent for reducing a load of a pathogenic organism (e.g., pathogenic microorganism) in a substrate.

Method

According to an aspect of some embodiments of the present invention, there is provided a method of detecting a presence, an amount and/or a type of a pathogenic organism in a sample and/or a substrate.

According to some embodiments, the method described herein is of detecting a presence of a pathogenic organism in a sample.

According to some embodiments, the method described herein is of detecting a presence and a type of a pathogenic organism in a sample.

According to some embodiments, the method described herein is of detecting a presence of a specific type of a pathogenic organism in a sample.

According to some embodiments, the method is of determining if a certain type of a pathogenic organism is present in a sample.

According to some of any of these embodiments, the method is further of determining an amount of the pathogenic organism (e.g., a certain type of an organism) in a sample.

According to some of any of these embodiments, the method is indicative of a presence and/or type and/or amount of the pathogenic organism in a substrate from which the sample is derived, as is described in further detail hereinunder.

The method as described herein is usable for detecting a presence and/or amount (level) of a certain pathogenic organism (referred to herein as the pathogenic organism to be detected) in a sample, and can be manipulated as desired so as to be usable for detecting any pathogenic organism by selecting a suitable aptamer, as described in further detail hereinafter.

According to some of any of the embodiments described herein, the method generally comprises:

contacting a sample suspected as containing the pathogenic organism or a portion thereof, as described herein in any of the respective embodiments, with an electrode (also presented herein as electrode 100), as described herein in any of the respective embodiments, to thereby absorb the pathogenic organism or the portion thereof, if present in the sample, to at least a portion of a surface of the electrode, to thereby obtain an electrode having at least a portion of the pathogenic organism absorbed to a surface thereof (also presented herein as electrode 102);

subsequent to contacting the sample, contacting the electrode (electrode 102) with an aptamer (also referred to herein as aptamer 104) that selectively binds to the pathogenic organism or the portion thereof;

subsequent to contacting the aptamer, contacting the electrode (also referred to herein as electrode 110) with an agent that participates in an electrochemically detectable reaction (also referred to herein as agent 112); and subsequent to contacting the agent 112, performing an electrochemical reaction in the presence of the electrode (also referred to herein as electrode 120), wherein an electric signal produced by the reaction is indicative of a presence and/or amount of the agent that participates in an electrochemically detectable reaction (agent 112), and is thereby indicative of a presence and/or amount of the pathogenic organism or the portion thereof in the sample.

Referring now to FIG. 24, which presents an exemplary method according to some of the present embodiments, the method starts by contacting electrode 100, as described herein in any of the respective embodiments, with a sample as described herein in any of the respective embodiments.

The contacting can be performed with a sample in a liquid, solid or gaseous state.

When the sample is liquid, the liquid is probably a suspension or dispersion of the pathogenic organism or a portion thereof in a carrier, and the contacting comprises, for example, dipping the electrode in the liquid sample, or dripping the liquid sample on the electrode, or any other procedure that enables contact between the liquid sample and the electrode.

When the sample is solid or gaseous, the contacting can be performed by pumping (e.g., air-pumping) the sample, which can be performed by means of, for example, an air-pump, including hand-held, portable or non-portable air pumps, such as described hereinunder.

As described in the Examples section that follows, the present inventors have demonstrated that contacting a sample containing a pathogenic microorganism with a carbon electrode as described herein in some of the respective embodiments by air pumping results in absorption of the microorganism to the electrode, and have demonstrated several imaging techniques that allow detection and identification of the microorganism when absorbed to the electrode.

According to some of any of the embodiments described herein, the method further comprises, subsequent to contacting the electrode (electrode 100) with the sample, employing an imaging technique to thereby determine a presence or absence of a pathogenic organism or the portion thereof on a surface of the electrode.

According to some embodiments, the imaging technique comprises light microscopy and/or scanning electrode microscopy, as described, for example, in Example 1 in the Examples section that follows.

Upon contacting the electrode with the sample, electrode 102 is obtained. If a pathogenic organism or a portion thereof are present in a sample, electrode 102 is to be regarded as electrode 100 having a pathogenic organism or the portion thereof absorbed to at least a portion of the electrode's surface. The pathogenic organism or a portion thereof can be the pathogenic organism that is to be detected by the method, or any other organism (pathogenic and/or non-pathogenic) that is present in the sample. If the sample does not contain a pathogenic organism, or any other organism, electrode 102 can be either identical to electrode 100 (since nothing is absorbed to its surface), or can have absorbed to its surface non-animate objects or species that are present in the sample. In any case, electrode 102 can further comprise animate and non-animate species absorbed thereto as a result of the contacting, in addition to the pathogenic organism to be detected (if present in the sample).

Once electrode 102 is generated upon contacting the sample, the electrode is contacted with an aptamer (e.g., aptamer 104) as described herein in any of the respective embodiments and any combination thereof. In some of any of the embodiments described herein, aptamer 104 has a first functional group conjugated thereto (which is also referred to herein as functional group 106), as exemplified in FIG. 24.

As described in further detail hereinafter, aptamer 104 is designed so as to selectively bind to at least a portion of the pathogenic organism to be detected.

Once electrode 102 contacts the aptamer (aptamer 104), electrode 110 is obtained.

If electrode 102 has the pathogenic organism to be detected, or a portion thereof, absorbed to its surface, electrode 110 has aptamer 104 associated with this pathogenic organism or portion thereof. However, if electrode 102 does not have the pathogenic organism to be detected, or a portion thereof, absorbed to its surface, but rather has other pathogenic or non-pathogenic organisms or portions thereof, and/or non-animate objects or species, absorbed to its surface, then electrode 110, formed upon contacting aptamer 104, is substantially identical to electrode 102, since aptamer 104 does not associate or bind to species other than the pathogenic organism to be detected.

Electrode 110 is then contacted with an agent that participates in an electrochemical reaction (also referred to herein as agent 112), as described herein in any of the respective embodiments and any combination thereof, to provide electrode 120.

Agent 112 and aptamer 104 are selected such that agent 112 selectively interacts with aptamer 104.

In some of any of the embodiments described herein, aptamer 104 has a first functional group (functional group 116) conjugated thereto and agent 112 comprises a second functional group (which is also referred to herein as functional group 118, not shown in FIG. 24). The second functional group (functional group 118) is chemically compatible with the first functional group (functional group 116), and interacts therewith, that is, becomes associated with the first functional group, if the first functional group (functional group 116) is present in electrode 110 (that is, if aptamer 104 is present in electrode 110.

By "chemically compatible" it is meant that the first and second functional groups are capable of chemically interacting with one another via one or more of hydrogen bond interaction, aromatic interaction, electrostatic interactions, organometallic interactions, stearic interactions and covalent bonds. In some embodiments, the functional groups can interact therebetween so as to form one or bonds such as hydrogen bonds, ionic bonds, and/or covalent bonds.

In some of any of the embodiments described herein, the second functional group (functional group 118) selectively interacts (e.g., via any of the chemical interactions described herein) with the first functional group (functional group 116), such that the second functional group (functional group 118) interacts, as described herein, selectively with the first functional group (functional group 116) and not with any other chemical group that may be a part of electrode 110.

By "selectively interacts" it is meant that the second functional group (functional group 118) interacts with the first functional group (functional group 116) at a much higher level than with other, even structurally or functionally similar, chemical groups or species.

In some embodiments, a selective interaction between the first and second functional groups means that a dissociation constant between the first and second functional groups is lower by at least one order of magnitude, optionally by two or three orders of magnitude, then a dissociation constant between the second functional group and any other chemical group or species that may be a part of (e.g., present on the surface of) electrode 110.

In some embodiments, the second functional group is such that a has binding affinity with the first functional group that is characterized by a dissociation constant, Kd or $K_D$, of no more than 1 mM, or no more than 100 nM, or no more than 10 nM, or no more than 1 nM, or no more than $10^{-10}$ M, or no more than $10^{-12}$ M, and even lower, e.g., as low as $10^{-15}$ M.

Herein and in the art, a dissociation constant, $K_D$ represents: $[A] \times [B]/[AB]$, wherein A is a first member of a pair (e.g., a first functional group as described herein, and B is a second member of pair (e.g., a second functional group as described herein). At a low dissociation constant, the concentrations of the free components, [A] and [B] is much lower than the concentration of the pair thereof [AB].

The interaction between the first and second functional groups (or the aptamer 104 and agent 112) can be reversible or irreversible.

In some of any of the embodiments described herein, the first and second functional groups form an affinity pair, as defined herein.

In some embodiments, the first and second functional groups form an affinity pair, characterized by a dissociation constant $K_D$ as described herein.

Exemplary affinity pairs include, without limitation, an enzyme-substrate pair, a polypeptide-polypeptide pair (e.g., a hormone and a receptor, a ligand and a receptor, an antibody and an antigen, two chains of a multimeric protein), a polypeptide-small molecule pair (e.g., avidin or streptavidin with biotin, enzyme-substrate), a polynucleotide and its cognate polynucleotide such as two polynucleotides forming a double strand (e.g., DNA-DNA, DNA-RNA, RNA-DNA), a polypeptide-polynucleotide pair (e.g., a complex formed of a polypeptide and a DNA or RNA e.g., aptamer or of complementary peptide nucleic acid and oligonucleotide), a polypeptide-metal pair (e.g., a protein chelator and a metal ion), a polypeptide and a carbohydrate (leptin-carbohydrate), and the like.

In the context of the present embodiments, one member of an affinity pair is a first functional group (functional group 116) and the other is the second functional group (functional group 118).

In some of any of the embodiments described herein, the affinity pair is an avidin-biotin pair or a streptavidin-biotin pair, such that one of the first and second functional groups is avidin or strepavidin, and the other is biotin.

In some of these embodiments, the first functional group (functional group 116) is biotin, such that aptamer 104 has biotin conjugated thereto, and the second functional group (functional group 118) is avidin or streptavidin, such that agent 112 has avidin or streptavidin conjugated thereto.

Thus, if the pathogenic microorganism to be detected in absorbed to the electrode's surface in electrode 102, and hence aptamer 104 is associated with the pathogenic microorganism and is present in electrode 110, then electrode 120 has agent 112 in a selective chemical interaction with aptamer 104. If electrode 110 does not have aptamer 104 associated therewith (since the pathogenic organism or a portion thereof is not present in the sample and hence not present in electrode 102), electrode 110 does not have the first functional group 116, and then agent 112, even if it binds to electrode 110, easily dissociates therefrom and is not present in electrode 120.

Electrode 120 can now be used for electrochemically detecting the presence and/or amount of agent 112, as described hereinunder in further detail, which is indicative of the presence and/or amount of aptamer 104, and hence of the presence and/or amount of the pathogenic organism to be detected.

According to some of any of the embodiments described herein, contacting the electrode (electrode 100) with the aptamer (aptamer 104) comprises contacting the electrode (electrode 102) with the aptamer per se, or with a solution (e.g., an aqueous solution) containing the aptamer.

In some of any of the embodiments described herein, the aqueous solution is a buffer solution, and in some embodiments, the buffer solution is substantially the same (e.g., has a chemical composition that is at least 90% the same) as the buffer solution used while selecting the aptamer.

In some of any of the embodiments described herein, the aqueous solution is a buffer solution, and in some embodiments, it is a carbonate buffer solution featuring an alkaline pH, e.g., a pH of at least 8, e.g., of from 8 to 14, preferably, from 8 to 12, preferably from 8 to 11, preferably from 8 to 10, for example, of about 9 or about 9.5.

In some of any of the embodiments described herein, the aqueous solution is a carbonate buffer solution featuring an alkaline pH, as described hereinunder in any of the respective embodiments and any combination thereof.

Generally, the aqueous solution is selected so as not to interfere with the binding of the aptamer to the pathogenic organism or the portion thereof and/or not to interfere with the absorption of the pathogenic organism or the portion thereto to the electrode's surface.

In some of any of the embodiments described herein in the context of an aqueous solution containing the aptamer, a concentration of the aptamer in an aqueous solution can range from about 1 nM to about 100 mM, or from about 100 nM to about 100 mM, or from about 100 nM to about 10 mM, or from about 100 nM to about 1 mM, or from about 100 nM to about 600 nM, or from about 1 nM to about 1 mM, including any intermediate value and subranges therebetween.

According to some of any of the embodiments described herein, contacting the electrode (electrode 110) with an agent that participates in the electrochemically detectable reaction (agent 112) comprises contacting the electrode (electrode 110) with a solution containing this agent (agent 112).

In some of these embodiments, the solution is an aqueous solution, and in some embodiments, it is a solution that stabilizes agent 112.

In some of these embodiments, the solution is a carbonate buffer solution, and in some embodiments, it is a carbonate buffer solution featuring an alkaline pH, as described herein in any of the respective embodiments.

Generally, the aqueous solution is selected so as not to interfere with the binding of agent 112 to the aptamer and/or of the aptamer to the pathogenic organism or the portion thereof and/or not to interfere with the absorption of the pathogenic organism or the portion thereto to the electrode's surface.

In some of any of the embodiments described herein in the context of an aqueous solution containing agent 112, a concentration of agent 112 in an aqueous solution can range from about 10 nM to about 1M, including any intermediate value and subranges therebetween.

In some of any of the embodiments described herein in the context of an aqueous solution containing agent 112, a concentration of agent 112 in an aqueous solution can range from about 10 ng/ml to about 100 mg/ml, or from about 20 ng/ml to about 20 mg/ml, or from about 100 ng/ml to about 100 mg/ml, or from about 100 ng/ml to about 50 mg/ml, or from about 1 mg/ml to about 50 mg/ml, including any intermediate value and subranges therebetween.

In some embodiments, the buffer used when contacting aptamer 104 with electrode 102, and the buffer used when contacting agent 112 with electrode 110 are the same.

According to some of any of the embodiments described herein, the electrode is washed after contacting the sample, and/or after contacting the aptamer, and/or after contacting the agent 112.

In some embodiments, electrode 110 is washed after contacting aptamer 104 or a solution containing the aptamer, and before it contacts agent 112 or a solution containing same. In some of these embodiments, electrode 110 is washed with the same solution described herein for containing aptamer 104.

Such a washing is desirable so as to assure that aptamer 104 does not remain on electrode 110 in case the pathogenic organism to be detected, or a portion thereof, is not present in electrode 102.

In some embodiments, electrode 120 is washed after contacting agent 112 or a solution containing the aptamer, and before it is subjected to an electrochemical reaction. In some of these embodiments, electrode 120 is washed with the same solution described herein for containing agent 112.

Such a washing is desirable so as to assure that agent 112, even if it interacts with groups or species in electrode 120 other than aptamer 104, does not remain on electrode 120 in case aptamer 104 is not present in electrode 110, and thereby assure that agent 112 does not remain on electrode 120 in case the pathogenic organism to be detected or a portion thereof is not present in the electrode.

Thus, when electrode 120 is subjected to an electrochemical reaction, an electric signal generated by this reaction means that electrode 120 has agent 112 associated therewith, which means that electrode 120 also has aptamer 104 associated therewith, which means that electrode 120 also has the pathogenic organism to be detected or a portion thereof associated therewith, which means that the sample contained the pathogenic organism to be detected or a portion thereof.

If no electric signal is generated, it means that the sample did not contain the pathogenic organism or a portion thereof.

Electrode 120 as described herein in any of the respective embodiments, is also referred to herein as "sensing electrode", which can be subjected to electrochemical measurement/detection/sensing, preferably when integrated in an electrochemical cell or a system as described herein in any of the respective embodiments.

Once electrode 120 is generated (after contacting agent 112 or a solution containing same, and optionally being washed, e.g., as described herein), electrode 120 is subjected to an electrochemically detectable reaction, as described herein. In some of these embodiments, electrode 120 can be contacted with an electrochemically detectable agent 122 (not shown), as described herein in any of the respective embodiments and any combination thereof, preferably with a solution containing agent 122, and electrochemical measurement is performed.

By "electrochemical reaction" it is meant a chemical reaction that involves a change in the electronic state of one or more substances that participate in the reaction, that is, acceptance or donation of electrons, which occurs in response to potential application.

By "electrochemical measurement" it is meant applying a potential to the electrode, and measuring an electric parameter in response to the potential application. If a change in the electric parameter occurs in response to potential application, the electrochemical measurement is indicative of a presence of an electrochemical reaction, and thereby of a presence of an electrochemically reactive substance.

By "electrochemically detectable reaction" it is meant a reaction that can be detected by electrochemical measurement, namely, a reaction that can be detected by a change of an electric parameter in response to potential application, that is, a reaction that produces and/or consumes an electrochemically reactive substance as described herein.

By "electrochemically reactive substance" it is meant a substance that generates (donates) electrons or accepts (consumes) electrons in response to potential application.

An electrochemically reactive substance is typically a redox reactive substance, that undergoes reduction or oxidation in response to application of a potential lower than 5 Volts, or lower than 3 Volts, or lower than 2 Volts.

By "electrochemically detectable agent" it is meant an electrochemically reactive substance as described herein or a substance that produces or consumes an electrochemical reactive substance.

Further description of embodiments pertaining to an electrochemically detectable reaction, and an electrochemically detectable agent is provided hereinunder.

In some embodiments, the electrochemical reaction or detection is effected by contacting a sensing electrode as described herein in any of the respective embodiments (electrode 120) with a solution that comprises an electrochemically detectable agent 122, and applying a potential to the sensing electrode.

In some embodiments, the electrochemical reaction or detection is further effected by measuring an electrochemical parameter upon applying the potential to the sensing electrode (electrode 120), and in some embodiments, the electrochemical parameter is an electrical current generated at the sensing electrode or a change in the electrical current at the sensing electrode. As described herein, a presence and/or level of the electrochemical parameter or of the change in the electrochemical parameter is indicative of a presence and/or level of the pathogenic organism or a portion thereof in the sample.

In some embodiments, the sensing electrode forms a part of an electrochemical cell as described herein in any of the respective embodiments, or a part of a sensing system as described herein in any of the respective parameters, and contacting the sensing electrode (electrode 120) with agent 122 is effected by introducing the electrode to an electrochemical cell or system, as described herein, that comprises agent 122 in a solution as described herein (e.g., with an electrolyte solution that comprises agent 122).

In some embodiments, applying a potential to the sensing electrode is performed immediately after contacting the sensing electrode with agent 122 or a solution containing same (e.g., with an electrolyte solution that comprises agent 122).

In some embodiments, the sensing electrode forms a part of an electrochemical cell as described herein and applying the potential is performed by applying a voltage between the sensing electrode and a reference electrode.

In some embodiments, the potential is a varying potential.

In some embodiments, measuring an electrochemical parameter is by voltammetry. Voltammetry measurements are also referred to in the art as potentio static electrochemical analyses.

As known in the art, voltammetry experiments are conducted for obtaining information (e.g., presence, identity and/or level) of an analyte by measuring a generated current or a change in the current in response to application of a varying potential.

In order to obtain a quantitative measurement of an analyte (e.g., a redox reactive substance produced or consumed by the electrochemically detectable reaction) by potentiostatic electrochemical analysis, the amount of electrons used for the reduction/oxidation of the analyte should be monitored. In thermodynamic equilibrium the ratio of the redox-reactive species at the surface of the electrode can be obtained by Nernst equation:

$$E = E^0 + \frac{2.3RT}{nF} \log\left(\frac{C_O}{C_R}\right)$$

Where $C_O$ is the concentration of the oxidized form, and $C_R$ is the concentration of the reduced form, E is electrode potential, $E^0$ is standard electrode potential, R is the gas constant $$\left(8.314 \frac{J}{K\text{mol}}\right),$$

T is the temperature (Kelvin scale), n is the number of electrons participate in the redox reaction and F is the Faraday constant (96,487 coulombs).

The entire measured current is composed of Faradic currents and non-Faradaic charging background current. The Faradic current obtained by the electrochemical reaction behaves according to Faraday's low, which means that 1 mole of redox active substance will involve a charge change of n×96,487 coulombs.

The information retrieved by voltammetry experiments, in its simplest form, is obtained as a voltammogram of I=f(E).

A voltammogram is a current versus potential curve used to describe the analyte's electrochemical reaction performed at the electrode as a result of the applied potential, and its derived current. It may have a complicated multi-stepped shape according to the complexity of the chemical reaction.

In some embodiments, and depending on the type of voltammetry used, the potential is varied continuously or stepwise or in pulses.

Exemplary potentials that can be applied to a sensing electrode as described herein typically range from 0 to about −2 Volts.

Voltammetry experiments can be categorized as linear sweep voltammetry and cyclic voltammetry.

Cyclic voltammetry is the process of electrochemical analysis in which the applied voltage is of a multi or mono-triangular shape. The resulting plot of current versus linear triangular potential scan of the working electrode is called cyclic voltammogram, while the plot of current versus linear potential scan of the working electrode is called linear sweep voltammogram. Cyclic voltammetry is usually the preliminary process used to determine the reduction potential of an analyte, the media's influence and the thermodynamics, as well as kinetics, of the electrochemical reaction.

In response to the triangular shaped potential, the measured current of the electrochemical cell that contained initially only the oxidized species, gradually increases up to a sharp peak at $E_{p[red]}$, followed by current decrease when most species adjacent to the electrode surface are reduced. When reversing the potential's direction, a gradual increase of current at the opposite direction ends in a sharp peak at $E_{p[ox]}$, where the chemical reaction proceeds to the opposite direction towards the oxidized form. When most species adjacent to the electrode surface are oxidized, the current decreases until the point of potential reverses, and so on.

Since an electrochemical reaction is located at the interface between the working electrode and the electrolyte solution, the reduced and oxidized species causing the sharp peaks of the voltammogram are concentrated to a narrow diffusive layer adjacent to the electrode. As a result, the shape of the curve's peak depends on the rate of diffusion. The peak's incline correlative to the concentration of electroactive particles on the electrode's surface, while the sharp decline depends solely on time, and results from the absence of electroactive particles near the surface due to limited diffusion.

In order to increase the sensitivity of voltammetric measurements, the share of the Faradic currents in the obtained voltammogram can be increased on the expense of the nonfaradaic background current. Such alterations are enabled by applying a series of short duration potential steps (each last for several milliseconds) in a technique termed "pulse voltammetry". At the end of each potential step, two different current decay rates are obtained: sharp exponential decay to a negligible level is characteristic to the charging current, while slower decay is typical to the Faradic current. By recording the current's signal at the later regime, more of the signal is attributed to the Faradic current, while the contribution of the charging current is negligible. The differential pulse voltammogram is obtained from the subtraction of the pre-pulse current from the current that is obtained after the pulse is switched off, plotted against the applied potential. The corresponding sensitivity is thereby increased. The differential pulse voltammetry techniques vary by the shape of the applied potential waveform, and the current sampling technique.

Alongside increased sensitivity, differential pulse voltammetry allow the detection of two different analytes with similar redox potentials, by analysis of the peak's width according to the number of electrons that participate in their redox reaction. Exemplary values used for differential voltammetry measurements are 25-50 mV for current pulse amplitudes and 5 mV/second for the scan rate, while steeper amplitudes and faster scan rates are also contemplated.

In some of any of the embodiments described herein, the potential is a differential pulse varying potential.

In some of any of the embodiments described herein, an electrochemical parameter measured in a method as described herein is a change in electrical current relative to a derivative of the applied potential, although any other voltammogram is contemplated.

In some of any of the embodiments described herein, the measured electrochemical parameter is processed by a signal processor, as described herein in any of the respective embodiments, to thereby determine a presence and/or a level (amount) of the pathogenic organism to be detected, in the sample.

In some of any of the embodiments described herein, the method further comprises, prior to contacting the sensing electrode with agent 122 or a solution containing same (e.g., electrolyte), measuring an electrochemical parameter as described herein of electrode 100 when contacted with agent 122 or a solution containing same, or measuring an electrochemical parameter as described herein of electrode 120 which was generated upon contacting electrode 100 with a sample that does not contain a pathogenic organism. Preferably, electrode 100 is subjected to the steps producing electrode 102, for example contacting the same liquid as in a liquid sample, but without a pathogenic organism, or the same air, as in a solid or gaseous sample, but without a pathogenic organism, and then electrode 102 is subjected to the same sequential steps for providing electrode 120. For each of the above options, the measurement of the electrochemical parameter measures a background or control signal, which is provided by an electrode that does not have the pathogenic organism or the portion thereof absorbed thereto. In some embodiments, upon measuring the electrochemical parameter resulting from contacting sensing electrode 120 and the sample, the background signal is subtracted from the measured electrochemical parameter.

In some of any of the embodiments described herein, the method further comprises, subsequent to measuring the electrochemical parameter, applying an opposite potential to the sensing electrode, to thereby regenerate the electrode.

Upon being subject to the electrochemical reaction, electrode 120 can be washed and contacted again with agent 122 or a solution containing same (e.g., with an electrolyte solution that comprises agent 122).

In case where the electrochemical reaction resulted in no indication of a presence of the pathogenic organism to be detected, the electrode can be re-used as electrode 100, and contact a different sample, repeatedly, until a positive detection of the pathogenic organism is obtained.

Electrode

According to some of any of the embodiments described herein, the electrode (e.g., electrode 100 as described herein) is a gas-permeable electrode, for example, an air permeable electrode.

According to some of any of the embodiments described herein, contacting the electrode (e.g., electrode 100 as described herein) with the sample is by air-pumping an environment surrounding the sample or a substrate as described herein.

According to some of any of the embodiments described herein, the electrode (e.g., electrode 100 as described herein) is an air-permeable electrode and contacting the electrode with the sample is by air-pumping an environment surrounding the sample or a substrate as described herein.

According to some of any of the embodiments described herein, the electrode features a high surface area. In some embodiments, the electrode is a porous electrode.

In some embodiments, the electrode comprises a high-surface area conductive or semi-conductive matrix (including, for example, carbon porous matrices and metal 3D porous matrices).

In some embodiments, the conductive (or semi-conductive) matrix is associated with nanostructures (e.g., nanowires, nanoparticles and/or nanotubes) for the formation of super-large area conductive composite electrodes.

In some embodiments, the conductive (or semi-conductive) matrix comprises biomolecular or polymeric species that can act as a chemical receptor/adsorption layer, in order to increase the adsorption characteristics of the sensing electrode, and increase the adsorption of the pathogenic organism of the portion thereof from the tested sample to the electrode.

In some embodiments, the electrode comprises a carbon nanoporous 3D matrix. In some embodiments, the electrode has attached thereto functional moieties that can improve the absorption capability of the electrode. For example, moieties featuring positively charged groups such as amines are attached to the electrode.

According to some of any of the embodiments described herein, the electrode features functional groups that are capable of interacting with the pathogenic organism or the portion thereof as defined herein.

According to some of any of the embodiments described herein, the functional groups are positively charged groups, such as amine groups. Such amine groups can chemically interact with negatively charged groups present on a surface of the pathogenic organism or the portion thereof.

According to some of any of the embodiments described herein, the functional groups are covalently attached to at least a portion of the surface of the electrode.

According to some of any of the embodiments described herein, the electrode is a commercially available electrode or a costume-made electrode. In any case, the electrode can be used per se or can be pre-treated before being used in the methods as described herein.

Such a pre-treatment can include, for example, cleaning the electrode by washing it with an organic and/or aqueous solvent, subjecting the electrode to plasma treatment and/or chemically modifying the electrode so as to feature functional groups on its surface, for example, functional groups as described herein for facilitating or improving interaction with the pathogenic organism or the portion thereof.

According to some of any of the embodiments of the present invention, the electrode features at least one nanoscale or microscale dimension.

By "microscale dimension" it is meant that at least one dimension of the electrode is lower than 1 mm, or ranges from 0.1 micron to 900 microns.

By "nanoscale dimension" it is meant that at least one dimension of the electrode is lower than 1 micron, or ranges from 0.1 nanometer to 900 nanometers.

The nanoscale or microscale dimension depends on the shape of the electrode. If an electrode is generally shaped as a cylinder, the at least one dimension can be one or both of a length and a diameter of the electrode. If the electrode is generally shaped as a rectangular, the at least one dimension can be one or more of a length and a width of the electrode.

Electrodes featuring one or more microscale or nanoscale dimension are also referred to herein and in the art as microelectrodes.

According to some embodiments of the present invention, the electrode is a carbon electrode.

According to some embodiments of the present invention, the electrode is a carbon microelectrode.

Carbon electrodes or microelectrodes can be made of glassy carbon, screen-printed carbon, carbon films, carbon fibers, carbon paste and others.

According to some embodiments of the present invention, the carbon electrode is a carbon fiber electrode, or a carbon fiber microelectrode (also referred to herein as a micro-carbon-fiber electrode, or a micro CF electrode or a CF microelectrode).

A carbon fiber (CF) electrode is an electrode that comprises elementary carbon (e.g., graphite) shaped as a fibrous structure (e.g., a filament). Generally, but not necessarily, a CF electrode features a microscale or even nanoscale diameter or width, typically, but not limited to, in a range of from 5 to 200 microns, or 5 to 100 microns, or 5 to 50 microns or 5 to 20 microns. Generally, but not necessarily, a CF electrode features a length (height) of from about 100 microns to about 50 mm, or from about 100 microns to about 1 mm, or from about 100 microns to about 800 microns, including any intermediate values and subranges therebetween. CF electrode featuring such dimensions is a CF microelectrode.

In some embodiments the CF microelectrode further comprises a mechanical support enveloping or surrounding at least a portion of the electrode, leaving a protruding tip of e.g., from 10 to 100 microns, of unsupported, exposed portion of the electrode.

The CF microelectrode can be a single-barrel or a multi-barrel electrode.

Any commercially available CF microelectrode can serve as a raw material for providing a CF microelectrode according to the present embodiments, upon generating on at least a part of its surface a functional moiety as described herein.

In some embodiments, a CF microelectrode is a carbon paper electrode.

In some embodiments, a CF microelectrode is a gas-permeable electrode. Gas permeable electrodes allow sensing of gaseous samples (e.g., air) and/or analytes while circumventing the need to introduce the sample via a dedicated gas inlet.

According to some of any of the embodiments described herein, the electrode is a carbon fiber microelectrode.

According to some of any of the embodiments described herein, the electrode is a carbon paper microelectrode.

According to some of any of the embodiments described herein, the carbon paper microelectrode is a gas-permeable (e.g., an air-permeable) carbon paper microelectrode.

According to some of any of the embodiments described herein, the carbon paper microelectrode is used per se, and in some embodiments, it is pre-treated as described herein in any of the respective embodiments.

According to some of any of the embodiments described herein, the carbon paper microelectrode has positively charged groups (e.g., amine groups) covalently linked to at least a portion of its surface.

In some embodiments, the CF microelectrode is electrically connectable to other parts of a sensing system (e.g., as described herein), that is, it comprises, or is attachable to electrically conducting wires, for example, conducting metal foils such as Ni foils.

According to some of any of the embodiments described herein, the electrode, e.g., a CF microelectrode, has electrically conducting wires in electric communication therewith.

The electrode (e.g., electrode 100 as described herein) can alternatively be made of other carbon-containing configurations and/or other conductive materials or a mixture of conductive materials, preferably while featuring porosity and/or gas-permeability (e.g., air-permeability) and/or high surface area as described herein, and/or while allowing a pathogenic organism or a portion thereof be absorbed to at least a part of its surface.

Aptamer

Herein and in the art, the term "aptamer" describes oligonucleotide or peptide molecules that bind to a specific target molecule. Aptamers are typically created artificially by an in vitro process that is based on Systematic Evolution of Ligands by exponential enrichment (SELEX); See, FIG. 17.

Unlike the preparation of antibodies, which relies on induction of an animal immune system, the SELEX process enables the fabrication of aptamers for non-immunogenic and toxic targets that is otherwise impossible to obtain by the immune system. Moreover, it is also possible to produce aptamers to specific regions of targets, which is sometimes difficult for antibodies, since the animal immune system inherently contains epitopes on target molecules.

Aptamers can be divided into oligonucleotide aptamers, including DNA or RNA or XNA aptamers, which typically consist of short strands of oligonucleotides; and peptide aptamers, which typically consist of one (or more) short variable peptide domains, attached at both ends to a protein scaffold.

Aptamers typically exhibit high selectivity and affinity toward their targets. The interactions between aptamers and their molecular targets are usually so specific that even small variations in the target molecule may disrupt aptamer binding capabilities. In addition to this high selectivity, aptamers bind to their targets with high affinity, particularly with macromolecules (e.g., proteins), which often possess remarkably low dissociation constants (Kd) ranging from picomolar to nanomolar.

Currently available aptamers are such that have high affinity toward a broad range of targets, including metal ions (e.g., $K^+$, $Hg^{2+}$ and $Pb^{2+}$), small organic molecules (e.g., amino acids, ATP, antibiotics, vitamins and cocaine), organic dyes, peptides and proteins (e.g., thrombin, growth factors and HIV-associated peptides) and whole cells or microorganisms (e.g., bacteria).

The use of aptamers in the sensing method of the present embodiments exhibits the following advantages:

aptamers with high specificity and affinity can in principle be selected in vitro for any given target, ranging from small molecules to large proteins and cells, thus making it possible to develop a wide range of aptamer-based sensing molecules;

aptamers, once selected, can be synthesized with high reproducibility and purity from commercial sources, and are typically chemically stable; and aptamers often undergo significant conformational changes upon target binding, which contributes to detection sensitivity and selectivity.

According to some of any of the embodiments described herein, the method further comprises selecting and/or identifying an aptamer (aptamer 104) that selectively bind to the pathogenic organism to be detected. According to some of these embodiments, this can be done using the SELEX methodology as known in the art, and as presented schematically in Background Art FIG. 17, and exemplified in Example 7 in the Examples section that follows, using the pathogenic organism to be detected. Alternatively, aptamer 104 can be a commercially available aptamer that is known to selectively bind the pathogenic organism to be detected of choice, or can be a synthetically or otherwise contumely prepared aptamer, based on available information regarding its chemical composition (e.g., amino acids or nucleotide sequence).

In any case, prior to performing, or prior to designing a method of detecting a pathogenic organism of choice, identification of a suitable aptamer that selectively binds to the selected organism is performed.

In some of any of the embodiments described herein, the aptamer (aptamer 104) can be a peptide, a protein, an oligonucleotide or a polynucleotide.

In some of any of the embodiments described herein, the aptamer (aptamer 104) is an oligonucleotide or a polynucleotide.

In some of any of the embodiments described herein, the aptamer (aptamer 104) is an oligonucleotide comprising from 10 to 400, or from 10 to 200, or from 10 to 100, nucleotides, including any intermediate values and subranges therebetween.

Once an aptamer is selected, the method preferably further comprises conjugating thereto, or generating therewithin, a first functional group (functional group 116) as described herein in any of the respective embodiments. This can be done by simple chemical synthetic pathways, depending on the functional group 116 of choice.

In some embodiments, the first functional group is biotin and conjugation of the biotin to an oligonucleotide aptamer is performed by coupling the biotin to the 5' or 3' end of the aptamer, preferably the 5' end.

As described in the Examples section that follows, the SELEX methodology was successfully practiced for uncovering aptamers that are usable in a method of determining a presence and/or amount of a soybean rust fungus, particularly *Phakopsora* urediniospores as described herein.

According to some embodiments of the present invention, there is provided an aptamer that selectively binds, or is capable of selectively binding, a soybean rust fungus as described herein in any of the respective embodiments (e.g., *Phakopsora* urediniospores). Such an aptamer is usable as aptamer 104 as described herein in any of the respective embodiments when a method as described herein is for determining a presence and/or amount of a soybean rust fungus as described herein in any of the respective embodiments.

According to some of any of the embodiments described herein in the context of this aptamer, the aptamer comprises at least one G-rich region, that is, at least one region in which more than 50%, or more than 60%, or more than 70%, or more than 80%, of the nucleobases are guanine (G) nucleobases.

According to some of any of the embodiments described herein in the context of this aptamer, the aptamer features a G-quadruplex secondary structure.

Figure 19:
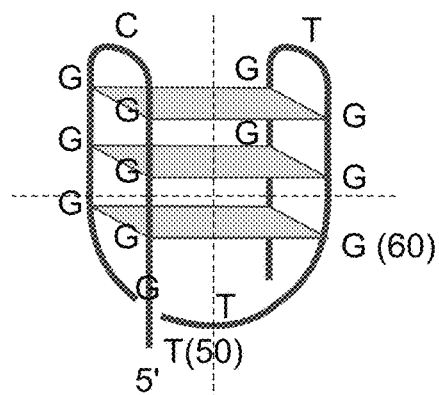
Figure 20A:
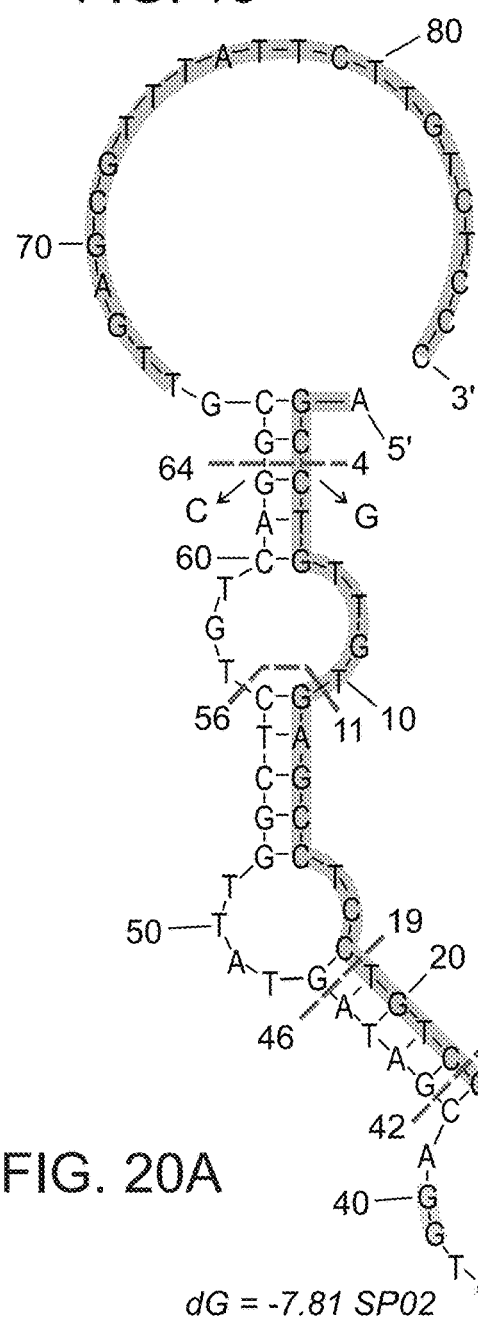
Figure 20B:
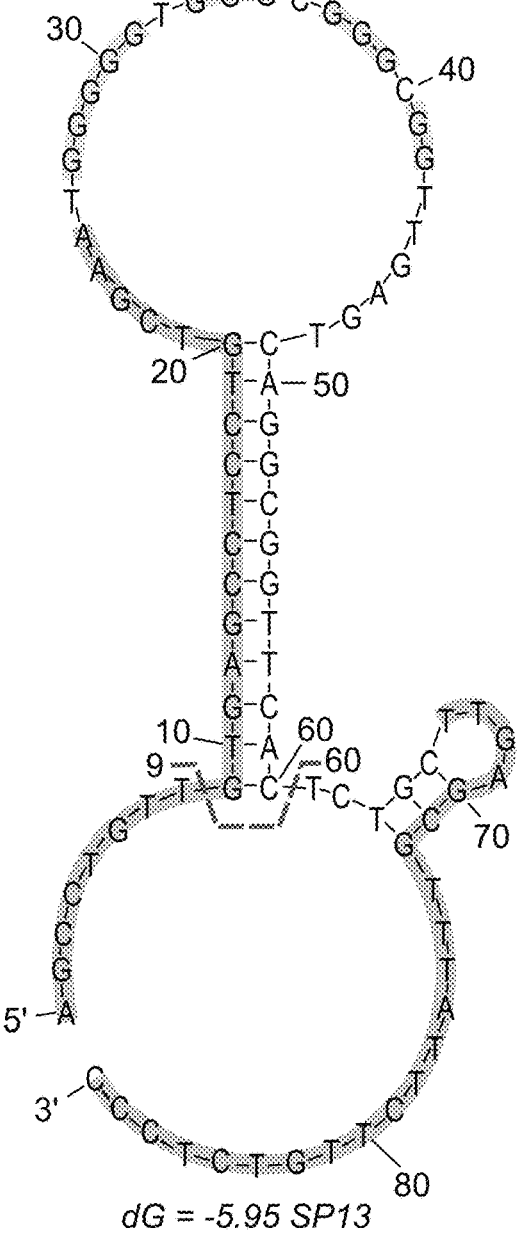
Figure 21:
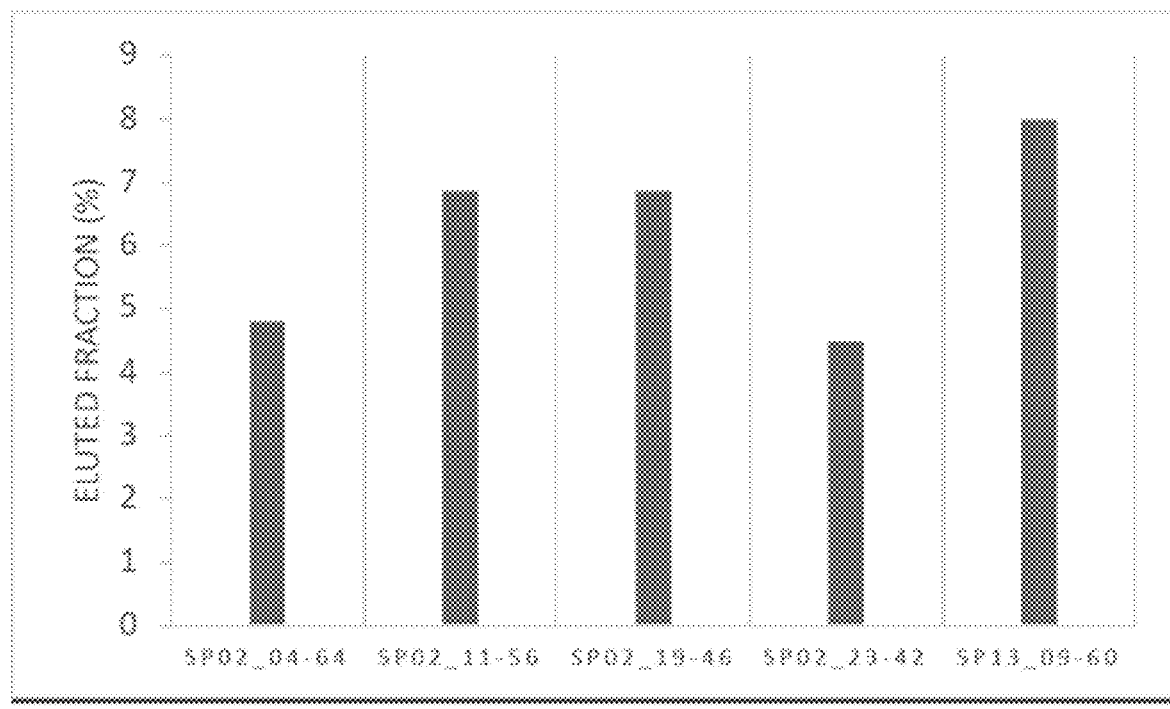

A G-quadruplex secondary structure is typically formed in G-rich oligonucleotides. The oligonucleotide or its G-rich region is helical in shape and contains guanine tetrads that can form one or more strands. An exemplary G-quadruplex structure is shown in FIG. 19.

According to some of any of the embodiments described herein in the context of this aptamer, the aptamer comprises, in its G-rich region, a nucleotide sequence as presented in Table 3, that is a sequence selected from SEQ ID NO:21-31.

According to some of any of the embodiments described herein in the context of this aptamer, the aptamer comprises or has a nucleotide/nucleobase sequence selected from those presented in Tables 1, 2 and 4, that is, selected from SEQ ID NOS: 1-7, 8-18 and 32-37.

According to some of any of the embodiments described herein in the context of this aptamer, the aptamer comprises or has a nucleotide/nucleobase sequence selected from those presented in Tables 2 and 4, that is, selected from SEQ ID NOS: 8-18 and 32-37.

According to some of any of the embodiments described herein in the context of this aptamer, the aptamer comprises or has a nucleotide/nucleobase sequence as presented in SEQ ID NO:17.

According to some of any of these embodiments, the aptamer further comprises a nucleotide/nucleobase sequence as presented by SEQ ID NO:37.

According to some of any of the embodiments described herein for an aptamer that selectively binds, or is capable of selectively binding, a soybean rust fungus, the aptamer further comprises a first functional group (functional group 116) as described herein, and the functional group is attached to its 5' or 3' end, preferably to its 5' end.

In some of these embodiments, the first functional group (functional group 116) is biotin or avidin or streptavidin, and in some of these embodiments, it is biotin.

Electrochemically Detectable Reaction and Agents

As described hereinabove, sensing electrode 120 comprises an agent 112 that participates in an electrochemically detectable reaction.

By "agent that participates in an electrochemically detectable reaction" it is meant an agent that participates in a reaction that is detected electrochemically, that is, is detected by measuring an electrical parameter, or a change in an electrical parameter is response to potential application, whereby the electric parameter is a result of a chemical reaction that involves electrons (e.g., reduction and/or oxidation of a chemical substance).

Agent 112 participates in an electrochemically detectable reaction in such a way that the measured electric parameter or change in the electric parameter is indicative of the presence and/or amount of agent 112. Agent 112 can be a reactant in the electrochemical reaction, or can be reactant in a reaction that produces a reactant in the electrochemical reaction.

According to some of any of the embodiments described herein, the electrochemically detectable reaction generates an electrochemically detectable substance.

According to some of any of the embodiments described herein, a reactant in the electrochemically detectable reaction is an electrochemically detectable substance, that is, the electrochemically detectable reaction consumes an electrochemically detectable substance.

Thus, the electrochemically detectable reaction can either produce a substance (reaction product) that is electrochemically detectable and/or uses a reactant that is electrochemically detectable. Monitoring the reaction can be effected by monitoring an electric signal that corresponds to the generated product and/or to the consumed reactant.

According to some of any of the embodiments described herein, the agent that participates in the electrochemically detectable reaction is an agent that promotes the reaction, such that in the absence of this agent, the reaction either does not occur or occurs at a low rate or yield. According to some of these embodiments, subjecting electrode 120 to the reaction comprises contacting the electrode 120 with an electrolyte solution containing a reactant which participates in the electrochemically detectable reaction, and optionally applying potential to the electrode.

According to some of any of the embodiments described herein, the agent that participates in the electrochemically detectable reaction (agent 112) is an agent that catalyzes or activates the reaction, such that in the absence of this agent, the reaction is unlikely to occur.

According to some of any of the embodiments described herein, the electrochemically detectable reaction is an enzymatically-catalyzed reaction and the electrochemically detectable agent is a substrate of said reaction and/or a product of said reaction. According to some of these embodiments, the agent that participates in the electrochemically detectable reaction (agent 112) is an enzyme that catalyzes a reaction that produces and/or generates an electrochemically reactive substance.

Any enzyme that selectively catalyzes a reaction that uses as a substrate an electrochemically reactive substance (e.g., a redox reactive substance or compound) as defined herein, and/or that generates as a product that is an electrochemically reactive substance (e.g., a redox reactive substance or compound) as defined herein, is contemplated.

Exemplary redox reactive substances or compounds are compounds that feature one or more nitro groups (that can undergo reduction to amine), compounds that feature one or more amine groups (that can undergo oxidation to nitro), compounds that feature one or more hydroxy and/or aldehyde groups (that can undergo oxidation to carboxylates), compounds that feature one or more peroxide groups (that can undergo reduction or decomposition to hydroxy-containing compounds), etc.

Suitable enzymes according to some of the present embodiments pertaining to agent 112 can therefore include enzymes that uses as substrates a redox reactive substance and/or produce in the enzymatic reaction one or more such redox reactive substances.

In exemplary embodiments, the enzyme is such that catalyzes a reaction in which a nitro-containing compound is produced and/or in which a nitro-containing compound is the substrate. A nitro-containing compound is a compound that comprises one or more nitro groups.

In exemplary embodiments, the enzyme is such that catalyzes a reaction in which a peroxide-containing compound is produced and/or in which a peroxide-containing compound is the substrate. A peroxide-containing compound is a compound that comprises one or more peroxide (—O—O—)-containing moieties or groups.

Exemplary enzymes include, but are not limited to, phosphatases, which are capable of hydrolyzing phosphate-containing compounds. In exemplary embodiments, the phosphatase is capable of catalyzing hydrolysis of a phosphate to a corresponding alcohol, whereby the phosphate, and the corresponding alcohol, has one or more redox reactive groups as described herein, for example, one or more nitro groups. In such cases, both the substrate and the product of the enzymatic reaction are electrochemically-detectable.

According to some of any of the embodiments described herein, agent 112 is a phosphatase.

According to some of these embodiments, agent 122 is a substrate of the phosphatase, for example, a nitro-containing phosphate such as, but not limited to, a nitrophenyl-containing phosphate, e.g., para-nitrophenyl phosphate. Such an agent 122 is electrochemically detectable by itself and also produces, in the presence of a suitable phosphatase, a nitro-containing compound, e.g., para-nitrophenol, which is also electrochemically detectable.

The phosphatase can be any phosphatase of the EC 3.1.3 (phosphoric monoester hydrolases), EC 3.1.4 (phosphoric diester hydrolases), and EC 3.1.4 (phosphoric triester hydrolases), and for each of these categories, it can be an alkaline phosphatase (for example, of the EC 3.1.3.1 category) or an acid phosphatase (for example, of the EC 3.1.3.2 category).

In exemplary embodiments, the phosphatase is an alkaline phosphatase, that is capable of catalyzing hydrolysis of a phosphate at alkaline conditions, for example, of the EC 3.1.3.1 category.

In exemplary embodiments, the phosphatase is an acid phosphatase, that is capable of catalyzing hydrolysis of a phosphate at acidic conditions, for example, of the EC 3.1.3.2 category.

In exemplary embodiments, agent 112 is an alkaline phosphatase or an acidic phosphatase, and agent 122 is a nitro-containing phosphate, for example, nitrophenyl phosphate (e.g., para-nitrophenyl(pNP) phosphate). Agent 122 in such embodiments is a substrate of the phosphatase, for example, a nitro-containing phosphate.

The electrochemical detectable reaction according to these embodiments is a catalytic hydrolysis of the phosphate by the phosphatase, and the electrochemically detectable agent 122 is the substrate of the phosphatase and/or the product of the hydrolysis.

Exemplary enzymes include, but are not limited to, galactosidases, which are capable of hydrolyzing a glycosidic bond formed between a galactose and an organic moiety. In exemplary embodiments, the galactosidase is capable of catalyzing hydrolysis of a substrate to provide a galactose and a corresponding alcohol, whereby the galactose and/or the corresponding alcohol, has one or more redox reactive groups as described herein, for example, one or more nitro groups.

According to some of any of the embodiments described herein, agent 112 is a galactosidase.

According to some of these embodiments, agent 122 is a substrate of the galactosidase, for example, a nitro-containing glucoside such as, but not limited to, a nitrophenyl-containing glucoside, e.g., para-nitrophenyl (pNP)-containing glucoside.

Such an agent 122 is electrochemically detectable by itself and also produces, in the presence of a suitable galactosidase, a nitro-containing alcohol (e.g., para-nitro phenol) which is also electrochemically detectable.

The galactosidase can be an alpha-galactosidase of the EC 3.2.1.22 category of a beta-galactosidase of the EC 3.2.1.23 category.

According to exemplary embodiments, agent 112 is a beta-galactosidase as described herein, and agent 122 is a substrate of the beta-galactosidase which has one or more redox reactive groups, for example, one or more nitro groups. An exemplary such substrate is nitro-containing glucopyranoside (e.g., pNP-β-d-glucopyranoside).

Similarly, the enzyme can be any other glucosidase of the EC 3.2.1 category as long as it is capable of catalyzing a reaction that produces a redox reactive substance as described herein.

In exemplary embodiments, agent 112 is a beta-glucosidase and agent 122 is a nitro-containing glucopyranoside (e.g., pNP-β-d-glucopyranoside).

The electrochemical detectable reaction according to these embodiments is a catalytic hydrolysis of the glucopyranoside by the beta-glucosidase, and the electrochemically detectable agent 122 is the substrate of the beta-glucosidase and/or the product of the hydrolysis.

Additional exemplary enzyme-substrate pairs which can serve as agents 112 and 122, respectively, include, but are not limited to, Chitinase and pNP-N-acetyl-β-d-glucosaminide; and Cellobiohydrolase and pNP-β-d-cellobioside, respectively.

Any other enzymes that can use an electrochemically reactive substrate and/or that produce an electrochemically reactive catalysis product are contemplated, in accordance with guidance provided herein.

According to some of any of the embodiments described herein, the electrochemical reaction (e.g., an enzymatically-catalyzed reaction) produces a redox reactive substance as an electrochemically detectable substance.

Exemplary Method

The following describes an exemplary method according to some of the present embodiments.

The method, according to these exemplary embodiments is for determining a presence and/or amount of a soybean rust fungus as described herein in any of the respective embodiments.

In an exemplary method, electrode 100 is a carbon electrode, preferably an air-permeable carbon fiber electrode, such as a carbon fiber microelectrode, for example, a carbon paper microelectrode, as described herein in any of the respective embodiments.

Electrode 100 is contacted with a sample suspected as containing a soybean rust fungus, as described herein in any of the respective embodiments. Contacting is performed by air-pumping the sample (e.g., an environment of a substrate suspected as infected by the soybean rust fungus), to thereby provide the respective electrode 102.

Electrode 102 is then contacted with an aptamer (aptamer 104), which is a G-rich oligonucleotide, preferably such that feature a G-quadruplex secondary structure, to provide electrode 110.

In exemplary embodiments, aptamer 104 has a nucleotide sequence as presented in SEQ ID NO: 1, 2, 3, 4, 5, 6, 7, 8, 9, 10, 11, 12, 13, 14, 15, 16, 17, 18, 32, 33, 34, 35 or 36.

In exemplary embodiments, aptamer 104 has a nucleotide sequence as presented in SEQ ID NO: 8, 9, 10, 11, 12, 13, 14, 15, 16, 17, 18, 32, 33, 34, 35 or 36.

In exemplary embodiments, aptamer 104 comprises a nucleotide sequence as presented in SEQ ID NO: 21, 22, 23, 24, 25, 26, 27, 28, 29, 30 or 31.

In exemplary embodiments, aptamer 104 has a nucleobase sequence as presented in SEQ ID NO: 17.

Contacting electrode 102 with aptamer 104 can be performed by contacting electrode 102 with a solution of aptamer 104 according to any of these embodiments, for example in an alkaline carbonate buffer, as described herein in any of the respective embodiments.

Optionally, electrode 110 is washed, subsequent to the contacting, with a solution such as an alkaline carbonate buffer as described herein, or with any other aqueous solution.

Electrode 110 is thereafter contacted with an alkaline phosphatase, as described herein in any of the respective embodiments, as agent 112, to thereby provide the respective electrode 120.

Optionally, electrode 120 is washed, subsequent to the contacting, with a solution such as an alkaline carbonate buffer as described herein, or with any other aqueous solution.

Electrode 120 is then subjected to electrochemical reaction by being contacted with a solution (e.g., an electrolyte as described herein in any of the respective embodiments) that comprises a substrate of the alkaline phosphatase that comprises a redox reactive group, as agent 122. In exemplary embodiments, agent 122 is a para-nitro phosphate.

The electrochemical reaction is preferably performed upon assembling electrode 120 and the electrolyte solution containing agent 122 is an electrochemical cell or a system as described herein, voltage is applied to electrode 120 and an electrochemical parameter (e.g., electric current) is measured and is preferably compared to a background measurement as described herein. The generation of an electric current is indicative of the presence of the soybean rust fungus in the sample. In exemplary embodiments, the electrochemical parameter is measured by voltammetry as described herein in any of the respective embodiments.

According to some of any of the embodiments of this exemplary method, the electrolyte solution containing agent 122 comprises a carbonate buffer featuring an alkaline pH as described herein in any of the respective embodiments (e.g., of from 8 to 10, or from 9 to 10, for example, of 9 or 9,5).

According to some of these embodiments, the carbonate buffer solution is as described in further detail hereinunder and in the Examples section that follows.

According to some of these embodiments the carbonate buffer solution is used also in the solutions containing aptamer 104 or agent 112, and is used to wash the electrode upon contacting these solutions, and following the electrochemical reaction.

Electrochemical Cell and System

In some of any of the embodiments described herein, the sensing electrode (electrode 120) as described herein is usable for determining a presence and/or level of a pathogenic organism in a sample, upon integrating the electrode in an electrochemical cell.

In some embodiments of the present invention, there is provided an electrochemical cell which comprises a sensing electrode as described herein in any of the respective embodiments and any combination thereof. The sensing electrode functions, and is also referred to herein, as a working electrode.

In some embodiments of the present invention, there is provided a sensing system which comprises an electrochemical cell as described herein in any of the respective embodiments and any combination thereof.

The following describes some embodiments of an electrochemical cell of the invention.

In some embodiments, the sensing electrode is electrically connectable to a power source, as described herein, and the cell is configured such that when it is operated, at least a portion thereof contacts a solution (an electrolyte solution) that comprises agent 122 as described herein in any of the respective embodiments.

In some embodiments of the present invention, the electrochemical cell further comprises a reference electrode. Any commercially available or customarily designed reference electrode is contemplated. In some embodiments, the reference electrode is an aqueous reference electrode. Exemplary usable reference electrodes include, but are not limited to, Silver/Silver Chloride electrode (e.g., Ag/AgCl/Saturated KCl electrode such as marketed by Metrohm), a Standard calomel (e.g., saturated calomel) electrode (SCE), a Standard hydrogen electrode (SHE), a Normal hydrogen electrode (NHE), a Reversible hydrogen electrode (RHE), a Copper-copper(II) sulfate electrode (CSE); a pH-electrode; a Palladium-hydrogen electrode, a Dynamic hydrogen electrode (DHE), and a Mercury-mercurous sulfate electrode (MSE).

The reference electrode is also electrically connectable to a power source, and the cell is configured such that when it is operated, a potential difference (voltage) is applied between the sensing electrode and the reference electrode.

In some embodiments, the electrochemical cell follows a three-electrode design and further comprises an auxiliary electrode. Preferably, but not obligatory, the auxiliary electrode is a platinum electrode. Any other auxiliary electrode, commercially available or customarily designed, is contemplated. Non-limiting examples include gold electrodes, carbon electrodes and carbon/gold electrodes.

In some embodiments, the auxiliary electrode is electrically connectable to the sensing electrode, for example, electrically-conductive wires connect the electrodes.

In some embodiments, the electrochemical cell further comprises a device that measures a current generated at the sensing electrode, as a result of redox reactions occurring at or next to a surface of the sensing electrode. In some embodiments, this device (e.g., an amperometer, a picoameter) is electrically connectable to the auxiliary electrode and the sensing electrode.

A schematic presentation of an exemplary assembly of a two-electrode electrochemical cell 10 according to some embodiments of the present invention is presented in FIG. 25.

Electrochemical cell 10 comprises a sensing electrode 120 as described herein, which acts as a working electrode. When the cell is operated, electrode 120 should be in contact with an electrolyte 18 which comprises agent 122. Sensing electrode 120 is one half of electrochemical cell 10. A reference electrode 22 is the other half of cell 10. A power source 20 is electrically connectable or connected to sensing electrode 120 and reference electrode 22 by means of electrical wires 24. Power source 20 is configured to apply voltage between sensing electrode 120 and reference electrode 22. Optionally, but not obligatory, cell 10 further comprises an auxiliary electrode (not shown), and a current measuring device 28, and device 28 is electrically connectable or connected to sensing electrode 120 and auxiliary electrode 26.

For an electrochemical cell (e.g., cell 10) to operate, at least the sensing electrode (electrode 120) should be in contact with an electrolyte shown in FIG. 25 as an electrolyte 18. The electrochemical cell (e.g., cell 10) can comprise an electrolyte (e.g., electrolyte 18, as exemplified in FIG. 25), or can comprise means (e.g., an inlet port; not shown in FIG. 25), for introducing the electrolyte to the cell, so as to contact at least the sensing electrode (e.g., sensing electrode 120).

An electrochemical cell according to the present embodiments can follow any of the designs known in the art, and can include one or more sensing electrodes, and one or more of a reference electrode and/or an auxiliary electrode. Exemplary designs include, without limitation, rotating disk-ring electrodes, ultramicro-electrodes, or screen printed electrodes.

The configuration of the components of electrochemical cell 10 as presented in FIG. 25 are for illustrative purpose only and are not to be regarded as limiting in any way.

Electrochemical cell 10 can be, for example, in a form of a covered glass (or other inert material like Teflon or quartz) beaker, containing the sample solution in which the three electrodes are dipped. In some embodiments, electrochemical cell 10 is a micro cell or a thin layer cell.

Electrochemical cell 10 may further comprise means for mixing/stirring electrolyte 18 and agent 122 (not shown in FIG. 25).

Electrochemical cell 10 may further comprise means for monitoring and/or controlling the temperature inside the cell (not shown in FIG. 25).

As used herein and in the art, an electrolyte is an electrically conducting material or medium. An electrolyte can be solid or fluid, and can be used per se or when dissolved in a polar solvent, such as water. When dissolved is a solvent, it is referred to as an electrolyte solution. In the context of electrochemical cells, an electrolyte is also referred to as a background solution.

Herein throughout, the term "electrolyte" also encompasses an "electrolyte solution".

In an electrochemical cell as described herein (e.g., cell 10, FIG. 25), at least the sensing electrode (e.g., sensing electrode 120) contacts the electrolyte (e.g., electrolyte 18) when the cell is operated. In some embodiments, all electrodes contact an electrolyte (e.g., electrolyte 18) when the cell is operated. In some embodiments, all electrodes contact the same electrolyte, as exemplified in FIG. 25, and in some embodiments, one or more of the electrodes contact an electrolyte different from the electrolyte in contact with the sensing electrode, and a membrane is interposed between the different electrolytes.

According to some of any of the embodiments described herein, the electrolyte solution (e.g., electrolyte 18) is selected so as not to interfere with the attachment of agent 112 to the aptamer (aptamer 104) and/or of the aptamer (aptamer 104) to the organism or the portion thereof and/or of the organism or the portion thereof to the electrode.

According to some of any of the embodiments described herein, the electrolyte solution comprises a buffer that is suitable for performing the electrochemically detectable reaction. For example, if agent 122 is an enzyme, the electrolyte solution comprises a buffer or any other solution that features a pH at which the enzymatic catalysis is enabled. Similarly, the electrolyte solution is such that does not react with, or affects the stability of, agent 122.

According to some of any of the embodiments described herein, the electrolyte solution comprises a buffer featuring an alkaline pH.

According to some of any of the embodiments described herein, the electrolyte solution comprises a carbonate buffer, and in some embodiments a carbonate buffer featuring an alkaline pH. Any other buffer solutions that provide a suitable pH for the electrochemical reaction are contemplated. Buffer solutions that provide a desired pH as described herein are well known to those skilled in the art.

According to some of any of the embodiments described herein, agent 112 is alkaline phosphatase and the electrolyte solution comprises a carbonate buffer, and in some embodiments a carbonate buffer featuring an alkaline pH, as described herein.

According to exemplary embodiments, electrolyte 18 comprises a mixture of sodium bicarbonate and sodium carbonate, sodium chloride and/or potassium chloride and magnesium chloride (e.g., as a hexahydrate), and may further optionally comprise a surfactant (e.g., a Tween® surfactant).

The sodium carbonate and the sodium bicarbonate can be at a molar ratio of from 10:1 to 1:10, or from 5:1 to 1:5 or from 2:1 to 1:2, or about 1:1, depending on the desired pH, and each can be at a concentration that ranges from 0.01 mol/L to 0.5 mol/L, for example, 0.1 mol/L.

A concentration of each of the ionic salts, e.g., chloride salts of sodium and/or potassium and/or magnesium can range from 0.001 mol/L to 0.05 mol/L. The concentration of the ionic salts is preferably selected such that these ions do not interfere with the interactions between agent 112 and aptamer 104 and/or aptamer 104 and the pathogenic organism or the portion thereof, and/or of the latter with the electrode, do not interfere with the electrochemical reaction, yet provide an ionic strength that is suitable for an electrochemical reaction. In exemplary embodiments, a mol ratio of a sodium/potassium chloride and magnesium chloride ranges from 5:1 to 1:5 and is, for example, about 2:1.

An exemplary carbonate buffer usable as an electrolyte 18 is described in the Examples section that follows.

In some of any of the embodiments described herein, an electrochemical cell or a sensing system comprising same as described herein is operable by assembling at least a sensing electrode as described herein and an electrolyte containing agent 122 as described herein, and electric means for electrically connecting the sensing electrode to a power source; contacting sensing electrode with the electrolyte solution containing agent 122; applying a potential to the sensing electrode, by means of a power source as described herein; and measuring an electrochemical signal that is indicative of an electrochemical reaction in which agent 112 participates. In some embodiments, the electrochemical signal is an electrical current generated at the sensing electrode is response to said potential, and measuring the signal is effected by means of an electrical current measuring device. The measured current is indicative of a presence and/or level (e.g., amount, concentration) of agent 122 in electrode 120, which is indicative of a presence and/or level of aptamer 104 in electrode 120, which is indicative of a presence and/or level of the pathogenic organism or a portion thereof.

In some embodiments, the electrochemical cell comprises a reference electrode and applying a potential is effected by applying voltage between the sensing electrode and the reference electrode.

The power source is configured to apply potential to the sensing electrode according to any known voltammetry method, as described in further detail hereinafter, in embodiments related to a sensing method.

In some embodiments, the power source is configured to apply a varying potential to the sensing electrode, as described herein in any of the respective embodiments.

In some embodiments, the system or electrochemical cell is configured to determine a current generated in response to the varying potential, and in some embodiments, the system or electrochemical cell is configured for determining a change in the current generated at the sensing electrode, in response to the varying potential.

In some of any of the embodiments described herein, the system or electrochemical cell is configured to determine an electric current or a change in an electric current, compared to an electric current or a change in the electric current generated at the sensing electrode, in response to the varying potential, when electrode 100 is contacted with a sample that does not contain the pathogenic organism to be detected. Such data is also referred to herein as "background current" or "background measurement" and in some embodiments, the system is configured to subtract the background current or measurement from the determined current or change in current.

Generally, but not necessarily, the system or electrochemical cell is configured for providing a voltammogram that presents values that are in line with the voltammetry methodology used.

Determination of a change in the electrical current, according to any of the respective embodiments, can be performed by means of a device which is configured to process the received signals (e.g., the mode of the applied varying potential and corresponding generated current data) so as to provide a value or a set of values as desired (e.g., a change in electrical current relative to a derivative of the applied potential, or any other voltammogram). Such a device is also referred to herein as a signal processor.

In some embodiments, the signal processor is a data processor such as a computer configured for receiving and analyzing the signals. The signal processor extracts, from each generated signal or set of signals, a parameter (e.g., a voltammogram) that is indicative of the electrochemical reaction, and hence of a presence and/or level of agent 112 and hence of the pathogenic organism as described herein.

In some embodiments of the invention the signal processor is configured to construct a fingerprint of agent 112, for example, a voltammogram obtained upon contacting an electrolyte 18 containing agent 122 with electrode 120 and applying a certain mode of a varying potential (e.g., a differential pulse potential).

In some of any of the embodiments of the invention the signal processor is configured to determine a level of an identified agent 112 in electrode 120, by accessing and/or processing relevant data. Such data can include, for example, a calibration curve, e.g., of voltammograms, or of specific values obtained in voltammetry measurements (e.g., a reduction peak), obtained for varying concentrations of agent 112, and stored on a computer readable medium. For example, the signal processor may access the calibration curve, search for a value (e.g., a concentration) that matches the value obtained upon operating the system, and identify a concentration of the identified agent 112 that matches this value. Alternatively, or in addition, the data include a lookup table stored on a computer readable medium, which can be searched for values that match the measured value and are indicative of a level of an identified agent 112. Further alternatively, or in addition, the data include a predetermined relationship between the measured value and a level of the identified agent 112. For example, if such a predetermined relationship comprises a linear relationship, the signal processor can determine the level of an identified agent 112 by means of extrapolation, based on the pre-determined relationship.

Further alternatively, or in addition, the data include a lookup table stored on a computer readable medium, which can be searched for values that match the measured value and are indicative of a level of aptamer 104. Further alternatively, or in addition, the data include a predetermined relationship between the measured value and a level of the pathogenic organism or a portion thereof to which aptamer 104 is attached.

Once the presence and/or amount of agent 112, or the presence and/or amount of the pathogenic organism in the sample is obtained, it can be transmitted to a remote location. Also contemplated are embodiments in which the electric signal produced by the reaction is transmitted to a remote location at which it can be analyzed to determine the presence and/or amount of the pathogenic organism. The electric signal can be transmitted as a raw signal or it can be processed prior to the transmission. For example, in some embodiments, the signal is digitized prior to sending to provide a digital signal, wherein the transmitted signal is the digital signal.

Figure 23:
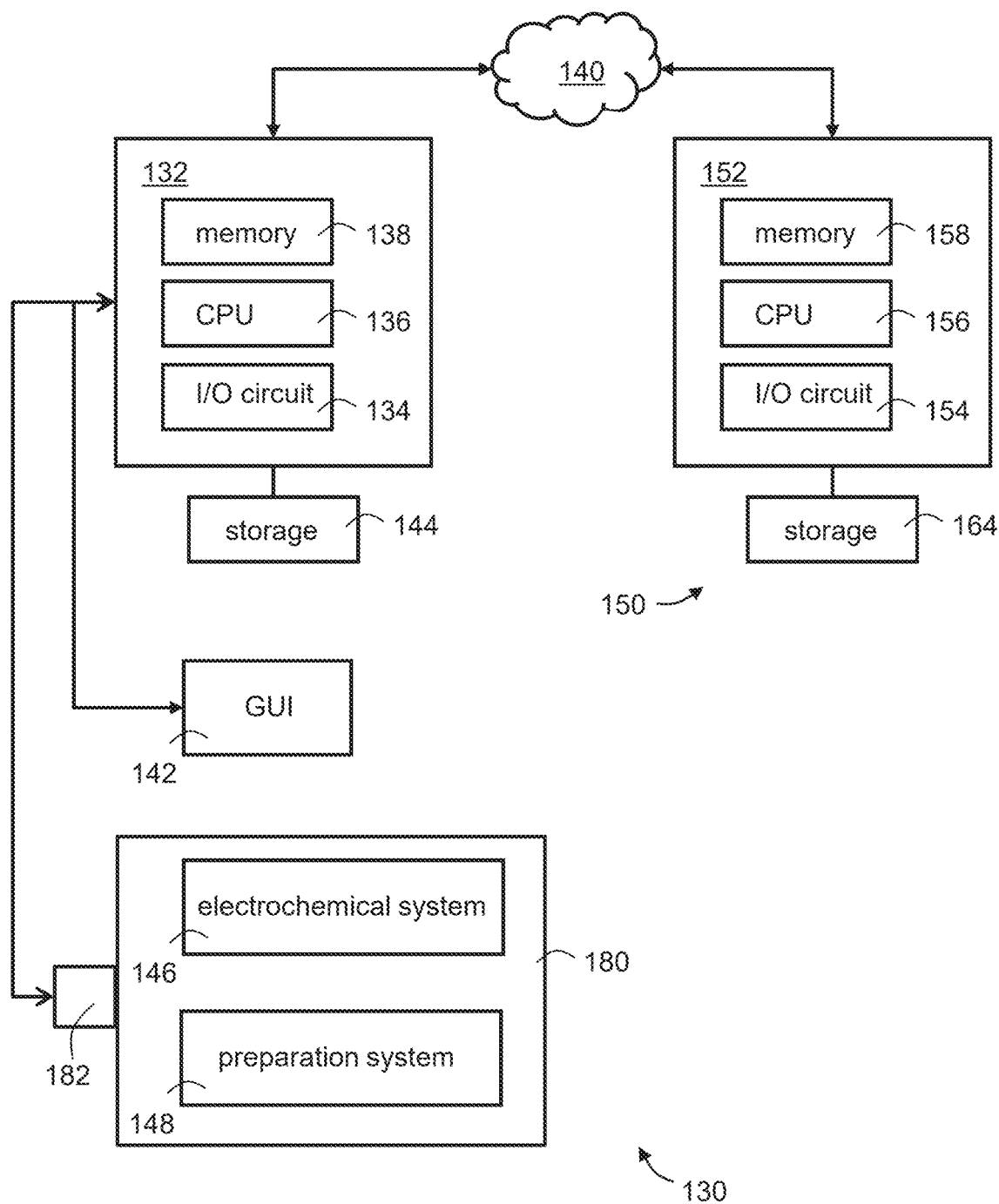

A system 130 suitable for detecting the presence, amount and/or type of the pathogenic organism in and/or on a substrate is schematically illustrated in FIG. 23. System 130 typically comprises a detection system 180 that is configured for preparing the sensing electrode 120 for the electrochemical reaction as described herein, and then to execute the electrochemical reaction and obtain the signal. For example, detection system 180 can comprise a preparation system 148 that prepares the sensing electrode 120 for the reaction, as described herein in any of the respective embodiments, and an electrochemical system 146 that executes the electrochemical reaction and obtains the signal.

Preparation system 148 can automatically contact the sample with electrode 100. For example, system 148 can comprise an air sampler (not shown; see, for example, FIGS. 2A-B) that generates a flow of air containing the sample or of an environment surrounding a substrate, as described herein in the direction of the electrode (electrode 100). System 148 can additionally comprise a container holding the aptamer (aptamer 104 as described herein in any of the respective embodiments) and a container for holding agent 112, as described herein in any of the respective embodiments. The electrode 100 can be brought to contact with the aptamer and agent 112 either manually or automatically, e.g., using a robotic arm (not shown). Once the pathogenic organism or the portion thereof, aptamer 104, and agent 112 are loaded on the electrode (e.g., adsorbed to the surface of the electrode), the obtained electrode 120 is transferred, manually or automatically (e.g., by means of a robotic arm), to the electrochemical system 146 for carrying out the electrochemical reaction. Electrochemical system 146 can include an electrochemical cell (not shown, see FIGS. 1, 14 and 25), having an electrolyte solution 18 and two or more electrodes, of which one electrode is the sensing electrode 120 as described herein in any of the respective embodiments. The electrochemical cell is optionally and preferably a three-electrode cell.

In some embodiments of the present invention system 130 comprises a hardware processor 132, which typically comprises an input/output (I/O) circuit 134, a hardware central processing unit (CPU) 136 (e.g., a hardware microprocessor), and a hardware memory 138 which typically includes both volatile memory and non-volatile memory. CPU 136 is in communication with I/O circuit 134 and memory 138. System 130 preferably comprises a graphical user interface (GUI) 142 in communication with processor 132. I/O circuit 134 preferably communicates information in an appropriately structured form to and from GUI 142.

Hardware processor 132 can be local with respect to system 180 or be located at a remote location.

The signal generated by system 146 can be transmitted to hardware processor 132 for processing. Typically, hardware processor 132 receives the signal via the I/O circuit 134. The processing can include analyzing the signal to determine the presence and/or amount of the pathogenic organism. The processing can additionally or alternatively include digitization of the signal.

Also shown in FIG. 23 is a server computer 150 which can similarly include a hardware processor 152, an I/O circuit 154, a hardware CPU 156, a hardware memory 158. I/O circuits 134 and 154 of system 130 and server computer 150 can operate as transceivers that communicate information with each other via a wired or wireless communication. For example, system 130 and server 150 can communicate via a network 140, such as a local area network (LAN), a wide area network (WAN), a Wi-Fi network, GSM or the Internet. Server computer 150 can be in some embodiments be a part of a cloud computing resource of a cloud computing facility in communication with system 130 over the network 140.

GUI 142 and processor 132 can be integrated together within the same housing or they can be separate units communicating with each other. Similarly, system 180 or and processor 132 can be integrated together within the same housing or they can be separate units communicating with each other. Alternatively, or additionally, system 180 can include a hardware connector 182 (e.g., USB, LAN or the like) for connecting to processor 132 or another computer. Connector 182 can be used for direct transmission the signal generated by system 146 to the processor and/or for direct download of data reports and for firmware software updates.

GUI 142 can optionally and preferably be part of a system including a dedicated CPU and I/O circuits (not shown) to allow GUI 142 to communicate with processor 132. Processor 132 can issue to GUI 142 graphical and textual output generated by CPU 136. Processor 132 also receives from GUI 142 signals pertaining to control commands generated by GUI 142 in response to user input. GUI 142 can be of any type known in the art, such as, but not limited to, a keyboard and a display, a touch screen, and the like. In preferred embodiments, GUI 142 is a GUI of a mobile device such as a smartphone, a tablet, a smartwatch and the like.

Client 130 and server 150 computers can further comprise one or more computer-readable storage media 144, 164, respectively. Media 144 and 164 are preferably non-transitory storage media storing computer code instructions, and processors 132 and 152 execute these code instructions. The code instructions can be run by loading the respective code instructions into the respective execution memories 138 and 158 of the respective processors 132 and 152.

The signal received by processor 132 can be transmitted to server 150 over network 140 automatically or per demand. The signal can be the raw signal, or a process signal (e.g., digitized signal). Alternatively, when processor 132 analyses the signal to determine the presence and/or amount of the pathogenic organism, it can transmit the results of the analysis to server 150. The data (signal, processed signal, and/or results) can be transmitted automatically, allowing server 150 to monitor the presence and/or amount of the pathogenic organism in and/or on the substrate over a time period.

Several systems 130 can be deployed at several locations. In these embodiments, two or more of the systems 130 can transmit data to server 150, allowing server 150 to map locations infected by the pathogenic organism over a field, a region or a country, and optionally and preferably also to monitor diffusion of the pathogenic organism from one location to the other.

The data received by server 150 can be analyzed and the results of the analysis (e.g., the presence and/or amount of the pathogenic organism) can be transmitted from server 150 to one or more individuals or facilities, such as, but not limited to, a farmer or a government institution responsible for monitor disease spread. This allows the take appropriate action when the presence of the pathogenic organism is identified, for example, to mitigate spreading.

Network 140 can also be used by server 150 to transmit software and/or firmware updates to system 130.

GUI 142 can be used by the operator, for example, to calibrate the sensitivity threshold of system 130, for example, by changing the detection threshold employed by processor 132, or the intensity level of the result. Alternatively, the user can calibrate the sensitivity threshold of system 130 remotely, e.g., via server 150, by a dedicated user-server interface (not shown).

A system as described herein in any of the respective embodiments and any combination thereof is usable with any of the methods described herein, including a method of determining a presence/amount/type of a pathogenic organism and a method of controlling disease's presence and progression and treating a substrate, as described herein in any of the respective embodiments and any combination thereof.

Pathogenic Organism

Herein throughout, the phrase "pathogenic organism" is used to describe any organism which can cause a disease or an infection in a higher organism, such as plants, animals grown for commercial or recreational purposes, fish, poultry, insects (e.g., bees) and mammals. In some embodiments, the pathogenic organism causes a disease and/or an adverse effect in plants, and is also referred to herein as a plant-infecting organism. In some embodiments, the pathogenic organism is a plant-infecting organism and in some embodiments it is a soil-borne plant-infecting microorganism.

The term "plant" as used herein encompasses whole plants, a grafted plant, ancestors and progeny of the plants and plant parts, including seeds, shoots, stems, roots (including tubers), rootstock, scion, leaves.

Plants include, for example, algae, bryophytes, tracheophytes, and angiosperms. Angiosperms include, for example, flowering plants, cycads, Ginkgo biloba, and conifers. Plants include seedlings, mature plants, trees and turf. Plant tissues can include, for example, roots, leaves, stems, flowers, seeds, and fruits.

Plants that are particularly useful according to the present embodiments include all plants which belong to the superfamily Viridiplantae, in particular monocotyledonous and dicotyledonous plants including a fodder or forage legume, ornamental plant, food crop, tree, or shrub selected from the list comprising *Acacia* spp., *Acer* spp., *Actinidia* spp., *Aesculus* spp., *Agathis australis, Albizia amara, Alsophila tricolor, Andropogon* spp., *Arachis* spp, *Areca catechu, Astelia fragrans, Astragalus cicer, Baikiaea plurijuga, Betula* spp., *Brassica* spp., *Bruguiera gymnorrhiza, Burkea africana, Butea frondosa, Cadaba farinosa, Calliandra* spp, *Camellia sinensis, Canna indica, Capsicum* spp., *Cassia* spp., *Centroema pubescens, Chacoomeles* spp., *Cinnamomum cassia, Coffea arabica, Colophospermum mopane, Coronillia varia, Cotoneaster serotina, Crataegus* spp., *Cucumis* spp., *Cupressus* spp., *Cyathea dealbata, Cydonia oblonga, Cryptomeria japonica, Cymbopogon* spp., *Cynthea dealbata, Cydonia oblonga, Dalbergia monetaria, Davallia divaricata, Desmodium* spp., *Dicksonia squarosa, Dibeteropogon amplectens, Dioclea* spp, *Dolichos* spp., *Dorycnium rectum, Echinochloa pyramidalis, Ehraffia* spp., *Eleusine coracana, Eragrestis* spp., *Erythrina* spp., *Eucalypfus* spp., *Euclea schimperi, Eulalia vi/losa, Pagopyrum* spp., *Feijoa sellowlana, Fragaria* spp., *Flemingia* spp, *Freycinetia banksli, Geranium thunbergii, GinAgo biloba, Glycine javanica, Gliricidia* spp, *Gossypium hirsutum, Grevillea* spp., *Guibourtia coleosperma, Hedysarum* spp., *Hemaffhia altissima, Heteropogon contoffus, Hordeum vulgare, Hyparrhenia rufa, Hypericum erectum, Hypeffhelia dissolute, Indigo incamata, Iris* spp., *Leptarrhena pyrolifolia, Lespediza* spp., *Lettuca* spp., *Leucaena leucocephala, Loudetia simplex, Lotonus bainesli, Lotus* spp., *Macrotyloma axillare, Malus* spp., *Manihot esculenta, Medicago saliva, Metasequoia glyptostroboides, Musa sapientum, Nicotianum* spp., *Onobrychis* spp., *Ornithopus* spp., *Oryza* spp., *Peltophorum africanum, Pennisetum* spp., *Persea gratissima, Petunia* spp., *Phaseolus* spp., *Phoenix canariensis, Phormium cookianum, Photinia* spp., *Picea glauca, Pinus* spp., *Pisum sativam, Podocarpus totara, Pogonarthria fleckii, Pogonaffhria squarrosa, Populus* spp., *Prosopis cineraria, Pseudotsuga menziesii, Pterolobium stellatum, Pyrus communis, Quercus* spp., *Rhaphiolepsis umbellata, Rhopalostylis sapida, Rhus natalensis, Ribes grossularia, Ribes* spp., *Robinia pseudoacacia, Rosa* spp., *Rubus* spp., *Salix* spp., *Schyzachyrium sanguineum, Sciadopitys vefficillata, Sequoia sempervirens, Sequoiadendron giganteum, Sorghum bicolor, Spinacia* spp., *Sporobolus fimbriatus, Stiburus alopecuroides, Stylosanthos humilis, Tadehagi* spp, *Taxodium distichum, Themeda triandra, Trifolium* spp., *Triticum* spp., *Tsuga heterophylla, Vaccinium* spp., *Vicia* spp., *Vitis vinifera, Watsonia pyramidata, Zantedeschia aethiopica, Zea mays*, amaranth, artichoke, asparagus, broccoli, Brussels sprouts, cabbage, canola, carrot, cauliflower, celery, collard greens, flax, kale, lentil, oilseed rape, okra, onion, potato, rice, soybean, straw, sugar beet, sugar cane, sunflower, tomato, squash tea, trees. Alternatively, algae and other non-Viridiplantae can be used for the methods of some embodiments of the invention.

According to some embodiments, the plant is soybean.

According to some embodiments, the plant is wheat.

In some of any of the embodiments described herein, the pathogenic organism is a pathogenic microorganism.

The pathogenic microorganism may belong to any family of organisms such as, but not limited to, prokaryotic organisms, eubacterium, archaebacterium, eukaryotic organisms, yeast, fungi, algae, protozoa, and other parasites.

In some embodiments, the microorganism is a fungus, and in some embodiments, it is a plant-infecting fungus.

Examples of plant-infecting microorganisms include plant pathogenic fungi, plant pathogenic bacteria, wood decay fungi, and plant pathogenic nematodes. Soil-borne pathogenic fungi include, but are not limited to, *Cylindrocarpom* spp., *Fusarium* spp., *Phoma* spp., *Phytophthora* spp., *Pythium* spp., *Rhizoctonia* spp., *Sclerotinia* spp., *Verticillium* spp. and *Macrophomina* spp. Soil-borne plant pathogenic bacteria include, but are not limited to *Pseudomonas* spp., *Xanthomonas* spp., *Agrobacterium tumefaciens, Corynebacterium* spp. and *Streptomyces* spp. Plant pathogenic nematodes include, but not limited to, *Meloidogyne* spp., *Xiphinema* spp., *Pratylenchus* spp., *Longidorus* spp., *Paratylenchus* spp., *Rotylenchulus* spp., *Helicotylenchus* spp., *Hoplolaimus* spp., *Paratrichodorus* spp., *Tylenchorhynchus* spp., *Radopholus* spp., *Anguina* spp., *Aphelenchoides* spp., *Bursapehlenchus* spp., *Ditylenchus* spp., *Trichchodorus* spp., *Globodera* spp., *Hemicycliophora* spp., *Heterodera* spp., *Dolichodorus* spp., *Criconemoides* spp., *Belonolaimus* spp. and *Tylenchulus semipenetrans*.

In some embodiments, the microorganism is such that causes a rust disease in a plant.

In some embodiments, the microorganism is a fungus that causes a rust disease in a plant, which is also referred to herein as a rust fungus. In some of these embodiments, the plant is soybean. Exemplary fungi that cause rust disease in soybean include those of the *Phakopsora* type, for example, *Phakopsora pachyrhizi* and *Phakopsora meibomiae*. In some of these embodiments, the plant is wheat. Exemplary fungi that cause rust disease in wheat include those of Puccinia type, for example, *Puccinia triticina* (previously called *Puccinia recondite* f. sp. *tritici*), *Puccinia striiformis* f. sp. *tritici* and *Puccinia graminis* f. sp. *tritici*, respectively.

Other exemplary pathogenic organisms include, but are not limited to, powdery mildew, coffee leaf rust, fusarium head blight, potato late blight, apple scab, greening (bacteria or insect vector), brown planthopper, rice stem borer, caterpillar/lepidopteran pests, and like pests.

Sample

According to the present embodiments, a sample that contains or is suspected as containing a pathogenic organism can contain the organism itself (e.g., a pathogenic microorganism) or a portion thereof.

By "portion thereof" it is meant eggs, spores, an organ, a tissue (e.g., epidermis) or cells of the organism, or such that derived from the organism.

In some embodiments, when the pathogenic organism is other than a pathogenic microorganism, a portion of the microorganism as defined herein is contacted with the electrode.

The method according to the present embodiments can be used, for example, for detection of soybean rust diseases in a sample (e.g., a sample taken from a plant environment), for example, for detection of urediniospore-related disease at its early stages.

According to some of any of the embodiments described herein, the sample is of (is derived from) a portion of a substrate suspected as being infected by the pathogenic organism (e.g., pathogenic microorganism) as described herein or of an environment surrounding the substrate.

The substrate can be an animate or inanimate substrate.

An inanimate substrate can be any surface, structure, product or material which can support, harbor or promote the growth of a pathogenic organism. Non-limiting examples include inner/outer walls of storage containers, warehouses, buildings, compartments, or transport vehicles, wood substrates, rocks, dyes, paints, water, water or other fluid storage or transport containers, constructions materials, and public closed or partially closed spaces such as public toilettes, public transportation vehicles and stations, terminals, etc.

An animate substrate includes any living substrate or a portion thereof including animals and plants.

In some of any of the embodiments described herein, the substrate is an agricultural substrate. The agricultural substrate includes any agricultural product or crop such as wood, fiber, fruit, vegetable, flower, extract, horticultural crop and any other processed or unprocessed agricultural product or crop which are produced from organic origins such living plants or animals. An agricultural substrate can also be any device used during the production of the agricultural substrate, for example, irrigation devices, sanitation devices, etc. An agricultural substrate can also be soil or a soil container.

According to some embodiments, the agricultural substrate is a plant, a soil, a seed, an irrigation device, an irrigation source (e.g., a water source).

According to some embodiments, the agricultural substrate is a plant or a soil in which the plant grows, and the sample is an air sample of an environment surrounding the plant and/or the soil in which it is planted.

According to exemplary embodiments, the pathogenic organism or microorganism is a rust fungus, and the sample is an air sample of an environment surrounding a plant (or respective oil) suspected as being infected by the rust fungus. Exemplary plants are listed in Table A hereinunder.

Applications

The method as described herein can be utilized for determining if a substrate from which the sample is derived is infected by a pathogenic organism (e.g., a pathogenic microorganism).

The method as described herein can further be utilized for identifying the infecting pathogenic organism and to determine which antimicrobial agent should be used for reducing the load of the organism in the substrate.

According to an aspect of some embodiments of the present invention there is provided a method of reducing a load of a pathogenic organism (e.g., a pathogenic microorganism) in and/or on a substrate, the method comprising determining a presence, amount and/or type of the pathogenic organism in and/or on the substrate using the method as described herein in any of the respective embodiments, and based on the determining, contacting a substrate identified as infected by or harboring the pathogenic microorganism with an antimicrobial agent that is capable of reducing a population of the pathogenic organism.

The term "reducing the load" refers to a decrease in the number of living organism(s), or to a decrease in the rate of their growth or both, so as to overall reduce the population of the organism, in and/or on the substrate harboring the organism, as compared to a non-treated substrate. When the substrate is an animate substrate or an agricultural substrate, as described herein, reducing the load of a pathogenic organism in an infected substrate can be regarded as treating the substrate and/or as controlling the growth of the substrate and/or as controlling a progression of a disease caused by the pathogenic organism in the substrate, as is further explained hereinafter.

For example, the method can be utilized in controlling a growth of a plant by identifying the presence and type of a pathogenic organism in the plant, and accordingly by determining if and which pesticide, or otherwise a cultural treatment, should be applied to the plant or its environment for disinfecting the plant and increase its growth yield and/or prevent or reduce its infestation by the pathogenic organism.

The method can be utilized for controlling or monitoring a presence and/or progression of a disease caused by a pathogenic organism in an agricultural substrate.

The method can be utilized for increasing the growth yield of agricultural substrates such as plants, as described herein in any of the respective embodiments, by e.g., early, identification of a disease caused by a pathogenic organism and treating the disease, as described herein.

According to some of any of the embodiments described herein, the method is of determining a presence and/or amount and/or type of a rust fungus, for example, a soybean rust fungus, in and/or on the substrate, and is effected using the method as described herein in any of the respective embodiments, and based on the determining, the substrate is treated with a fungicide and/or other treatment usable in reducing a population of the respective rust fungus.

According to an aspect of some embodiments of the present invention there is provided a method of controlling a presence and/or progression of a disease caused by a pathogenic organism in an agricultural substrate. The method comprises determining a presence, amount and/or type of the pathogenic organism in and/or on the substrate using the method as described herein in any of the respective embodiments, by collecting a sample from the agricultural substrate or its environment, as described herein in any of the respective embodiments. Once a presence of a pathogenic organism is determined, and its type is identified, the method proceeds to treat the substrate with a pesticide that is capable of reducing and/or controlling a population of the identified pathogenic organism.

By "controlling a presence and/or progression of a disease caused by a pathogenic organism" it is meant identifying if an agricultural substrate is infected by the pathogenic organism, that is, of the agricultural substrate harbors the pathogenic organism, and hence if the substrate is afflicted by a disease caused by the microorganism. It is also meant controlling the progression of the disease by, for example, preventing a development of a disease, if a pathogenic organism is present in or on the substrate by disease's symptoms are not observed yet, or reducing a rate of development of a disease, for example, reducing the distribution or the rate of distribution of the pathogenic organism in the substrate. It is also meant treating the disease. It is also meant monitoring disease progression in response to a pesticidal or any other treatment. Thus, the method can be performed, alternatively or in addition, following treatment of an agricultural substrate infected by the pathogenic organism, or suspected as infected by such, so as to evaluate if the treatment is effective in, for example, controlling the population of the pathogenic organism in the substrate.

By "controlling a population" of a pathogenic organism, it is meant herein reducing the number of living organisms in the substrate (e.g., killing the organism and/or preventing their reproduction), and/or interfering with the growth of the organism. Interfering with a growth of the organism encompasses decreasing the growth rate of the organism and/or interfering with the development stages of the organism growth and/or reproduction.

According to some of any of the embodiments described in these aspects, the pathogenic organism is a rust fungus, and the pesticide is a fungicide usable in reducing a load or controlling a population of the rust fungus, as described herein.

According to some of any of the embodiments described herein, the rust fungus is soybean rust fungus.

According to some of any of the embodiments described herein, determining a presence and/or amount and/or type of the soybean rust fungus is as described herein in any of the respective embodiments and any combination thereof.

While the most common agricultural substrate (plant) that is susceptible to be afflicted by a soybean rust fungus is soybean, other agricultural substrate are known to be affected by a soybean rust fungus as described herein and are presented in the following Table A.

TABLE A

| Bean, Common, Dry (field, kidney, navy, pinto) | *Phaseolus vulgaris* var. *vulgaris* |
| --- | --- |
| Bean, Common, Succulent (garden, green, snap, and wax) | *Phaseolus vulgaris* var. *vulgaris* |
| Bean, Fava or Broadbean | *Vicia faba* |
| Bean, Lablab or Hyacinth | *Lablab purpureus* |
| Bean, Lima | *Phaseolus lunatus* var. *lunatus* |
| Bean, Mung | *Vigna radiata* |
| Bean, Scarlet Runner | *Phaseolus coccineus* |
| Bean, Winged or Goa | *Psophocarpus tetragonolobus* |
| Bean, Yam | *Pachyrhizus ahipa, P. erosus* |
| Blackeyed Pea, Cowpea or Yardlong Bean | *Vigna unguiculata* |
| Calopo | *Calopogonium mucunoides* |
| Clover; Alyce or Oneleaf | *Alysicarpus vaginalis* |
| Clover, Crimson | *Trifolium incarnatum* |
| Clover, Hop | *Trifolium aureum* |
| Clover, Lappa | *Trifolium lappaceum* |
| Clover, White | *Trifolium repens* |
| Crotalaria | *Crotalaria anagyroides, C. spectabilis* |
| Crownvetch | *Securigera varia* |
| Fenugreek | *Trigonella foenum-graicum* |
| Florida Beggarweed | *Desmodium tortuosum* |
| Kudzu | *Pueraria montana* var. *lobata* |
| Lespedeza | *Lespedeza* spp., *Kummerowia striata, K. stipulaceae* |
| Lupines | *Lupinus* spp. |
| Medic | *Medicago* spp. |
| Milk Vetch | *Astragalus cicer, A. glycyphyllos* |
| Pea, garden and field | *Pisum sativum* |
| Peatree or Colorado River Hemp (Sesbania) | *Sesbania exaltata* |
| Pigeon Pea | *Cajanus cajan* |
| Siratro | *Macroptilium atropurpureum* |
| Soybean (including edamame) | *Glycine max* |
| Swordbean | *Canavalia gladiata* |
| Trefoil | *Lotus* spp. |
| Urd or Black Gram | *Vigna mungo* |
| Wild Soybean | *Neonotonia wightii* |
| Woolypod Vetch | *Vicia villosa* subsp. *varia* |
| Yellow Sweet Clover | *Melilotus officinalis* |

Fungicides usable in treating soybean rust fungus include, but are not limited to, chloronitriles (e.g., Chlorothalonil), strobilurins (QoI fungicides), triazoles, succinate dehydrogenase inhibitors (SDHIs) and combinations thereof. Fungicides can be combined with or replaced by cultural control measures.

In some embodiments, fungicides usable in controlling a rust disease or a disease caused by a rust fungus such as, for example, soybean rust fungus, as described herein, include, but are not limited to, copper-based fungicides, including, for example, as copper oxychloride, copper sulfate, copper hydroxide and tribasic copper sulfate (Bordeaux mixture); elemental sulfur; dithiocarbamate fungicides including, for example, amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb; phthalimide fungicides including, for example, folpet, captan and captafol; chlorothalonil; Conazole fungicides including, for example, climbazole, clotrimazole, imazalil, oxpoconazole, prochloraz, prochloraz-manganese, triflumizole, azaconazole, bitertanol, bromuconazole, cyproconazole, diclobutrazol, difenoconazole, diniconazole, diniconazole-M, epoxiconazole, etaconazole, fenbuconazole, fluotrimazole, fluquinconazole, flusilazole, flutriafol, furconazole, furconazole-cis, hexaconazole, imibenconazole, ipconazole, metconazole, myclobutanil, pencoconazole, propiconazole, prothioconazole, quinconazole, simeconazole, tebuconazole, tetraconazole, triadimefon, triadimenol, triticonazole, uniconazole, perfurazoate and uniconazole-P; Quinone outside inhibitors including, for example, fenamidone, famoxadone; strobilurin fungicides including, for example, azoxystrobin, mandestrobin, coumoxystrobin, enoxastrobin, flufenoxystrobin, pyraoxystrobin, dimoxystrobin, enestrobin, fluoxastrobin, kresoxim-methyl, metominostrobin, orysastrobin, picoxystrobin, pyrametostrobin, triclopyricarb, fenaminstrobin, pyraclostrobin and trifloxystrobin; succinate dehydrogenase inhibitors sincluding, for example, benodanil, flutolanil, mepronil, fluopyram, fenfuram, carboxin, oxycarboxin, thifluzamide, bixafen, fluxapyroxad, furametpyr, isopyrazam, penflufen, penthiopyrad, sedaxane and boscalid; and (v) combinations thereof; and fenpropidine, and any mixture thereof.

According to some of any of the embodiments described herein in the context of a method of controlling a presence and/or progression of a rust disease caused by a rust fungus such as soybean rust fungus, the method comprises treating an agricultural substrate identified as infected by a rust fungus with one or more of the fungicides described herein. In some of these embodiments, the fungicide comprises one or more of Fenpropidine, fluxapyroxad, picoxystrobin, azoxystrobin, tebuconazole, prothioconazole, folpet, captan, mancozeb or any mixture of two or more of the foregoing.

Intermediate Electrodes and Kits

According to an aspect of some embodiments of the present invention, there is provided an electrode having absorbed thereto a pathogenic organism or a portion thereof, as defined herein, and an aptamer that selectively binds to the pathogenic organism or the portion thereof, as described herein in any of the respective embodiments, being attached to the pathogenic organism or to the portion thereof, as described herein for electrode 110. The electrode (electrode 110) is obtainable by contacting an electrode as described herein in any of the respective embodiments with a sample containing the pathogenic organism or the portion thereof, or a substrate harboring the pathogenic organism or an environment surrounding the substrate, and thereafter contacting the electrode with a solution comprising the aptamer.

According to an aspect of some embodiments of the present invention there is provided a sensing electrode having absorbed thereto a pathogenic organism or a portion thereof, as defined herein, an aptamer that selectively binds to the pathogenic organism or to the portion thereof being attached to the pathogenic organism or to said portion thereof, and an agent (agent 112) that participates in an electrochemically detectable reaction attached to the aptamer, as described herein in any of the respective embodiments.

According to some of any of these embodiments, an amount of the pathogenic organism or the portion thereof on the electrode one, preferably, at least 5, or at least 10, or at least 15, or at least 20, or at least 30, of the organism or the portion thereof, as defined herein (e.g., a spore, an egg, or an entire microorganism), per mm$^2$. In some embodiments, this amount ranges from 1 to 1000 of an organism or a portion thereof per mm$^2$ of the electrode, including any intermediate values and subranges therebetween.

According to some of any of these embodiments, the pathogenic organism is a soybean rust fungus, as described herein, and the aptamer is selective to the soybean rust fungus, as described herein in any of the respective embodiments and any combination thereof.

According to an aspect of some embodiments of the present invention, there is provided a kit comprising an electrode (electrode 100) and a solution comprising an aptamer that selectively binds to a pathogenic organism or a portion thereof, individually packaged within the kit.

The electrode can be as described herein in any of the respective embodiments. The electrode should preferably be capable of absorbing to at least a portion of a surface thereof the pathogenic organism or the portion thereof as defined herein.

According to some embodiments, the kit further comprises instructions to contact the electrode with a sample suspected as containing the pathogenic organism or the portion thereof, as described herein in any of the respective embodiments and subsequently contact the electrode with the solution.

According to some embodiments, the kit further comprises a solution containing an agent that is capable of binding to the aptamer and of participating in an electrochemically detectable reaction (agent 112 as described herein in any of the respective embodiments), and in some embodiments, each of the described solutions is being individually packaged within the kit.

According to some embodiments, the kit further comprises instructions to contact the electrode with a sample suspected as containing the pathogenic organism or the portion thereof, subsequently contact the electrode with the solution that comprises the aptamer and subsequently contact the electrode with the solution that comprises the agent 112.

According to some embodiments, the kit further comprises an electrolyte solution and optionally a reactant of the electrochemically detectable reaction, such as agent 122 as described herein in any of the respective embodiments, and/or instructions to contact electrode 120, once prepared, with a solution containing the electrolyte and agent 122.

According to some embodiments, the kit further comprises agent 122 individually packaged with the kit, and instructions to prepare the solution by contacting agent 122 with the electrolyte.

According to some embodiments, the kit further comprises agent 122 and the electrolyte, each being individually packaged with the kit, and instructions to prepare the solution by contacting agent 122 with the electrolyte.

According to some of any of the embodiments described herein for a kit, the kit further comprises instructions to treat a substrate identified as harboring or containing or infected by the pathogenic organism with a pesticide that is capable of controlling a population of the pathogenic organism.

According to some of any of the embodiments described herein, the kit further comprises a pesticide that is capable of controlling a population of the pathogenic organism, preferably individually packaged within the kit.

According to some of any of the embodiments described herein for a kit, the pathogenic organism is a soybean rust fungus as described herein, and the aptamer is selective to the soybean rust fungus, and is as described herein in any of the respective embodiments and any combination thereof.

According to some of these embodiments, the kit further comprises instructions to treat an agricultural substrate identified as harboring or containing or infected by the rust fungus, or as afflicted by a rust disease, with a fungicide that is capable of controlling a population of the rust fungus, as described herein in any of the respective embodiments.

According to some of any of the embodiments described herein, the kit further comprises a fungicide that is capable of controlling a population of the rust fungus, as described herein in any of the respective embodiments, preferably individually packaged within the kit.

According to exemplary embodiments, the kit further comprises fenpropidine, fluxapyroxad, picoxystrobin, azoxystrobin, tebuconazole, prothioconazole, folpet, captan, mancozeb or mixtures of two or more of the foregoing.Herein throughout, whenever "pathogenic organism" is indicated it encompasses also a portion thereof, as defined herein, and/or a pathogenic microorganism.

It is expected that during the life of a patent maturing from this application many relevant sensing electrodes will be developed and the scope of the term "electrode", "sensing electrode" and "sensing system" is intended to include all such new technologies a priori.

It is expected that during the life of a patent maturing from this application many relevant aptamers will be developed and the scope of the term aptamer is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicated number and a second indicated number and "ranging/ranges from" a first indicated number "to" a second indicated number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

When reference is made to particular sequence listings, such reference is to be understood to also encompass sequences that substantially correspond to its complementary sequence as including minor sequence variations, resulting from, e.g., sequencing errors, cloning errors, or other alterations resulting in base substitution, base deletion or base addition, provided that the frequency of such variations is less than 1 in 50 nucleotides, alternatively, less than 1 in 100 nucleotides, alternatively, less than 1 in 200 nucleotides, alternatively, less than 1 in 500 nucleotides, alternatively, less than 1 in 1000 nucleotides, alternatively, less than 1 in 5,000 nucleotides, alternatively, less than 1 in 10,000 nucleotides.

It is understood that any Sequence Identification Number (SEQ ID NO) disclosed in the instant application can refer to either a DNA sequence or a RNA sequence, depending on the context where that SEQ ID NO is mentioned, even if that SEQ ID NO is expressed only in a DNA sequence format or a RNA sequence format. For example, SEQ ID NO: 1 is expressed in a DNA sequence format (e.g., reciting T for thymine), but it can refer to either a DNA sequence that corresponds to the RNA sequence of an RNA molecule nucleic acid sequence. In any event, both DNA and RNA molecules having the sequences disclosed with any substitutes are envisioned.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods

Materials and Chemicals

The following materials were purchased from Sigma-Aldrich, Israel: Magnesium chloride hexahydrate (M0250 ReagentPlus®, ≥99.0%), Sodium bicarbonate (S5761 powder, BioReagent, for molecular biology, suitable for cell culture, suitable for insect cell culture), Sodium carbonate (BioUltra, anhydrous, ≥99.5%), Phosphatase, Alkaline from bovine intestinal mucosa (P0114 BioUltra, buffered aqueous glycerol solution, ≥6,500 DEA units/mg protein), Phosphatase substrate (p-nitrophenyl phosphate) (P4744 powder), Sodium chloride (71376 BioUltra, for molecular biology, ≥99.5%) and 4-Nitrophenol (p-nitrophenol) (241326 ReagentPlus®, ≥99%).

The following materials were purchased from Engineered Fiber Technology, USA: Micro-carbon-fibers paper (0.18 mm thick) type SPECTRACARB 2050A-1050. The materials purchased from Alex Red, Israel: Parafilm PM996.

Millipore Mill-Q water (deionized water, 18 mega-ohm) was used in all experiments.

Vendors or other details for other materials are indicated hereinunder.

Sensing Registration

EmStat3+ (PalmSens BV, Netherlands) was used for linear sweep voltammetry and cyclic voltammetry measurements. EmStat3+ system is a compact and low-cost potentiostat with research grade capabilities. It has eight current ranges from 1 nA to 100 mA full scale, with a minimum resolution of 1 pA. It offers the most applicable electroanalytical measurement techniques.

Construction of the Electrochemical Cell

A conventional three-electrode cell (volume 3 ml), in which: platinum (Pt) electrode (0.4 cm$^2$) was used as the counter electrode, a silver-silver chloride (Ag-AgCl) with 3 M potassium chloride, was used as the reference electrode with a double junction salt bridge (Metrohm), and an oxygen plasma-treated micro-carbon-fiber electrode (0.35 cm$^2$, 0.18 mm in diameter) was used as the working electrode, was constructed.

The working electrode was prepared from micro-carbon-fibers paper (0.18×20×5 mm), and nickel foil (0.2×25×5 mm) was used as a current collector (electrical contact); the connections and the insulation of the contacts between the micro-carbon-fiber electrode and the nickel foils were performed by Parafilm. The electrode and current collector were pressed at about 2 kg/cm$^2$ for 30 seconds at room temperature. The electrode was carefully washed with ethanol, rinsed with distilled water and dried at room temperature.

FIG. 1 presents a photograph of an exemplary electrochemical sensing system assembly: The red crocodile clip is connected to the working electrode (micro-carbon-fibers electrode), the blue crocodile clip is connected to the reference electrode (silver-silver chloride electrode), and the black crocodile clip is connected to the counter electrode (platinum electrode). For mixing, plastic Pasteur pipettes were used. The lid of the electrochemical cell was made of a Teflon mold (in white).

Micro-Carbon-Fibers Electrode Pretreatment

Before performing the electrochemical measurements, the micro-carbon-fiber electrode was washed with about 10 ml of isopropanol, and then with about 10 ml of deionized water.

Scanning Electron Microscope (SEM) Analyses

The micro-carbon-fiber electrode and the soybean rust were analyzed by Quanta 200 FEG environmental scanning electron microscope. The images indicate the morphology of the soybean rust (see, FIGS. 4 and 5A-B) and the micro-carbon-fibers electrode surface characteristic (see, FIG. 7). Before the analyses, samples were coated with 4 nm of gold/palladium using a sputter coater system (Emitech SC7640 Sputter Coater, Polaron).

Light Microscope Characterization

Olympus light microscope equipped with U-PMTVC camera adapter for bright field and dark field analysis, made in Japan, was used for morphological analysis of soybean rust and the micro-carbon-fibers electrode.

Air-Sampler Setup

A portable homemade air sampler bearing silicon tubing for air collection and fixation of the electrodes during the air pumping was constructed and is shown in FIGS. 2A-B. The air sampler is connected to silicon tubing for electrode fixation and controlling the air sampling surrounding. The main purpose of the air sample system is to perform a collection of the soybean rust urediniospores on the electrode surface. Importantly, the electrode is fully air permeable, which enables it air filtering capabilities.

The device pumps at a pace of 10 liters per minute, is powered by rechargeable batteries and weighs 1 kg. The rechargeable batteries and its light weight (1 kg) makes the air sampler highly portable.

Aptamers

Aptamers selective to *Phakopsora* urediniospores and featuring a biotin moiety covalently attached thereto were identified and provided using the SELEX methodology, as described in Example 7 below.

Example 1

Morphological Analysis of Soybean Rust Samples

The aim of these analyses was to develop a fast and reliable method to verify the presence of soybean rust urediniospores in/on a substrate, based on their morphology.

This method is used as a rapid analysis for detecting the presence of soybean rust on the electrode surface.

Light Microscope Characterization

Light microscopy analysis is a well-known fast, reliable, and most importantly non-destructive method.

FIG. 3 presents light microscope images of soybean rust samples suspended on a silicon wafer with a native oxide layer (<100>, n-type arsenic, 355-395 µm, 15-7 mΩ/cm). Soybean rust samples were suspended in a mixture of 1:1 deionized water and isopropanol.

Environmental Scanning Electron Microscope Characterization

For the verification of the light microscope measurements, scanning electron microscope (SEM) was used. As described in the art, soybean rust urediniospores are almost sessile, obovoid to broadly ellipsoid with a thorny surface, and size of 18-34 µm×15-24 µm (see, for example, Ono et al. *Mycal. Res.* 96 (10): 825-850 (1992).

FIG. 4 presents SEM secondary electrons image of a soybean rust sample after deposition of 4 nm of gold/palladium, taken at 20 kV, 10 mm distance, and high vacuum mode. As shown therein, the obtained images are in line with the morphology of the soybean rust urediniospores described in the literature.

For advanced morphology analysis and verification, a high-resolution image of soybean rust spikes was taken. A comparison between secondary electrons image and back-scattered electron image was performed.

Figures 5A, 5B:
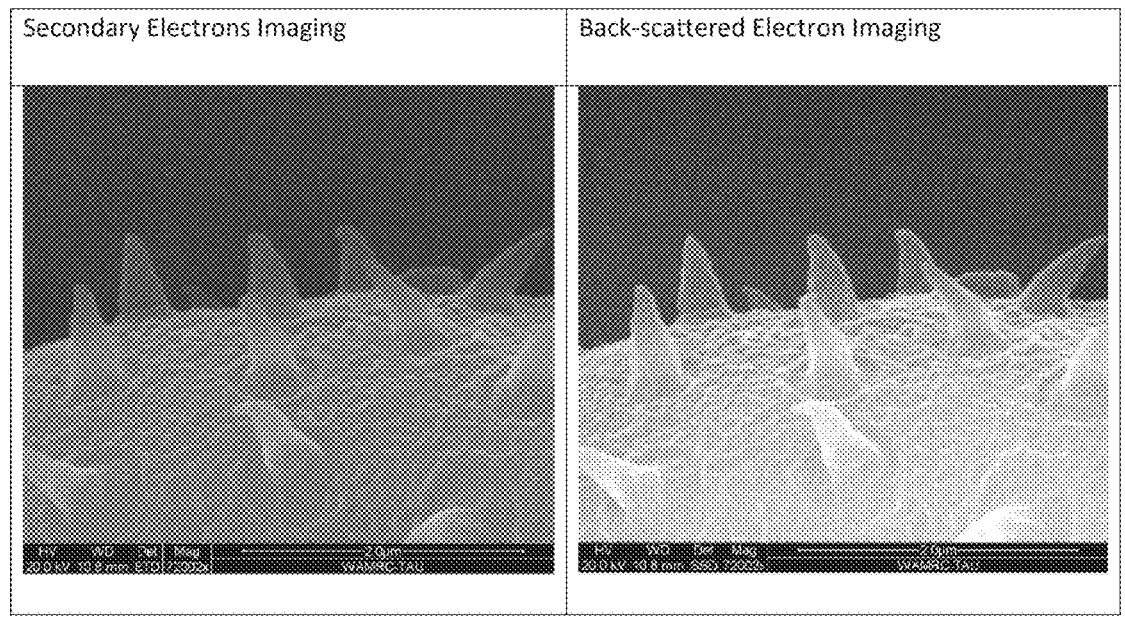

FIGS. 5A-B presents secondary electrons (FIG. 5A) and back-scattered electrons (FIG. 5B) images of soybean rust spikes, after deposition of 4 nm gold/palladium, taken at 20 kV, 10 mm distance, and high vacuum mode.

Example 2

Morphological Analysis of Micro-Carbon-Fibers Electrode

Analyses were performed with the aim of developing a fast and reliable method to verify the presence of soybean rust urediniospores on the surface of the micro-carbon-fibers electrode. Therefore, a characterization of micro-carbonfibers electrode surface was performed. The micro-carbon-fiber electrodes were characterized using a light microscope and scanning electron microscope.

Light Microscope Characterization

FIGS. 6A-B presents light microscope images: Bright-field (FIG. 6A) and dark-field (FIG. 6B) analyses, of a micro-carbon-fibers electrode (0.18 mm thick, type SPECTRACARB 2050A-1050) taken at ×400 magnification.

Environmental Scanning Electron Microscope Characterization

Scanning Electron Microscope analysis was performed in order to verify the light microscope measurements and to conduct a detailed surface study of the micro-carbon-fibers electrode.

FIG. 7 presents scanning electron microscope images (secondary electrons images) of micro-carbon-fibers electrode (0.18 mm thick, type SPECTRACARB 2050A-1050). The images were taken at 20 kV, 10 mm distance, and high vacuum mode, in various magnifications.

Example 3

Air Sampling Sensing

A homemade air sampling device for soybean detection, as shown in FIG. 2B was used to pre-concentrate the soybean rust urediniospores from the sample (the brown package inside the 50 ml test tube), on the surface of the micro-carbon-fibers electrode (a black sheet placed inside the silicon tube), by collecting air from the soybean rust sample surrounding (about 10 cm from the sample).

Light Microscope Characterization

FIG. 8 presents light microscope images: Bright-field and dark-field images, of the micro-carbon-fiber electrode, performed at various magnifications, after 3 minutes of sampling the surrounding of soybean rust sample, using the above homemade air sampling system, at a pace of 10 liters/minute.

Environmental Scanning Electron Microscope Characterization

FIGS. 9A and 9B present Scanning electron microscope images (secondary electrons images) of soybean rust on the micro-carbon-fibers electrode, after 3 minutes of sampling the surrounding of soybean rust sample, using the above homemade air sampling system, at a pace of 10 liters/minute. Before the images were taken, a deposition of 4 nm gold/palladium had been performed on the samples. The images were taken at 20 kV, 10 mm distance, and high vacuum mode.

FIG. 9C presents scanning electron microscope images (secondary electrons) (left) and back-scattered electrons (right) images of soybean rust on the micro-carbon-fibers electrode, after 3 minutes of sampling the surrounding of soybean rust sample, using the above homemade air sampling system, at a pace of 10 liters/minute. Before the images were taken, a deposition of 4 nm gold/palladium had been performed on the samples. The images were taken at 20 kV, 10 mm distance, and high vacuum mode.

These preliminary experiments showed that using the air sampler, for about 3 minutes at a pace of 10 liters per minute, at the proximity of the soybean rust sample, allowed collecting the urediniospores on the micro-carbon-electrode surface. The collection of the urediniospores was further verified by scanning electron microscope and light microscope.

A successful and fast analysis of soybean rust collection on the surface of the micro-carbon-electrode by light microscope, that correlates with scanning electron microscope imaging, was demonstrated. The unique morphology of soybean rust urediniospores can be detected by a scanning electron microscope, but can also be easily detected in the light microscope, even on the micro-carbon-electrode, using dark-field and bright-field imaging.

Example 4

Exemplary System and Methodology

The following describes an exemplary sensing method according to some embodiments of the present invention.

A gaseous spore-containing sample is air-pumped so as to absorb the spores on a surface of an air-permeable electrode as described herein.

The electrode having the spores absorbed thereto is dipped in a solution comprising an aptamer selective to the spore and having biotin attached thereto, and a selection buffer, to thereby attach the aptamer to the spores absorbed to the electrode. An exemplary selection buffer is described in Example 5 that follows. The electrode is then washed with the buffer, and thereafter dipped in a solution containing the selection buffer and an alkaline phosphatase having avidin or strepavidin attached thereto, to thereby bind the enzyme to the aptamer, on the electrode. The electrode is then washed with the buffer and subjected to electrochemical reaction with phosphate nitrophenol. The latter generates nitrophenol that is detected electrochemically, as is described in further detail in the following example.

Example 5

Electrochemical Detection of Alkaline Phosphatase Enzymatic Activity

The investigated reaction between the alkaline phosphatase on the surface of the electrode and the p-nitrophenyl phosphate in the solution is:

$$\text{p-Nitrophenyl Phosphate} + H_2O \xrightarrow{\text{Alkaline Phosphatase}} \text{p-Nitrophenol} + P_i$$

Abbreviation:
$P_i$ = Inorganic Phosphate

The present inventors have recognized that an electrochemical background (electrolyte solution), that enables monitoring the enzymatic activity of alkaline phosphatase while maintaining moderate conditions for aptamer performance is required. The electrolyte solution should include a surfactant, due to the hydrophobic nature of the spores, and the selected surfactant should not limit the electrochemical performance and the sensitivity of the electrochemical detection.

Due to optional modification of the electrode surface with positively-charged groups such as amines, effected in order to improve its binding capabilities to soybean rust cells and the electrochemical performance of the working electrode, the use of amine-containing buffers should be avoided in order to prevent the effect of screening between the buffer and the amine modification. A carbonate buffer, which maintains the alkaline phosphatase catalytic performance and does not contain any amino groups was selected.

FIG. 10 (Background Art) presents the dependence of the specific activity ($\alpha$) of alkaline phosphatase from bovine intestine on the enzyme concentration in (1) borate buffer, (2) HEPES, (3) glycine buffer, (4) carbonate buffer, and (5) Tris; pH 8.5., as taken from L. F. Atyaksheva et al., *Russian Journal of Physical Chemistry A*, 2008, Vol. 82, No. 11, pp. 1947-1951.

According to Alkaline Phosphatase (AP)-conjugated Antibodies Catalog, the most recommended buffer for alkaline phosphatase-conjugated antibodies contains 100 mM diethanolamine, 100 mM NaCl, 5 mM $MgCl_2$, pH 9.5 (No. R932-35, R942-25, R952-25, R962-25). This has been considered while devising a carbonate-based buffer solution containing the following materials:

| Chemical | Molecular Weight [g/mol] | Concentration [mol/L] | Buffer Volume [L] | Mass [g] |
| --- | --- | --- | --- | --- |
| Sodium bicarbonate | 84.0066 | 0.100 | 1.000 | 8.40066 |
| Sodium carbonate | 105.9888 | 0.100 | 1.000 | 10.59888 |
| Sodium chloride | 58.4000 | 0.010 | 1.000 | 0.58400 |
| Magnesium chloride (hexahydrate) | 203.3100 | 0.005 | 1.000 | 1.01655 |

A mixture of sodium bicarbonate (0.100 mol/L) and sodium carbonate (0.100 mol/L) was used to prepare 1 liter of 0.100 mol/L carbonate buffer with pH=9.5. Then, sodium chloride and magnesium chloride (hexahydrate) were added to obtain concentrations of 0.01 [mol/L] of sodium chloride and 0.005 [mol/L] of magnesium chloride (hexahydrate).

Cyclic voltammetry measurements were performed upon the following input parameters to PSTrace 5.3 software: equilibration time 0 sec, E begin=0.0 V, E vertex1=−1.5 V, E vertex2=1.0 V, E step=0.005 V, at a scan rate 0.1 V/s and 1 number of scans.

FIG. 11 presents the cyclic voltammograms obtained for the alkaline phosphatase substrate (p-nitrophenyl phosphate) in a carbonate buffer as presented above, on the modified micro-carbon-fibers electrode (having the alkaline phosphatase attached to the aptamer that binds the spores absorbed to the electrode's surface. A concentration-dependent signal was obtained for substrate's concentrations ranging between 0-500 ppm, and the current peak was received at 0.350 V and −0.950 V.

Figure 12:
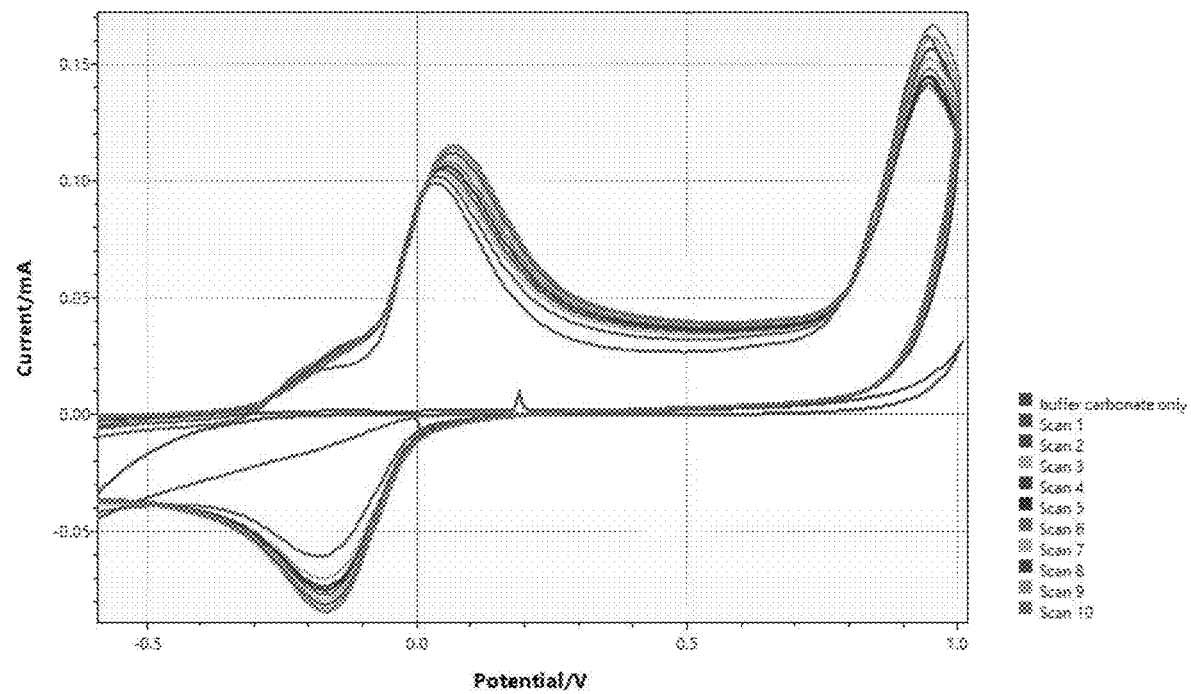

FIG. 12 presents cyclic voltammetry measurement of 10 cycles (scan 1-scan 10). The background solution was based on a carbonate buffer as described hereinabove (pH=9.5), with the addition of 500 ppm p-nitrophenyl phosphate (the substrate). The micro-carbon-fiber electrode adsorbed 10 units of alkaline phosphatase before the measurements started. The enzymatic activity of alkaline phosphatase on the micro-carbon-fibers electrode presented in FIG. 12 show that the signal increases with time, due to the enzymatic conversion of p-nitrophenyl phosphate to p-nitrophenol. The peaks are reversible, as expected (0.065 V and −0.165 V).

Figure 13:
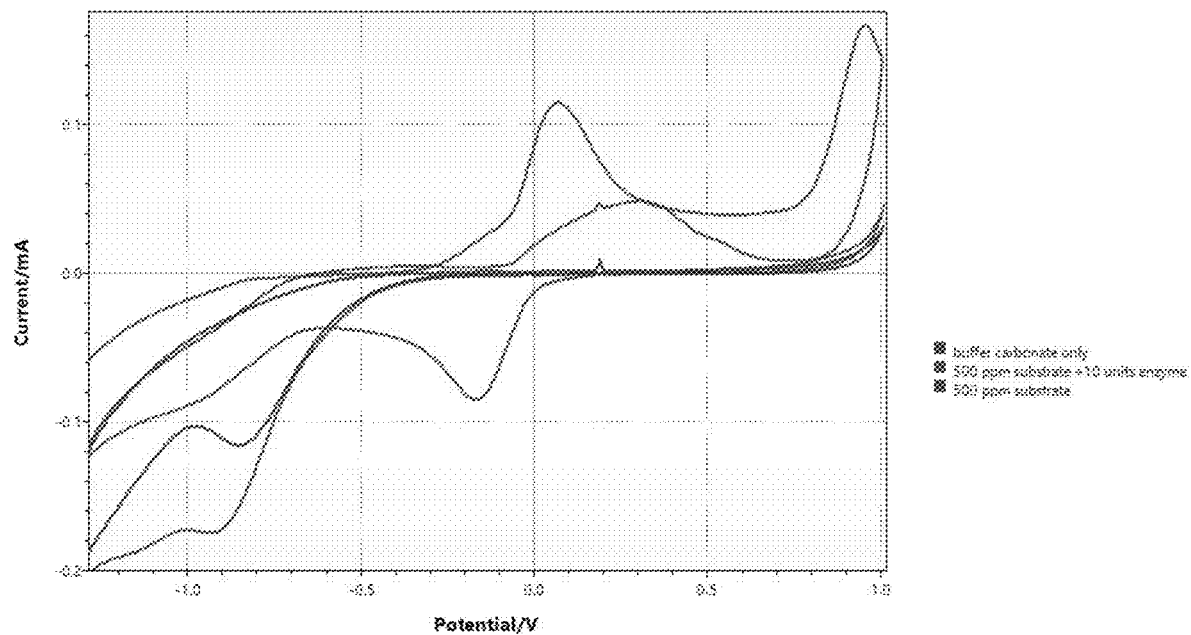

FIG. 13 presents cyclic voltammograms of the alkaline phosphatase substrate in the presence of carbon electrode that absorbed 10 units of alkaline phosphatase enzyme, showing the electrochemical background of the carbonate buffer (blue), the 500 ppm of alkaline phosphatase substrate (p-nitrophenyl phosphate; green), and the 500 ppm of alkaline phosphatase substrate in the presence of carbon electrode that absorbed 10 units of alkaline phosphatase enzyme (red).

Figure 14A:
Figure 14B:
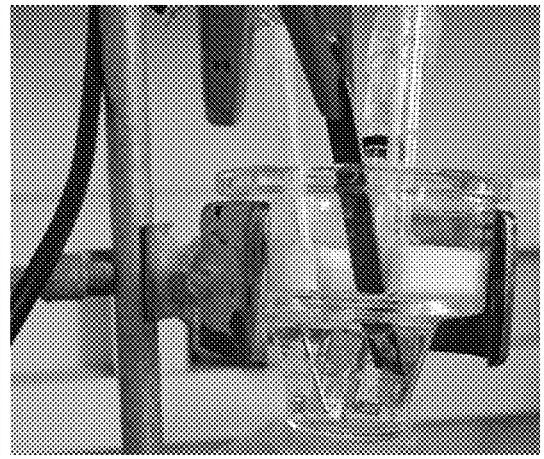

FIGS. 14A-B present the electrochemical set-up before (FIG. 14A) and after (FIG. 14B) the enzymatic reaction of alkaline phosphatase modified micro-carbon-fibers electrode with 500 ppm p-nitrophenyl phosphate (the substrate) in buffer carbonate, pH=9.5.

Figure 15A:
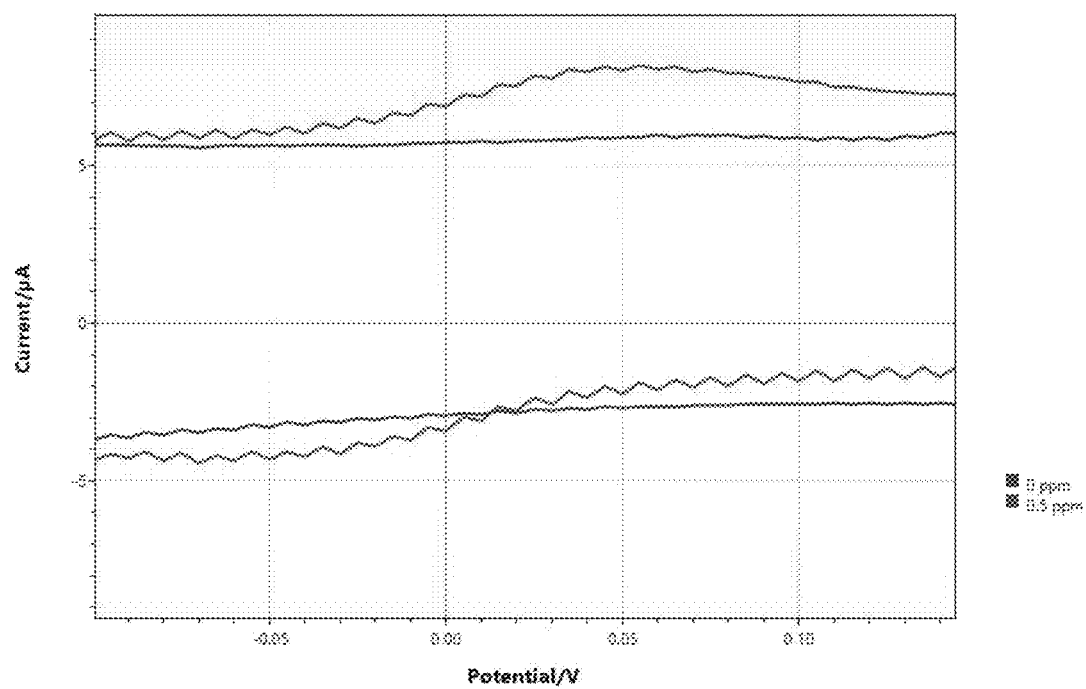

FIG. 15A presents the detection limit of p-nitrophenol using cyclic voltammetry analysis in the tested carbonate buffer. Only the second scan of each cyclic voltammetry measurement is shown. The detection limit in the electrochemical setup shown in FIG. 14 is 0.5 ppm (the red line).

Figure 15B:
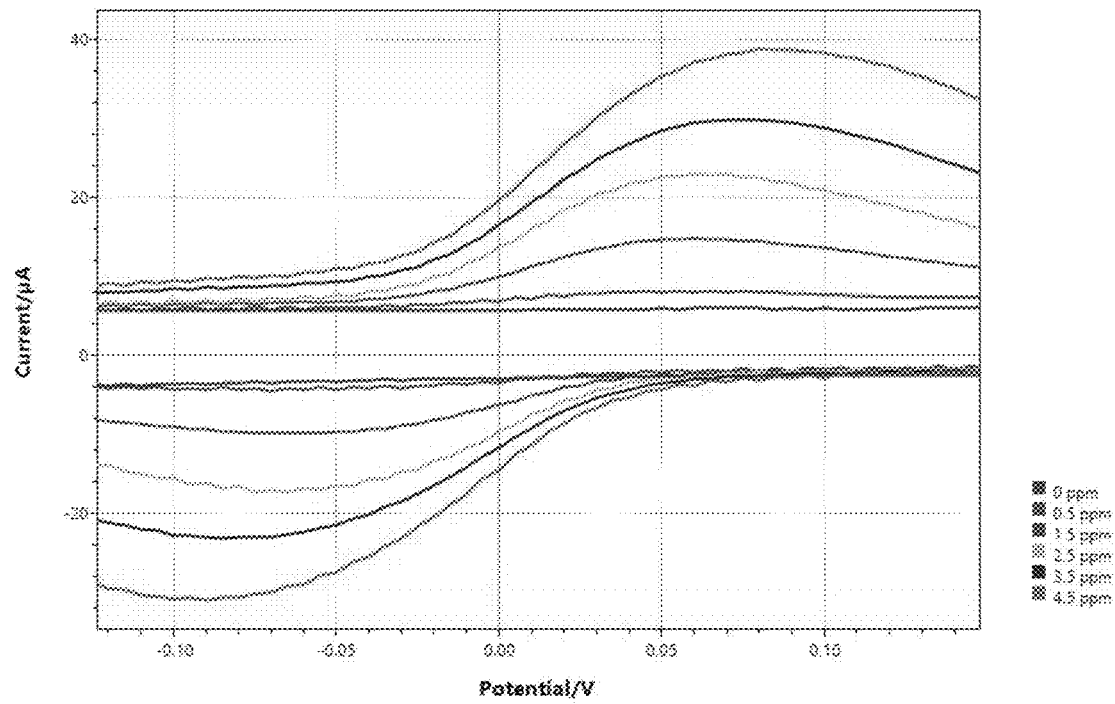

FIG. 15B presents the calibration curve of p-nitrophenol using cyclic voltammetry analysis in a carbonate buffer as described herein.

Figure 15C:
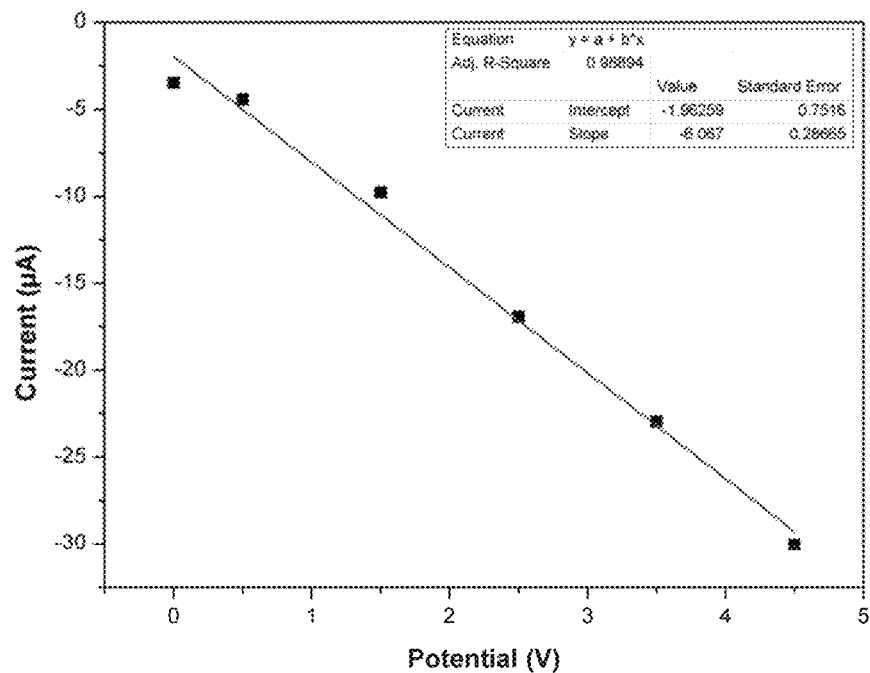
Figure 15D:
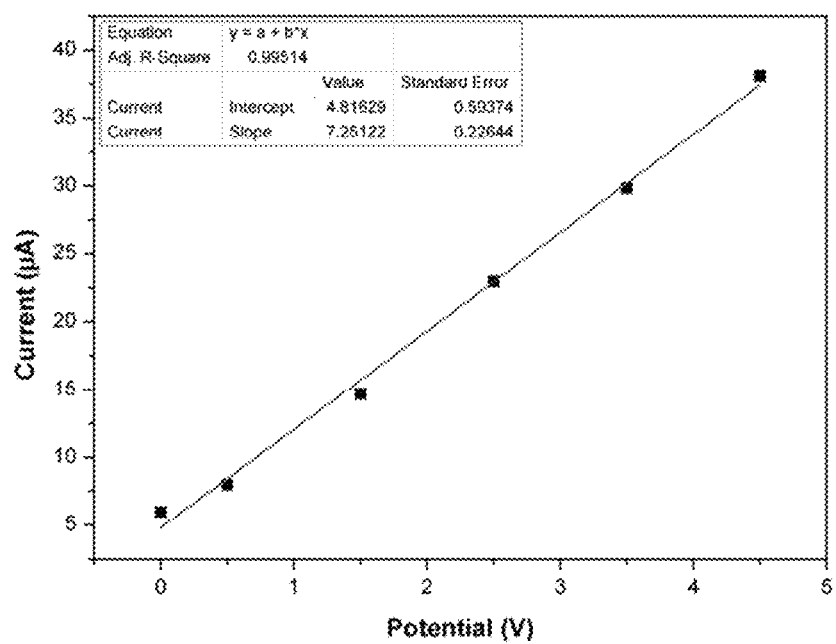

FIGS. 15C and 15D present the cathodic peaks at −0.070V Vs p-nitrophenol concentration (FIG. 15C) and the anodic peaks at 0.070V Vs p-nitrophenol concentration (FIG. 15D). The detection of the substrate and product of alkaline phosphatase enzymatic reaction, using cyclic voltammetry oxidation/reduction peak as obtained by micro-carbon fibers electrode, was successfully applied. The detection of p-nitrophenol was successfully performed in moderate pH conditions (pH=9.5). The product of alkaline phosphatase enzymatic activity, p-nitrophenol, is characterized with two reversible peaks at −0.070 V and 0.070 V, while at the same conditions, the substrate of the alkaline phosphatase, p-nitrophenyl phosphate, gives irreversible peaks at 0.350 V and −0.950 V.

These studies demonstrate that the proposed electrochemical method allows detecting both the decrease in the concentration of the enzyme's substrate and the formation of the product, rendering this analytical method highly reliable. The detection limit of this method, when using cyclic voltammetry only, is 0.5 ppm for p-nitrophenol. Importantly, the ascending and reversible peak of the enzymatic product enables simple detection of the alkaline phosphatase activity and monitoring over time for signal amplification.

Example 6

Detection of Biotinylated Silica Beads as a Model System

Materials

Biotinylated Silica beads 50 µm-10 µl per aliquot (1~5% suspension in aqueous solution), were obtained from Nanocs (Cat. No. Si50u-BN-1).

Alkaline phosphatase (AP)-streptavidin (Sigma-Aldrich)—25 aliquots, in 0.1 M carbonate buffer pH 9.5 with 0.005M $MgCl_2$, 0.01 M NaCl.

Alkaline phosphatase (AP) substrate—4-Nitrophenyl phosphate disodium salt hexahydrate (Sigma Aldrich)—200 µl per aliquot, 4 mg. 20 mg/ml in DIW.

Methods

Electrolyte background solution was prepared using a carbonate buffer without Tween pH=8.5+25 µl of AP substrate in 4 ml electrochemical cell.

A carbon paper electrode was washed with distilled water and dried, as described in Example 1 above.

2 μl of the AP-streptavidin enzyme were put on each side of the electrode.

The electrode was dipped for 5 seconds inside the washing buffer (buffer carbonate without Tween pH 8.5).

Cyclic voltammetry measurements were performed using EmStat³ system with $E_{begin}$=−0.5, $E_{vertex}$=−1.4 CV, to record the background current.

The electrode was thereafter washed with distilled water and dried.

2 μl of silica beads-biotin were placed on each side of the electrode and the electrode was dipped for 5 seconds inside the washing buffer (buffer carbonate without Tween pH 8.5), and was thereafter dried.

2 μl of the AP-streptavidin enzyme were placed on each side of the electrode, and the electrode was dipped for 5 seconds inside the washing buffer (buffer carbonate without Tween pH 8.5).

Cyclic voltammetry measurements were performed using EmStat³ system with $E_{begin}$=−0.5, $E_{vertex}$=−1.4 CV.

Figure 16:
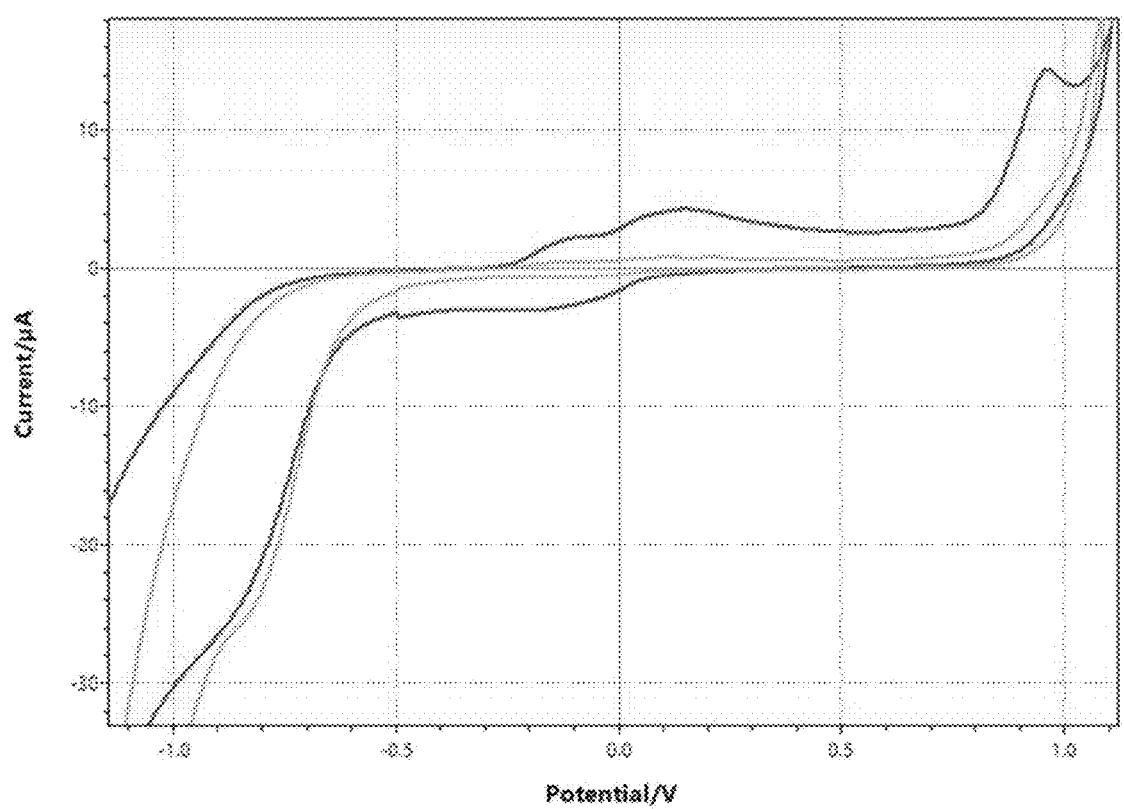

FIG. 16 presents the second scan of the cyclic voltammetry taken in each measurement. The orange plot represents the background measurement. The red plot represents the detection of silica beads.

These data demonstrate the successful detection of the biotinylated silica beads, and thereby demonstrate the ability to use the alkaline phosphatase-related electrochemistry for detecting biotinylated species such as a biotinylated aptamer as described herein absorbed to the electrode.

Example 7

Aptamer Selection

Aptamer selection was performed using the SELEX methodology, which is presented generally in FIG. 17 and is discussed in further detail hereinabove. Herein, the selection cycles are also referred to as "rounds".

Aptamer was selected for soybean rust fungus, more specifically, for *Phakopsora pachyrhizi*.

*Phakopsora pachyrhizi* urediniospores, and yellow rust spores (*Puccinia striiformis*) and brown rust spores (*Puccinia triticina*, Syn. *P. recondita*) were used in these studies. The latter two were used for negative selection (negative control).

These 3 types of spores were suspended in a selection bicarbonate buffer (CBT 1X) pH 9.0 containing 91 mM sodium bicarbonate, 9 mM sodium carbonate, 40 mM potassium chloride, 5 mM magnesium chloride and 0.1% Tween®, and stored at −80° C. in individual aliquots to avoid repeated freezing/thawing. At this stage there were 20 aliquots of *Phakopsora pachyrhizi* urediniospores (approximately $1{,}255 \cdot 10^6$ spores by aliquot) and 32 aliquots of a mixture of yellow and brown rust spores (approximately $1{,}5 \cdot 10^5$ spores by aliquot).

The first selection cycles were carried out against *Phakopsora pachyrhizi* urediniospores (Pp spores) using the selected oligonucleotide library.

The oligonucleotide library used for the selection was the chemically synthesized Nov-AA40N DNA library in which each candidate has a random region 40 nucleotides long, flanked in 5' and 3' by two identical regions for every candidate, 24 and 23 nt long, respectively, corresponding to the binding sites of the primers (Nov-AP5 and Nov-P3P).

The Pp spores were mixed with the oligonucleotide library. The sample was filtered and washed with the bicarbonate selection buffer (CBT 1X).

Candidates were mixed with the spores, filtered on 0.45 micron nitrocellulose filter. Non-specific candidates were eliminated by washing with selection buffer CBT 1X.

Candidates associated with Pp spores were collected by centrifugation/filtration on 0.45 micron nitrocellulose filters and eluted by ionic and temperature jump (3 minutes in water at 80° C.×650 rpm). The recovered supernatant containing the candidates of interest was directly subjected to PCR amplification allowing the production of an enriched pool of candidates.

The amplification products were analyzed by agarose gel electrophoresis. The electrophoretic profiles show i) the quality of the amplified material (absence of material in the wells corresponding to the negative PCR control) and ii) the presence of a single band at the expected size.

Single strands of interest were obtained from the PCR products using the Nov-Nuc methodology. Quantification of the single-stranded candidates was performed by measuring absorbance at 260 nm on a DeNovix spectrophotometer.

The first round was carried out with 1000 picomoles of candidates, meaning $6\times10^{14}$ different sequences. In order to prevent non-specific binding of candidates to spores through electrostatic interactions, 500 pmoles of yeast tRNA were added to each sample at the selection step. Eight selection rounds were performed. The stringency that drives evolution was modulated by target amount (from $1{,}255 \cdot 10^6$-up to round 6- to $6 \cdot 10^5$ spores -at rounds 7 and 8-) and candidate amounts (from 1000 to 80 picomoles), as well as by the number of washes (from 2 to 4) with the selection buffer. Satisfactory amplification yields were obtained for the successive selection rounds: single strand amounts ranged from 118 (round 5) to 385 picomoles (round 2), a part of which was used for the next round.

For rounds 7 and 8 a counter-selection (CS) step was performed to eliminate candidates binding to either brown rust or yellow rust spores (byr spores) prior to positive selection against Pp spores. The byr spores were mixed with the candidates in the selection buffer. Following filtration, the filtrate containing candidates that were not retained by the spores were used for the positive selection step against Pp spores.

The procedure implemented for rounds 9 to 13 was similar to the one described for rounds 7 and 8. Briefly, two selections were run in parallel with (branch A) and without (branch B) counter-selection. The counter-selection was carried out by mixing the candidates with the brown and yellow rust (byr) spores in the selection buffer. Following filtration, the filtrate containing candidates that were not retained by the byr spores were used for the positive selection step against *Phakopsora pachyrhizi* (Pp) spores. For the positive selection candidates were mixed with the Pp pores and filtered on 0.45 micron nitrocellulose filter. Non-specific candidates were eliminated by washing with CBT 1X selection buffer. Candidates associated with Pp spores were collected by centrifugation/filtration on 0.45 micron nitrocellulose filters and eluted by ionic and temperature jump (3 minutes in water at 80° C.×650 rpm).

At the end of each selection round, the amplification products were analyzed by agarose gel electrophoresis.

The PCR products obtained at a given selection round were used for the next one following production of single-strands of interest by the Nov-Nuc methodology. Quantification of the single-stranded candidates was performed by measuring absorbance at 260 nm on a DeNovix spectrophotometer. Single strand amounts ranged from 21 (round 11ter, condition A) to 228 picomoles (round 9, condition A), a part of which was used for the next round.

High Throughput Sequencing (NGS) was then performed. Massive sequencing of 11 pools from rounds 6 to 13 either for branch A or B was performed and compared to the original Nov-AA40N library. For this purpose samples were PCR amplified, with Nov-Forward primer and ad hoc adapters for sequencing (Nov-indexes 20 to 33). NGS sequencing of pools from rounds 6, 7-10 A and B, 11terB and 13B was performed on a Miseq Standard V2 instrument according to the supplier's recommendations.

From round 6 to 9 from 320,000 (R09B) to 481,000 (R08B) sequences were received. Over 90% of the sequences displayed the expected length, from round 6 to 8 (A & B) included. But the full length products amount only to 65-70% at round 9 and represent only a few percent from round 11. The bioinformatics analysis was restricted to pools R6 to R10 (A & B) that makes altogether about 3.4 millions unique sequences.

The threshold for significant presence of a sequence in a pool was fixed at 0.01%. About 2,900 sequences were detected over the threshold and grouped in clusters with an edit distance of 8 (the difference between 2 sequences of a given cluster should be less than 8 over 40 nt). A similar evolution was observed for branches A and B and a clear enrichment at some positions was also observed (data not shown).

At round 10 a few clusters account for about 5% of the total pool. Several of these clusters exhibit a number of G residues and were assumed to adopt a quadruplex structure, as further discussed hereinafter.

Table 1 below presents the sequences of the most abundant clusters at round 10A and 10B (5' to 3' from left to right), and their SEQ ID NOS.

TABLE 1

| SEQ ID NO: | Nucleobase sequence |
|---|---|
| 1 | CAAGGCGGGTAATTGAGAGCTCATTGGGGCGGGTGGGTGG |
| 2 | TGGGTGGGATGGGCGGTGTTTATGCGACGGATGGCGGTTG |
| 3 | GGGGTGGGTGGGTGGACGATAGTATTGGCTCTGTCAGGCG |
| 4 | GGGTGAGGGGGCGGGGACGGAGGCGAACGGTGGCGACTG |
| 5 | GTGGAGTGGTGGGTGGGGATTGGAGGCTAACGTTGAGTGG |
| 6 | GCGATGCGGCCTGGGTGGGCGTTGGTGGGTTGTGCCG |
| 7 | CAATCTAAACGATCACTTGCGGGGCGGGTGGGTGGTGC |

Table 2 below presents the eleven sequences identified on the basis of bioinformatics analysis of the NGS results (frequency at round 11 and evolution factor for both branches A and B), for the selected candidates, including the 5' and 3' fixed regions:

```
                                              (SEQ ID NO: 19)
5'AGCCTGTTGTGAGCCTCCTGTCGAA;
and (SEQ ID NO: 20)
3'TTGAGCGTTTATTCTTGTCTCCC, respectively.
```

TABLE 2

| SEQ ID NO: | Ref. No. | Nucleobase sequence |
|---|---|---|
| 8 | SP000 | AGCCTGTTGTGAGCCTCCTGTCGAACAAGGCGGGTAATTG AGAGCTCATTGGGGCGGGTGGGTGGTTGAGCGTTTATTCT TGTCTCCC |
| 9 | SP001 | AGCCTGTTGTGAGCCTCCTGTCGAATGGGTGGGATGGGCG GTGTTTATGCGACGGATGGCGGTTGTTGAGCGTTTATTCT TGTCTCCC |
| 10 | SP002 | AGCCTGTTGTGAGCCTCCTGTCGAAGGGGTGGGTGGGTGG ACGATAGTATTGGCTCTGTCAGGCGTTGAGCGTTTATTCT TGTCTCCC |
| 11 | SP003 | AGCCTGTTGTGAGCCTCCTGTCGAAGGGTGAGGGGGCGG GGACGGAGGCGAACGGTGGCGACTGTTGAGCGTTTATTCT TGTCTCCC |
| 12 | SP004 | AGCCTGTTGTGAGCCTCCTGTCGAAGTGGAGTGGTGGGTG GGGATTGGAGGCTAACGTTGAGTGGTTGAGCGTTTATTCT TGTCTCCC |
| 13 | SP005 | AGCCTGTTGTGAGCCTCCTGTCGAAGCGATGCGGCCTGGG TGGGCGTTGGTGGGTTGTGCCGTTGAGCGTTTATTCTTGT CTCCC |
| 14 | SP006 | AGCCTGTTGTGAGCCTCCTGTCGAACAATCTAAACGATCA CTTGCGGGGCGGGTGGGTGGTGCATTGAGCGTTTATTCT TGTCTCCC |
| 15 | SP013 | AGCCTGTTGTGAGCCTCCTGTCGAATGGGGGTGGGCGGGC GGTTGAGTCAGGCGGTTCACTCTGCTTGAGCGTTTATTCT TGTCTCCC |
| 16 | SP014 | AGCCTGTTGTGAGCCTCCTGTCGAAGTGGGGTGGGTGGG TGGTACTTGCATAGAGGCCGTACCTTTGAGCGTTTATTCT TGTCTCCC |
| 17 | SP015 | AGCCTGTTGTGAGCCTCCTGTCGAATATGGGGTGGGTGGG TGGCATTTGAAGGGGCTCGCACACTTTGAGCGTTTATTCT TGTCTCCC |
| 18 | SP018 | AGCCTGTTGTGAGCCTCCTGTCGAATCAGCAGGCCCAGAG CGCGCATTTGGGGTGGGTGGGTGGATTGAGCGTTTATTCT TGTCTCCC |

The sequences presented in Table 2 were synthesized full length, including the flanking fixed regions, and purified on reverse phase cartridge. They were controlled by electrophoresis on a polyacrylamide gel, in which migrated as a single band (data not shown).

The binding of *Phakopsora pachyrhizi* urediniospores to these candidates was then monitored by fluorescence. A 18-mer oligod alone does not bind to the spores. For all candidates a significant fluorescence signal is detected in the eluted fraction.

Figure 18A:
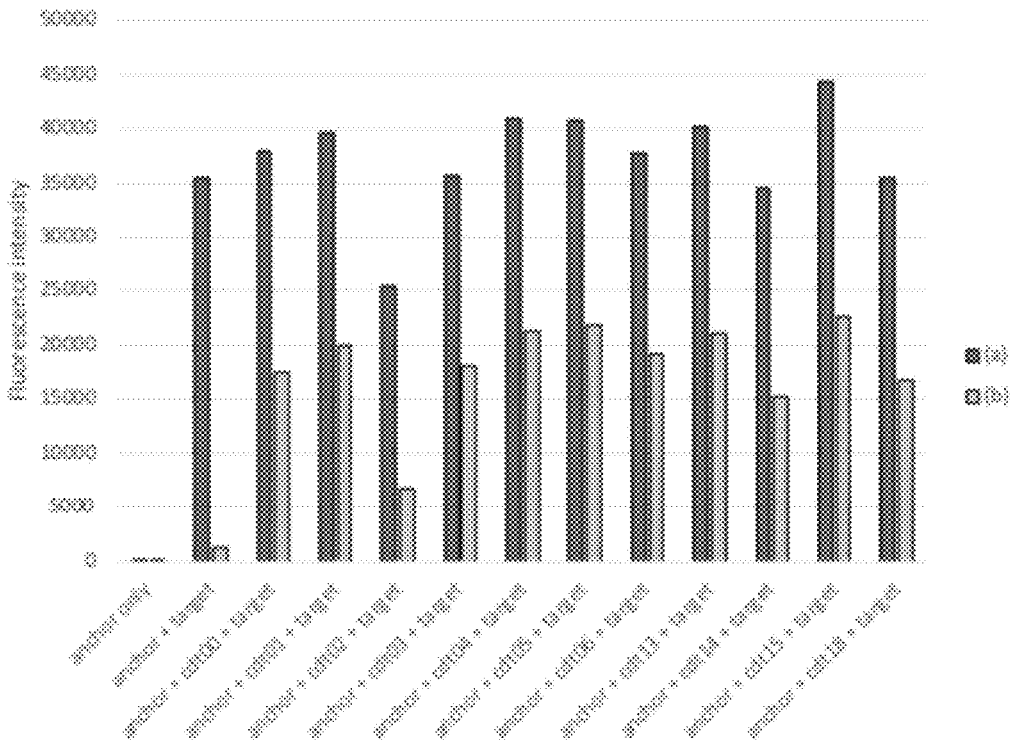
Figure 18B:
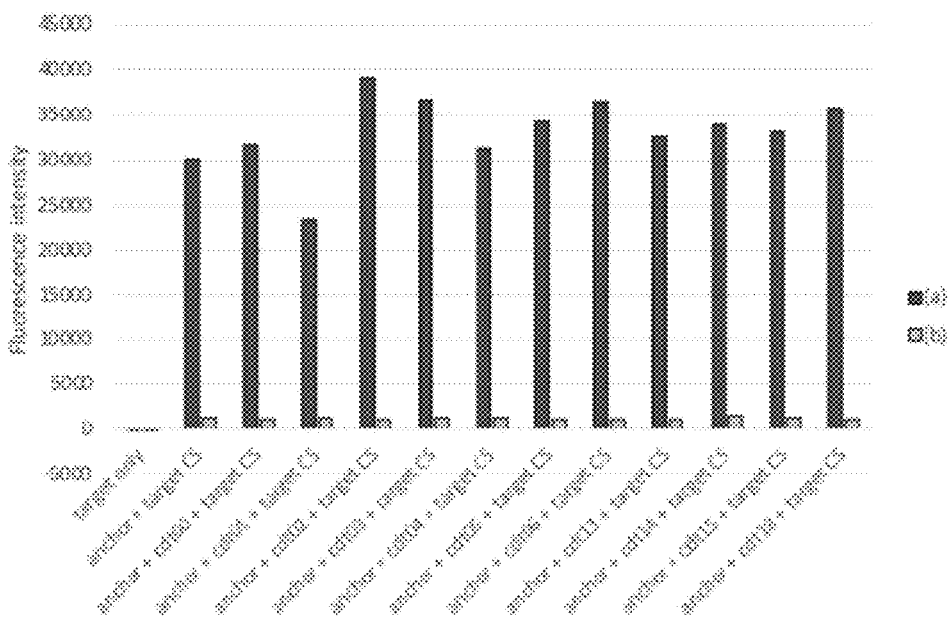

A similar experiment was performed with spores used for negative selection (mix of "BT06 M215" and "warrior" spores). The results are shown in FIG. 18B, and show that no significant binding of any of the candidates was detected, indicating that the interaction with *Phakopsora pachyrhizi* urediniospores is specific.

The secondary structure predicted by mFold shows a large G-rich loop for almost all these candidates (data not shown). The distribution of these G residues (4 blocks of 2-5 Gs separated by a short stretch of nucleotides, frequently a single T) strongly suggests that this region adopts a quadruplex structure. FIG. 19 presents a schematic presentation of such a quadruplex structure, if formed by the region T(50)-T(66) of the candidate SP00 (SEQ ID NO:8).

The sequence of the G-rich region for the aptamers presented in Table 2 is shown in Table 3 below. The G-score is indicated. The numbers in the column "region" refer to the full-length aptamer (See, Table 2). Several candidates show the same sequence 5' G4TG3TG3TG2, which underlines in Table 3. All these oligonucleotides are characterized by a high G4 score.

TABLE 3

| Aptamer | G4 putative motif (5'->3') | SEQ ID NO: | Region | G score |
|---|---|---|---|---|
| SP00 | GGGG C GGG T GGG T GG | 21 | 51-65 | 2.47 |
| SP01 | GGG T GGG AT GGG C GG | 22 | 27-41 | 2.00 |
| SP02 | GGGG T GGG T GGG T GG | 23 | 26-40 | 2.53 |
| SP03 | GGG TGA GGGGGG C GGG | 24 | 26-41 | 2.62 |
| SP04 | GG AGT GG GGG T GGG | 25 | 28-42 | 2.43 |
| SP05 | GG CCT GGG T GGG CGTT GG | 26 | 38-50 | 1.69 |
| SP06 | GGGGG C GGG T GGG T GG | 27 | 46-61 | 2.56 |
| SP13 | GGGGG T GGG C GGG C GG | 28 | 27-42 | 2.50 |
| SP14 | GGGGG T GGG T GGG T GG | 29 | 28-43 | 2.62 |
| SP15 | GGGG T GGG T GGG T GG | 30 | 29-43 | 2.53 |
| SP18 | GGGG T GGG T GGG T GG | 31 | 50-64 | 2.53 |

SP02 (SEQ ID NO:10) was selected as a representative of these aptamers for further evaluation, along with SP13 (SEQ ID NO:15) in which the loop connecting residues are Cs rather than Ts (see highlighted sequences in Table 3).

The predicted mFold secondary structure of these aptamers is shown in FIGS. 20A-B.

Based on the predicted double-stranded regions and internal loops, 4 truncated variants for SP02 (SEQ ID NO:10) and one for SP13 (SEQ ID NO:11) were generated, all retaining the G-rich part. The sequences of these oligonucleotides are listed in Table 4. The numbering refers to the truncation site in the parent aptamer (SEQ ID NO:10 or 15).

TABLE 4

| SEQ ID NO: | Ref. No. | Nucleobase sequence |
|---|---|---|
| 32 | SP02_04-64 | GTG-TTG-TGA-GCC-TCC-TGT-CGA-AGG-GGT-GGG-TGG-GTG-GAC-GAT-AGT-ATT-GGC-TCT-GTC-AC |
| 33 | SP02_11-56 | GAG-CCT-CCT-GTC-GAA-GGG-GTG-GGT-GGG-TGG-ACG-ATA-GTA-TTG-GCT-C |
| 34 | SP02_19-46 | TGT-CGA-AGG-GGT-GGG-TGG-GTG-GAC-GAT-A |
| 35 | SP02_23-42 | GAA-GGG-GTG-GGT-GGG-TGG-AC |
| 36 | SP13_09-60 | GTG-AGC-CTC-CTG-TCG-AAT-GGG-GGT-GGG-CGG-GCG-GTT-GAG-TCA-GGC-GGT-TCA-C |

The oligonucleotides were synthesized and purified by reverse phase HPLC, and were controlled by electrophoresis on a polyacrylamide gel. All oligomers migrated as a single band at the expected position given their size (20 to 59 nt) except SP02 19-46 that contains a shorter contaminant (data not shown).

The binding of the 5 aptamer variants to *Phakopsora pachyrhizi* (Pp) was tested by fluorescence. The Pp spores (105 particles) were mixed with the Texas Red (TR)-conjugated oligonucleotides (1 μM) in the selection buffer, CBT 1X, pH 9.0. Following filtration on nitrocellulose filters, fluorescence of the filtrate containing candidates that were not retained by the spores was measured. Candidates associated with Pp spores were then released following an ionic and temperature jump (3 minutes in water at 80° C.×650 rpm) and fluorescence of the solution was measured following filtration.

FIG. 21 presents the fraction of aptamer variants associated to Pp spores evaluated by fluorescence measurement (λExc: 585 nm; λEm: 635 nm). 5 to 8% of the different oligomers were associated to the Pp spores under the conditions used. These data suggest that the successive deletions removing one or the two internal loops does not prevent the binding of the aptamer to the spores, and suggests that the binding site of the selected aptamers to Pp spores resides in the G-rich region, and that the quadruplex motif 5' GAA-GGG-GTG-GGT-GGG-TGG-AC (SP02 23-42; SEQ ID:35) is sufficient for the association.

Example 8

Sequential Sensing of Rust Spores vs. Powdery Mildew

The method described in Example 4 above was employed using an aptamer as identified in Example 7 above, on an air sample containing rust spores (*Phakopsora pachyrhizi* urediniospores, compared to an air sample containing Powdery Mildew used as control (which should not bind the selective aptamer).

The aptamer having SEQ IS NO:17 (See, Table 2, SP015 was used.

As a background solution for the electrochemical detection was used a solution of 4 ml of the selection buffer described hereinabove, without Tween®, pH=9.0, and 25 μL of alkaline phosphatase-enzyme substrate , in 0.1 M carbonate buffer pH 9.5 with 0.005M $MgCl_2$, 0.01 M NaCl.

The alkaline phosphatase-enzyme substrate was para-nitrophenyl phosphate.

Measurements were performed in a 4 ml electrochemical cell, with Ag/AgCl reference electrode.

A clean and laminated carbon paper electrode (0.35 cm$^2$, 0.18 mm in diameter) was used as the working electrode, which was washed with double-ionized water (DIW) and left to dry.

Air samples with or without the spores were pumped, using a portable pump such as shown in FIGS. 2A-B. The air sampler is capable to pump 10 liters of air per minute. This air sampling device is powered by rechargeable batteries, and weighs 1.5 kg. Air pumping was performed for one minute.

Air samples without spores, in which laboratory air was pumped under the same conditions, served as the background.

2 µl of a 400 µM solution of the selected aptamer [a total amount of 100 nmole, 88 bases, HPLC, 5' biotin-tagged, in 0.1 M carbonate buffer pH 9.5 with 0.005 M $MgCl_2$ and 0.01 M NaCl] was put on one side (the adsorption side) of the electrode form 1 minute, and the electrode was thereafter dipped for 5 seconds inside the carbonate buffer described above.

Then, 2 µl of a 1 mg/ml solution of an alkaline phosphatase-streptavidin enzyme in 0.1 M carbonate buffer pH 9.5 with 0.005 M $MgCl_2$ and 0.01 M NaCl was put on the same side of the electrode onto which the aptamer was deposited.

The electrode was thereafter dipped for 5 seconds inside the washing buffer described above, and was then assembled in an electrochemical cell with an Ag/AgCl reference electrode, and an electrolyte solution containing 25 µL of a 20 mg/mol solution of the alkaline phosphatase-enzyme substrate in DIW, in 4 ml of 0.1 M carbonate buffer pH 9.5 with 0.005M $MgCl_2$, 0.01 M NaCl.

Cyclovoltammetry measurements were then performed (Ebegin=-0.0, Evertex1=-0.8, Evertex2=0.5, scan rate 0.1V/s, 3 cycles).

Figure 22:
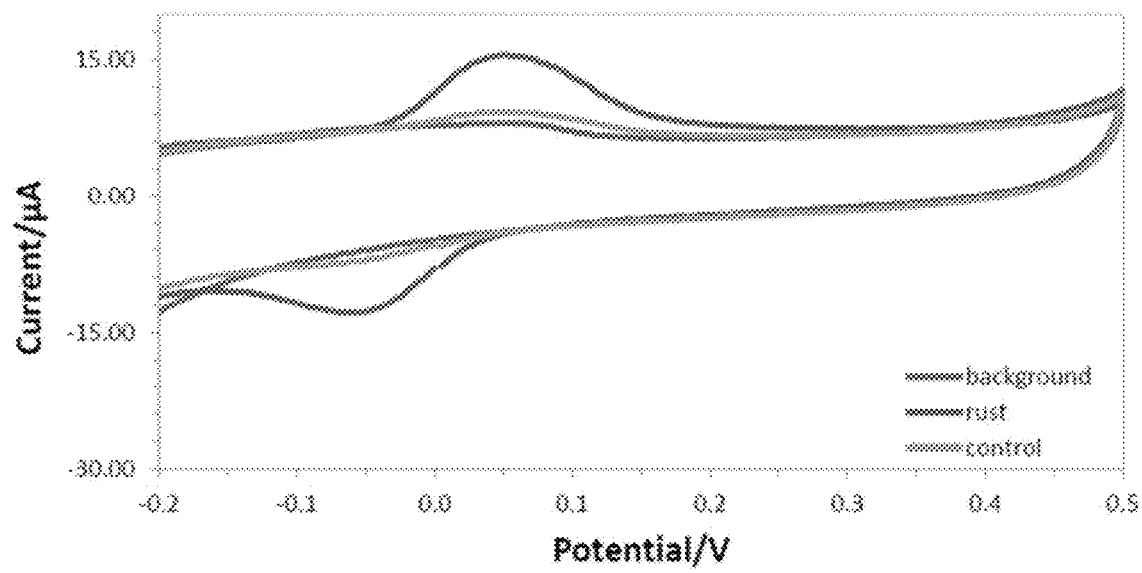

The electrode was thereafter washed with DIW, left to dry, and used again for air pumping a selected sample, in case the sample did not contain the rust fungus. The data obtained in the second cycle is presented in FIG. 22, and clearly show a successive and selective detection of the rust spores.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

In addition, any priority document(s) of this application is/are hereby incorporated herein by reference in its/their entirety.

What is claimed is:

1. A method of detecting a presence and/or amount of a soybean rust fungus in and/or on an agricultural substrate suspected as being infected by the soybean rust fungus or in an environment surrounding said substrate, the method comprising:

contacting an air sample of an environment surrounding a plant suspected as being infected by said soybean rust fungus with a gas-permeable carbon electrode, to thereby absorb said soybean rust fungus or a portion thereof, if present in said sample, to at least a portion of a surface of said electrode, to thereby obtain said gas-permeable carbon electrode having at least a portion of said soybean rust fungus absorbed to a surface thereof;

subsequent to contacting said sample, contacting said electrode with an aptamer that selectively binds to said soybean rust fungus or said portion thereof, said aptamer has a nucleobase sequence selected from the group consisting of SEQ ID NO:8-18 and 32-36 and having biotin conjugated thereto;

subsequent to contacting said aptamer, contacting said electrode with a phosphatase having avidin or streptavidin conjugated thereto; and subsequent to contacting said electrode with said phosphatase, contacting the electrode with an electrolyte solution containing a substrate of said phosphatase and performing said electrochemical reaction in the presence of said electrode, wherein an electric signal produced by said reaction is indicative of a presence and/or amount of said phosphatase, and is thereby indicative of a presence and/or amount of said soybean rust fungus or said portion thereof in the sample.

2. The method of claim 1, wherein said soybean rust fungus is *Phakopsora pachyrhizi*.

3. An electrode having absorbed thereto a soybean rust fungus and an aptamer having a nucleobase sequence selected from the group consisting of SEQ ID NO:8-18 and 32-36 attached to said soybean rust fungus.

4. The electrode of claim 3, further comprising an alkaline phosphatase attached to said aptamer.

5. An electrochemical system comprising the electrode of claim 4, wherein the electrode forms a part of an electrochemical cell and the electrochemical cell is operable by electrically connecting said electrode to a power source.

* * * * *